United States Patent

Sengoku

(10) Patent No.: US 9,690,725 B2
(45) Date of Patent: Jun. 27, 2017

(54) CAMERA CONTROL INTERFACE EXTENSION WITH IN-BAND INTERRUPT

(71) Applicant: QUALCOMM Incorporated, San Diego, CA (US)

(72) Inventor: Shoichiro Sengoku, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 291 days.

(21) Appl. No.: 14/595,030

(22) Filed: Jan. 12, 2015

(65) Prior Publication Data

US 2015/0199287 A1 Jul. 16, 2015

Related U.S. Application Data

(60) Provisional application No. 61/927,102, filed on Jan. 14, 2014.

(51) Int. Cl.
*G06F 13/24* (2006.01)
*G06F 13/40* (2006.01)
*G06F 13/42* (2006.01)

(52) U.S. Cl.
CPC .......... *G06F 13/24* (2013.01); *G06F 13/4068* (2013.01); *G06F 13/4221* (2013.01); *G06F 13/4295* (2013.01)

(58) Field of Classification Search
CPC .. G06F 13/24; G06F 13/4068; G06F 13/4282; G06F 13/4221; G06F 13/4295
See application file for complete search history.

(56) References Cited

U.S. PATENT DOCUMENTS

| | | | |
|---|---|---|---|
| 3,629,823 A | 12/1971 | Czernikowski | |
| 4,546,351 A | 10/1985 | Nambu | |
| 4,697,265 A | 9/1987 | Nozue | |
| 4,800,564 A | 1/1989 | DeFazio et al. | |

(Continued)

FOREIGN PATENT DOCUMENTS

| | | |
|---|---|---|
| DE | 10250616 C1 | 11/2003 |
| EP | 0192944 A2 | 9/1986 |

(Continued)

OTHER PUBLICATIONS

Chen I A., et al., "An error-correction scheme with Reed-Solomon codec for CAN bus transmission", Intelligent Signal Processing and Communication Systems (ISPACS), 2011 International Symposium on, IEEE, Dec. 7, 2011, pp. 1-5, XP032114635, DOI: 10.1109/ISPACS.2011.6146059 ISBN: 978-1-4577-2165.

(Continued)

*Primary Examiner* — Glenn A Auve
(74) *Attorney, Agent, or Firm* — Loza & Loza LLP

(57) ABSTRACT

Master and slave devices may be coupled to a control data bus. A method includes controlling data transmissions over a bus from a master device, where data bits are transcoded into symbols for transmission across two lines of the bus and a clock signal is embedded within symbol transitions of the data transmissions, and providing an interrupt period, during which one or more slave devices coupled to the bus can assert an interrupt request on a first line of the bus, within part of a heartbeat transmission by the master device over the first line and a second line of the bus. The interrupt request may be an indicator that the asserting slave device wishes to request some action by the master device.

27 Claims, 51 Drawing Sheets

(56) References Cited

U.S. PATENT DOCUMENTS

| | | |
|---|---|---|
| 5,257,270 A | 10/1993 | Hilden et al. |
| 5,274,647 A | 12/1993 | Tanaka |
| 5,321,818 A | 6/1994 | Wendling et al. |
| 5,581,770 A | 12/1996 | Suzuki |
| 5,613,128 A | 3/1997 | Nizar et al. |
| 5,687,356 A | 11/1997 | Basso et al. |
| 5,787,263 A | 7/1998 | Tamagawa et al. |
| 5,818,362 A | 10/1998 | Walker |
| 5,872,519 A | 2/1999 | Issa et al. |
| 6,147,963 A | 11/2000 | Walker et al. |
| 6,191,632 B1 | 2/2001 | Iwata et al. |
| 6,195,764 B1 | 2/2001 | Caldara et al. |
| 6,253,268 B1 | 6/2001 | Bjorkengren et al. |
| 6,359,951 B1 | 3/2002 | Morriss et al. |
| 6,370,668 B1 | 4/2002 | Garrett, Jr. et al. |
| 6,532,506 B1 | 3/2003 | Dunstan et al. |
| 6,609,167 B1 | 8/2003 | Bastiani et al. |
| 6,617,985 B1 | 9/2003 | Poeppelman |
| 6,812,824 B1 | 11/2004 | Goldinger et al. |
| 6,839,393 B1 | 1/2005 | Sidiropoulos |
| 6,895,057 B1 | 5/2005 | Balachandran et al. |
| 7,089,338 B1 | 8/2006 | Wooten et al. |
| 7,707,349 B1 | 4/2010 | Keithley |
| 7,984,214 B2 | 7/2011 | Heizmann |
| 8,103,803 B2 | 1/2012 | Reddy et al. |
| 8,103,896 B2 | 1/2012 | Deshpande |
| 8,112,551 B2 | 2/2012 | Sullam |
| 8,411,168 B2 | 4/2013 | Oka |
| 8,549,198 B2 | 10/2013 | Cohen et al. |
| 8,629,913 B2 | 1/2014 | Cote et al. |
| 8,971,469 B2 | 3/2015 | Imai et al. |
| 9,007,336 B2 | 4/2015 | Shepelev et al. |
| 2001/0017594 A1 | 8/2001 | Ahn |
| 2002/0024422 A1 | 2/2002 | Turner et al. |
| 2004/0015752 A1 | 1/2004 | Patella et al. |
| 2005/0216815 A1 | 9/2005 | Novotny et al. |
| 2005/0233789 A1 | 10/2005 | Maekawa |
| 2007/0016694 A1 | 1/2007 | Achler |
| 2007/0088874 A1 | 4/2007 | Brabant |
| 2007/0234136 A1 | 10/2007 | Leef et al. |
| 2007/0297438 A1 | 12/2007 | Meylan et al. |
| 2008/0005428 A1 | 1/2008 | Maul et al. |
| 2008/0244370 A1 | 10/2008 | Lam |
| 2009/0315899 A1 | 12/2009 | Pourbigharaz et al. |
| 2009/0316724 A1 | 12/2009 | Muukki et al. |
| 2011/0084900 A1 | 4/2011 | Jacobsen et al. |
| 2011/0111700 A1 | 5/2011 | Hackett |
| 2012/0117287 A1 | 5/2012 | Kashima |
| 2012/0137022 A1 | 5/2012 | Cala' |
| 2012/0259992 A1 | 10/2012 | Koehler et al. |
| 2013/0018979 A1 | 1/2013 | Cohen et al. |
| 2013/0039443 A1 | 2/2013 | Garaschenko et al. |
| 2013/0305119 A1 | 11/2013 | Kern et al. |
| 2014/0013017 A1 | 1/2014 | Decesaris et al. |
| 2014/0025999 A1 | 1/2014 | Kessler |
| 2014/0286466 A1 | 9/2014 | Sengoku et al. |
| 2015/0030112 A1 | 1/2015 | Wiley et al. |
| 2015/0046616 A1 | 2/2015 | Pedersen et al. |
| 2015/0074305 A1 | 3/2015 | Sengoku et al. |
| 2015/0095537 A1 | 4/2015 | Sengoku |
| 2015/0100713 A1 | 4/2015 | Sengoku |
| 2015/0100862 A1 | 4/2015 | Sengoku |
| 2015/0199295 A1 | 7/2015 | Sengoku |
| 2015/0248373 A1 | 9/2015 | Sengoku |
| 2016/0147684 A1 | 5/2016 | Sengoku |
| 2016/0217090 A1 | 7/2016 | Sengoku et al. |
| 2016/0364353 A1 | 12/2016 | Sengoku |

FOREIGN PATENT DOCUMENTS

| | | |
|---|---|---|
| EP | 0588191 A1 | 3/1994 |
| GB | 2173929 A | 10/1986 |
| WO | WO-0042740 A1 | 7/2000 |
| WO | WO-2013052886 A2 | 4/2013 |

OTHER PUBLICATIONS

Corrigan S: "Introduction to the Controller Area Network (CAN)—Application ReportSLOA101AAug. 2002, Revised Jul. 2008", internet article, Jul. 30, 2008, http://www.ti.com/lit/an/sloa101a/sloa101a.pdf [retrieved on Jun. 16, 2015] the whole document paragraph [3.1.1].

"I2C—Inter-IC Corrununications, Lectures 28, Oct. 26-29, 2012", internet article, Oct. 29, 2012, XP002740959, Retrieved from the Internet: URL: http://ece.uidaho.edu/ee/classes/ECE340/LectureNotes/L27/I2C.pdf [retrieved on Jun. 16, 2015] the whole document p. 2.

"Tradeoffs when considering SPI or I2C?", internet article, Apr. 1, 2012, XP002735900, Retrieved from the Internet:URL:http://electronics.stackexchange.com/questions/29037/tradeoffs-when-considering-spi-or-i2c [retrieved on Feb. 12, 2015].

International Search Report and Written Opinion—PCT/US2015/011256—ISA/EPO—Mar. 6, 2015.

International Search Report and Written Opinion—PCT/US2014/059776—ISA/EPO—Jan. 7, 2015.

Shanley T., et al., "PCI System Architecture—Edition 4th, Chapter 5 (106-119) and 14part (291-297)" In: May 31, 1999, Addison-Wesley, XP055145686, the whole document.

FIG. 21

| Ternary | Bits[19:0] | Address | Write | Read | Bit[i] 19,18,17,16,15,14,13,12,11,10,9,8,7,6,5,4,3 |
|---|---|---|---|---|---|
| 2222_2222_2222_2222 0x31 (49) ↓ 2222_2222_1012₃ 0x81BC0 | 0x81BF0 | See FIG. 22 | | | 1,1,1,1,1,1,1,1,1,1,1,?,?,? |
| 2222_2222_1011₃ 0x81BBF [6-bits] 0x40 (64) ↓ 2222_2221_1211₃ 0x81B80 | | Reserved | Reserved | Reserved | 1,1,1,1,1,1,1,1,1,0,x,x,x |
| 2222_2221_1210₃ 0x81B7F [7-bit] 0x80 (128) ↓ 2222_2220_0001₃ 0x81B00 | | Master handover | Reserved | Reserved | 1,1,1,1,1,1,1,1,0,x,x,x,x |
| 2222_2220_0000₃ 0x81AFF [8-bits] 0x100 (256) ↓ 2222_2202_2121₃ 0x81A00 | | Reserved | Reserved | Reserved | 1,1,1,1,1,1,1,0,x,x,x,x,x |
| 2222_2202_2120₃ 0x819FF [9-bits] 0x200 (512) ↓ 2222_2112_1121₃ 0x81800 | | Reserved | Slave to slave grant | Slave to slave request | 1,1,1,1,1,1,0,x,x,x,x,x,x |
| 2222_2112_1121₃ 0x817FF [11-bits] 0x800 (2048) ↓ 2221_1121_0210₃ 0x81000 | | CCIe register address | Reserved | Master bus request | 1,1,1,1,1,0,x,x,x,x,x,x,x |
| 2221_1121_0202₃ 0x80FFF [12-bits] 0x1000 (4096) ↓ 2221_2201_2001₃ 0x80000 | | 8-bit CHK | 8-bit CHK | 8-bit CHK | 1,1,1,1,0,x,x,x,x,x,x,x,x |
| 2221_2201_2001₃ (524288) ↓ 0000_0000_0000₃ 0x00000 | 0x7FFFF | 19-bit data region | | | 0,x,x,x,x,x,x,x,x,x,x,x,x |

Bit[19]=1

2100, 2102

| Ternary | Bits[19:0] | Address | Write | Read | Bits[0] 19,18,17,16,15,14,13,12,11,10,9,8,7,6,5,4,3,2,1,0 |
|---|---|---|---|---|---|
| 2222 2222 2222, 0x81BF0 | | Prohibited | | 1 1 1 1 1 1 1 1 1 1 1 1 1 1 1 1 0 0 0 0 |
| 2222 2222 2221, 0x81BEF | Reserved | Reserved | Reserved | 1 1 1 1 1 1 1 1 1 1 1 1 1 1 1 1 0 0 0 1 |
| 2222 2222 2220, 0x81BEE | Heartbeat clock/SYNC | SYNC | 1 1 1 1 1 1 1 1 1 1 1 1 1 1 1 1 0 0 1 0 |
| 2222 2222 2212, 0x81BED | Reserved | Reserved | Reserved | 1 1 1 1 1 1 1 1 1 1 1 1 1 1 1 1 0 0 1 1 |
| 2222 2222 2211, 0x81BEC | Reserved | Reserved | Reserved | 1 1 1 1 1 1 1 1 1 1 1 1 1 1 1 1 0 1 0 0 |
| 2222 2222 2210, 0x81BEB | Reserved | Reserved | Reserved | 1 1 1 1 1 1 1 1 1 1 1 1 1 1 1 1 0 1 0 1 |
| 2222 2222 2202, 0x81BEA | Reserved | Reserved | Reserved | 1 1 1 1 1 1 1 1 1 1 1 1 1 1 1 1 0 1 1 0 |
| 2222 2222 2201, 0x81BE9 | Reserved | Reserved | Reserved | 1 1 1 1 1 1 1 1 1 1 1 1 1 1 1 1 0 1 1 1 |
| 2222 2222 2200, 0x81BE8 | Reserved | Reserved | Reserved | 1 1 1 1 1 1 1 1 1 1 1 1 1 1 1 1 1 0 0 0 |
| 2222 2222 2122, 0x81BE7 0x10 (16)↑ 0x20 (32)↓ | Reserved | Reserved | Reserved | 1 1 1 1 1 1 1 1 1 1 1 1 1 1 1 0 x x x x |
| 2222 2222 2100, 0x81BE0 0x20 (32)↓ 2222 2222 1012, 0x81BC0 | Reserved | Reserved | Reserved | 1 1 1 1 1 1 1 1 1 1 1 1 1 1 0 x x x x x |

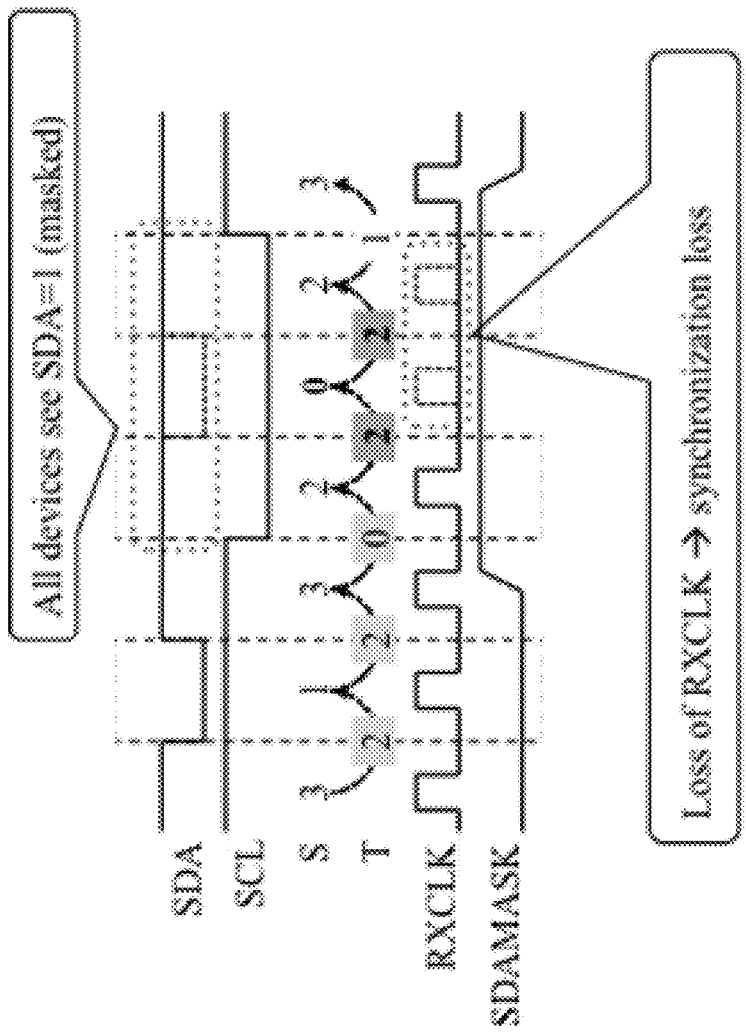
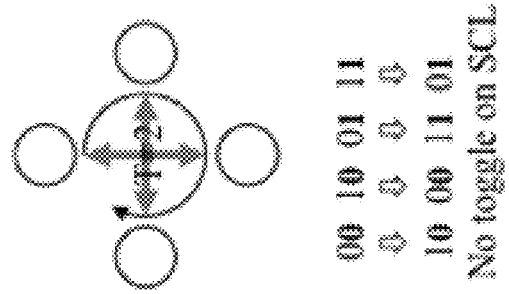
FIG. 29

| Ternary | Bits[19:0] | Address | Write | Read | Bits[0] | | | | | | | | | | | | | | | | | |
|---|---|---|---|---|---|---|---|---|---|---|---|---|---|---|---|---|---|---|---|---|---|---|
| | | | | | 19 | 12 | 11 | 10 | 9 | 8 | 7 | 6 | 5 | 4 | 3 | 2 | 1 | 0 | | | | |
| 2222_2222_2222_0x11(17)↑ | 0x81BF0 | | 1 | 1 | 1 | 1 | 1 | 1 | 1 | 1 | 0 | 1 | 1 | 1 | 1 | 1 | 0 | | | | |
| 2222_2222_2101₄ | 0x81BEF | 2 in T[2:0] → Prohibited<br>Other T[2:0] → Aliased to 0x81BD9 | | 1 | 1 | 1 | 1 | 1 | 1 | 1 | 1 | 0 | 1 | 1 | 1 | 0 | 1 | | | | |
| 2222_2222_2222_0x6(6)↑ | 0x81BDF | | | | 1 | 1 | 1 | 1 | 1 | 1 | 0 | 1 | 1 | 1 | 1 | 1 | 1 | | | | |
| 2222_2222_201L | 0x81BDA | | | | 1 | 1 | 1 | 1 | 1 | 1 | 0 | 1 | 1 | 0 | 1 | 0 | 1 | | | | |
| 2222_2222_2010₃ | 0x81BD9 | Heartbeat/IBIRQ | Prohibited | | 1 | 1 | 1 | 1 | 1 | 1 | 0 | 1 | 1 | 0 | 1 | 0 | 0 | | | | |
| 2222_2222_2002₃ | 0x81BD8 | 2 in T[2:0] → Prohibited<br>Other T[2:0] → Aliased to 0x81BD9 | | | 1 | 1 | 1 | 1 | 1 | 1 | 0 | 1 | 1 | 0 | 0 | 1 | 1 | | | | |
| 2222_2222_2001L | 0x81BD7 | | | | 1 | 1 | 1 | 1 | 1 | 1 | 0 | 1 | 1 | 0 | 0 | 1 | 0 | | | | |
| 2222_2222_2000₃ | 0x81BD6 | | | | 1 | 1 | 1 | 1 | 1 | 1 | 0 | 1 | 1 | 0 | 0 | 0 | 1 | | | | |
| 2222_2222_1222₃ | 0x81BD5 | Reserved | Reserved | Reserved | 1 | 1 | 1 | 1 | 1 | 1 | 0 | 1 | 0 | 1 | 1 | 1 | 0 | | | | |
| 2222_2222_1221L | 0x81BD4 | Reserved | Reserved | Reserved | 1 | 1 | 1 | 1 | 1 | 1 | 0 | 1 | 0 | 1 | 1 | 0 | 1 | | | | |
| 2222_2222_1220₃ | 0x81BD3 | Reserved | Reserved | Reserved | 1 | 1 | 1 | 1 | 1 | 1 | 0 | 1 | 0 | 1 | 1 | 0 | 0 | | | | |
| 2222_2222_1212₃ | 0x81BD2 | Reserved | Reserved | Reserved | 1 | 1 | 1 | 1 | 1 | 1 | 0 | 1 | 0 | 1 | 0 | 1 | 1 | | | | |
| 2222_2222_1211L | 0x81BD1 | Reserved | Reserved | Reserved | 1 | 1 | 1 | 1 | 1 | 1 | 0 | 1 | 0 | 1 | 0 | 1 | 0 | | | | |
| 2222_2222_1210₃ | 0x81BD0 | Reserved | Reserved | Reserved | 1 | 1 | 1 | 1 | 1 | 1 | 0 | 1 | 0 | 1 | 0 | 0 | 0 | | | | |
| 2222_2222_1202₃ 0x16(22)↑ | 0x81BCF | Reserved | Reserved | Reserved | 1 | 1 | 1 | 1 | 1 | 1 | 0 | 1 | 0 | 0 | 1 | 1 | 0 | | | | |
| 2222_2222_1012₃ | 0x81BC0 | Reserved | Reserved | Reserved | 1 | 1 | 1 | 1 | 1 | 1 | 0 | x | x | x | x | x | x | | | | |

| Ternary Bits[19:0] | Address | Write | Read | Bits[i] 19 18 17 16 15 14 13 12 11 10 9 8 7 6 5 4 3 2 1 0 |
|---|---|---|---|---|
| 2222_2222_2222_2222, 0x81BF0 | /SY- | Prohibited* | 1 1 1 1 1 1 1 1 1 1 1 1 1 1 1 1 0 0 0 0 |
| 2222_2222_2222_2221, 0x81BEF | 0x2A(42)‡ | Prohibited | | 1 1 1 1 1 1 1 1 1 1 1 1 1 1 1 0 1 0 1 0 |
| 2222_2222_1102, 0x81BC6 | | | | |
| 2222_2222_1101, 0x81BC5 | Heartbeat ♥ /-NC♪ | Prohibited | Prohibited* | 1 1 1 1 1 1 1 1 1 1 1 1 1 1 0 0 1 0 1 0 |
| 2222_2222_1100, 0x81BC4 | 0xA(10)‡ | | | 1 1 1 1 1 1 1 1 1 1 1 1 1 1 1 1 0 1 0 0 |
| 2222_2222_1000, 0x81BBB | Reserved | Reserved | Reserved | 1 1 1 1 1 1 1 1 1 1 1 1 1 1 1 1 1 1 1 0 |
| 2222_2222_0222, 0x81BBA | Reserved | Reserved | Reserved | 1 1 1 1 1 1 1 1 1 1 1 1 1 1 1 1 1 1 0 1 |
| 2222_2222_0221, 0x81BB9 | Reserved | Reserved | Reserved | 1 1 1 1 1 1 1 1 1 1 1 1 1 1 1 1 1 1 0 0 |
| 2222_2222_0220, 0x81BB8 | Reserved | Reserved | Reserved | 1 1 1 1 1 1 1 1 1 1 1 1 1 1 1 1 1 0 1 1 |
| 2222_2222_0212, 0x81BB7 {3-bits} 0x8(8)‡ | Reserved | Reserved | Reserved | 1 1 1 1 1 1 1 1 1 1 1 1 1 0 1 1 1 1 x x |
| 2222_2222_0121, 0x81BB0 {4-bits} 0x10(16)‡ | Reserved | Reserved | Reserved | 1 1 1 1 1 1 1 1 1 1 1 1 0 1 1 x x x x x |
| 2222_2222_0000, 0x81BAF | Reserved | Reserved | Reserved | 1 1 1 1 1 1 1 1 1 1 1 0 1 1 x x x x x x |
| 2222_2221_2222, 0x81BA0 {5-bits} 0x20(32)‡ | Reserved | Reserved | Reserved | 1 1 1 1 1 1 1 1 1 1 1 0 1 0 x x x x x x |
| 2222_2221_1211, 0x81B9F | Reserved | Reserved | Reserved | 1 1 1 1 1 1 1 1 1 1 0 1 1 0 x x x x x x |
| ... 0x81B80 | | | | |

*) /SY-NC♪ is prohibited for read since there shall not be IB-IRQ during read

*FIG. 42*

CAMERA CONTROL INTERFACE EXTENSION WITH IN-BAND INTERRUPT

CROSS-REFERENCE TO RELATED APPLICATIONS

The present Application for Patent claims priority to Provisional Application No. App. No. 61/927,102, entitled "Camera Control interface Extension With In-Band Interrupt" filed Jan. 14, 2014, which is assigned to the assignee hereof and hereby expressly incorporated by reference herein.

TECHNICAL FIELD

The present disclosure pertains to enabling in-band interrupt operations over a shared control data bus without the need for a dedicated interrupt lines or pins.

BACKGROUND

The Inter-Integrated Circuit serial bus, which may also be referred to as the I2C bus or the I²C bus, is a serial single-ended computer bus that was intended for use in connecting low-speed peripherals to a processor. The I2C bus is a multi-master bus in which each device can serve as a master and a slave for different messages transmitted on the I2C bus. The I2C bus can transmit data using only two bidirectional open-drain connectors, including a Serial Data Line (SDA) and a Serial Clock Line (SCL). The connectors typically include signal wires that are terminated by pull-up resistors.

Protocols governing I2C bus operations define basic types of messages, each of which begins with a START and ends with a STOP. The I2C bus uses 7-bit addressing and defines two types of nodes. A master node is a node that generates the clock and initiates communication with slave nodes. A slave node is a node that receives the clock and responds when addressed by the master. The I2C bus is a multi-master bus, which means any number of master nodes can be present. Additionally, master and slave roles may be changed between messages (i.e., after a STOP is sent).

In the context of a camera implementation, unidirectional transmissions may be used to capture an image from a sensor and transmit such image data to memory in a baseband processor, while control data may be exchanged between the baseband processor and the sensor as well as other peripheral devices. In one example, a Camera Control Interface (CCI) protocol may be used for such control data between the baseband processor and the image sensor (and/or one or more slave nodes). In one example, the CCI protocol may be implemented over an I2C serial bus between the image sensor and the baseband processor. A CCI extended (CCIe) protocol has been defined to extend the throughput over the I2C bus.

Within the CCIe protocol, interrupts are used to allow a slave node to indicate to the master node that it wishes to use the bus. A mechanism is needed to permit slave nodes to send such interrupts to the master node. Traditional I2C or Camera Control Interface based camera systems use separate interrupt (IRQ) lines for each slave node, which increases device cost due to the large number of pins. The concept of a separate interrupt pin for each slave node means that each slave node must have a single dedicate interrupt pin.

Consequently, it would be desirable to eliminate the use of dedicated interrupt pins in master and slave nodes sharing a bus for CCIe implementations.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In various aspects, a method operational on a master device includes controlling data transmissions over a bus from a master device, where data bits are transcoded into symbols for transmission across two lines of the bus and a clock signal is embedded within symbol transitions of the data transmissions, and providing an interrupt period, during which one or more slave devices coupled to the bus can assert an interrupt request on a first line of the bus, while a "heartbeat" word is being transmitted by the master device over the bus. The heartbeat word may be transmitted periodically to enable synchronization of slave devices, which extract a clock signal from transmissions sent by the master device over the first line and a second line of the bus.

In an aspect, the interrupt request is an indicator that the asserting slave device wishes to request some action by the master device.

In an aspect, the master device may monitor for an interrupt request from a slave device during the interrupt period. The master device may perform a scan of the slave devices over the bus to identify a slave device asserting the interrupt request. The master device may receive an indicator from the asserting slave device over the first line.

In an aspect, a slave device may assert an interrupt request by pulling down the first line during the interrupt period. The slave device may mask the first line during the interrupt period for purposes of decoding the transcoded data bits received over the bus.

In an aspect, a slave identifier scan response period may be provided, during which one or more slave devices coupled to the bus can provide their unique identifier over a first line of the bus, within part of a slave identifier scan initiated by the master device over the first line and a second line of the bus.

In an aspect, a data read period may be defined in which a previously identified slave device is allowed to transmit data over a first line of the bus while the master device sends a global read clock over a second line of the bus. The global read clock may be a double data rate clock.

In various aspects, device includes a bus having a first line and a second line, a master device coupled to the bus and controlling data transmissions over the bus, and one or more slave devices are coupled to the bus. The master device may control data transmissions over the bus, where data bits are transcoded into symbols for transmission across two lines of the bus and a clock signal is embedded within symbol transitions of the data transmissions. The master device may provide an interrupt period, during which one or more slave devices coupled to the bus can assert an interrupt request on a first line of the bus, within part of a heartbeat transmission by the master device over the first line and a second line of the bus.

In various aspects, a method operational on a slave device includes receiving data transmissions over a bus from a master device, where data bits are transcoded into symbols for transmission across two lines of the bus, a clock signal is embedded within symbol transitions of the data transmissions, and an interrupt period is defined within the symbols received over the bus, and asserting an interrupt request on a first line of the bus while receiving a heartbeat transmission from the master device over the first line and a second line of the bus.

In an aspect, the interrupt request is an indicator that the asserting slave device wishes to request some action by the master device. The interrupt request may be asserted by pulling down the first line during the interrupt period.

In an aspect, the first line may be internally masked during the interrupt period for purposes of decoding the transcoded data bits received over the bus.

In an aspect, a slave identifier scan request may be received from the master device over a first line and a second line of the bus, and a unique slave identifier may be provided over a first line of the bus within part of a slave identifier scan slave identifier scan response period provided by the slave identifier scan request.

In an aspect, data may be sent over a first line of the bus during a data read period, defined by the master device, in which a previously identified slave device is allowed to transmit data over a first line of the bus while the while the master device sends a global read clock over a second line of the bus.

In various aspects, a slave device, includes a bus interface for coupling to a first line and a second line, a processing circuit coupled to the bus interface. The processing circuit may be configured to receive data transmissions over a bus from a master device, where data bits are transcoded into symbols for transmission across two lines of the bus, a clock signal is embedded within symbol transitions of the data transmissions, and an interrupt period is defined within the symbols received over the bus. The processing circuit may be configured to assert an interrupt request on a first line of the bus while receiving a heartbeat transmission from the master device over the first line and a second line of the bus.

BRIEF DESCRIPTION OF THE DRAWINGS

Various features, nature and advantages may become apparent from the detailed description set forth below when taken in conjunction with the drawings in which like reference characters identify correspondingly throughout.

FIG. 21 illustrates an example in which bit 19 may span various numbers.

FIG. 22 illustrates a range within the bit 19 number space that may be used to define a heartbeat as disclosed herein.

FIG. 29 illustrates certain conditions that may occur when an SDA mask is asserted during an in-band IRQ period.

FIG. 32 illustrates an example of the use of Bit-19 of the ternary number illustrated in FIG. 31 to map CCIe mode transmissions.

FIG. 39 illustrates an example of synchronization and heartbeat mapping within Bit-19 of the CCIe protocol in accordance with certain aspects disclosed herein.

FIG. 42 illustrates possible SID scan response words that may be used by the CCIe protocol in accordance with certain aspects disclosed herein.

DETAILED DESCRIPTION

Figure 1:
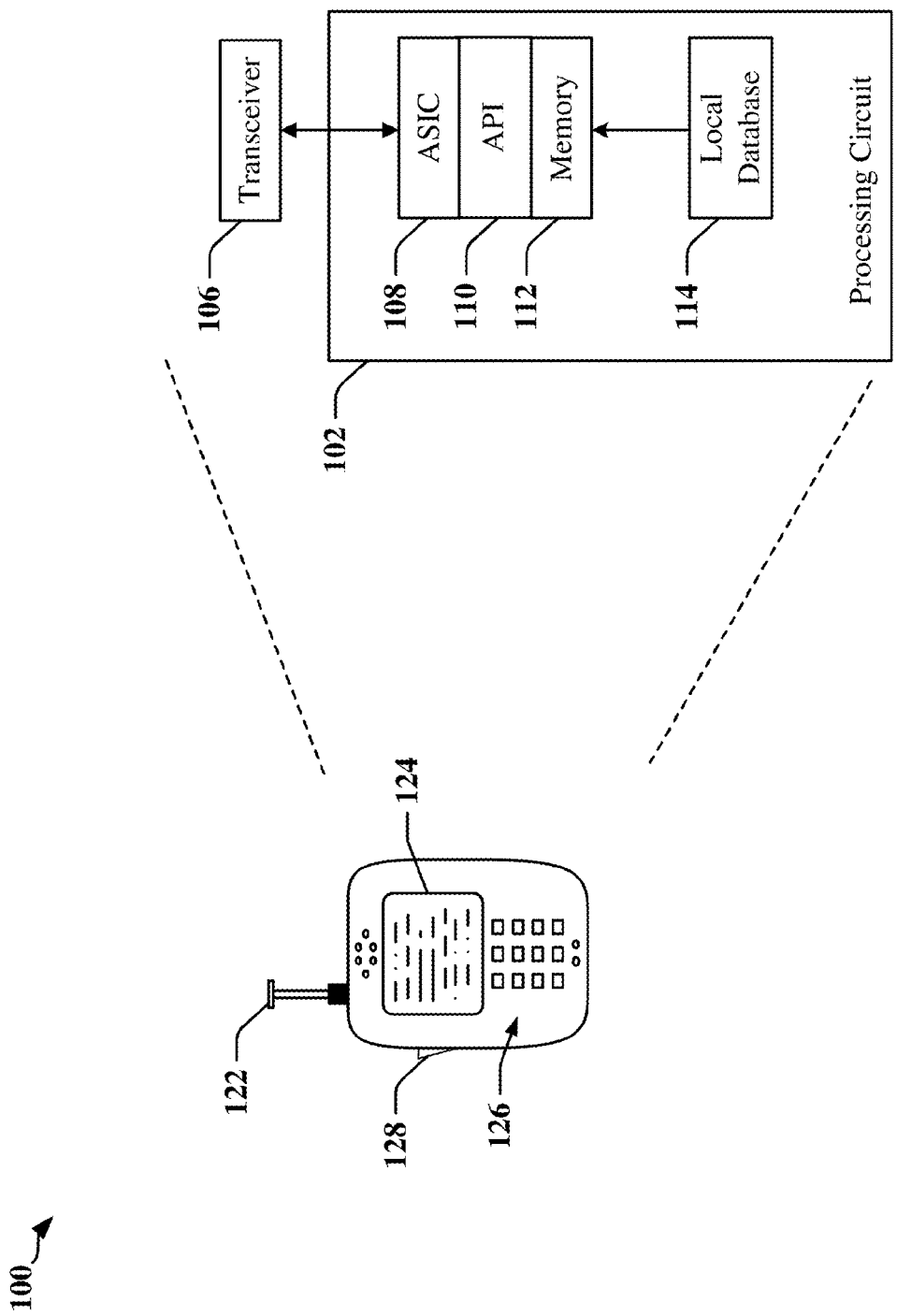
FIG. 1 depicts an apparatus employing a data link between integrated circuit devices that selectively operates according to one of plurality of available standards

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may not be shown in detail in order not to obscure the embodiments.

Certain embodiments disclosed herein provide systems, methods and apparatus that can improve the performance of a communications interface using a serial bus that supports both conventional I2C bus operations and enhanced communications interfaces using a common I2C bus. In one example, a camera control interface (CCI) may be based on an I2C bus and may be deployed using a two-wire, bi-directional, half duplex, serial interface configured as a bus connecting a master and one or more slaves. CCI operations may be compatible with I2C bus operations. According to certain aspects, systems, apparatus and methods are provided that minimize the number of IRQ lines needed to support multiple peripheral devices connected to an I2C or CCI bus.

Overview

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Certain aspects of the invention may be applicable to communications links deployed between electronic devices that may include sub components of an apparatus such as a telephone, a mobile computing device, an appliance, automobile electronics, avionics systems, etc. FIG. 1 depicts an apparatus that may employ a communication link between integrated circuit (IC) devices. In one example, the apparatus 100 may include a wireless communication device that communicates through an RF transceiver with a radio access network (RAN), a core access network, the Internet and/or another network. The apparatus 100 may include a communications transceiver 106 operably coupled to processing circuit 102. The processing circuit 102 may have one or more IC devices, such as an application-specific IC (ASIC) 108. The ASIC 108 may include one or more processing devices, logic circuits, and so on. The processing circuit 102 may include and/or be coupled to processor readable storage such as a memory 112 that may maintain instructions and data that may be executed by processing circuit 102. The processing circuit 102 may be controlled by one or more of an operating system and an application programming interface (API) 110 layer that supports and enables execution of software modules residing in storage media, such as the memory device 112 of the wireless device. The memory device 112 may include read-only memory (ROM) or random-access memory (RAM), electrically erasable programmable ROM (EEPROM), flash cards, or any memory device that can be used in processing systems and computing platforms. The processing circuit 102 may include or access a local database 114 that can maintain operational parameters and other information used to configure and operate apparatus 100. The local database 114 may be implemented using one or more of a database module, flash memory, magnetic media, EEPROM, optical media, tape, soft or hard disk, or the like. The processing circuit may also be operably coupled to external devices such as an antenna 122, a display 124, operator controls, such as a button 128 and/or a keypad 126, among other components.

Interrupt Mechanism Using Dedicated IRQ Line

Figure 2:
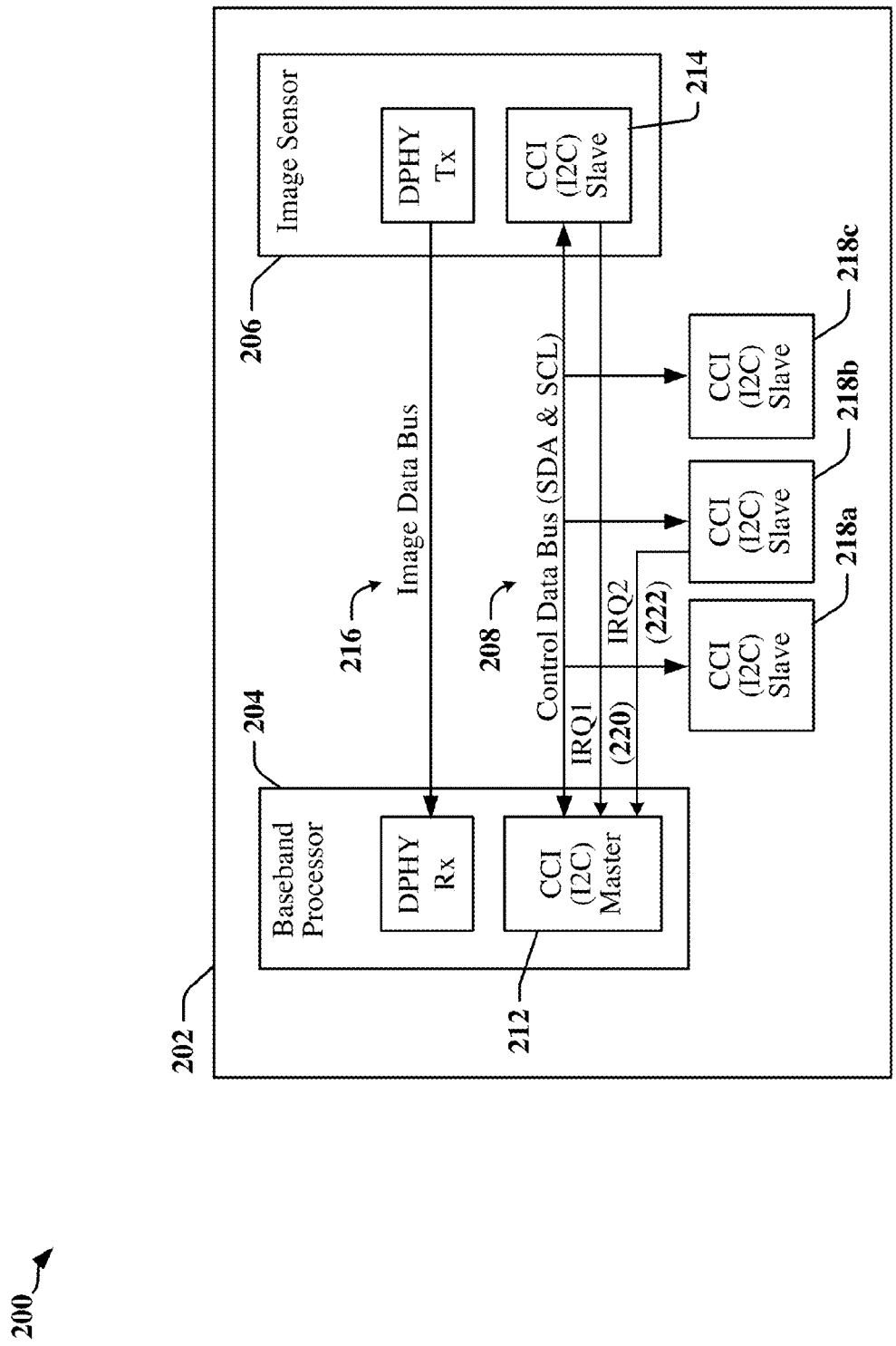
FIG. 2 is a block diagram illustrating a device having a baseband processor and an image sensor and implementing an image data bus and a control data bus.

FIG. 2 is a block diagram 200 illustrating a simplified example of a device 202 that has a baseband processor 204 and an image sensor 206. An image data bus 216 and a multi-mode control data bus 208 may be implemented in the device 202. The diagram 200 illustrates a camera device 202 by way of example only, and various other devices and/or different functionalities may implement, operate and/or communicate using the control data bus 208. In the depicted example, image data may be sent from the image sensor 206 to the baseband processor 204 over an image data bus 216, such as the "DPHY" high-speed differential link defined by MIPI. In one example, the control data bus 208 may have two wires that are configurable for operation in an I2C bus mode. Accordingly, the control data bus 208 may include SCL and SDA wires. The SCL may carry a clock signal that may be used to synchronize data transfers over the control data bus 208 according to I2C protocols. The data line SDA and clock line SCL may be coupled to multiple devices 212, 214, and 218a-218c on the control data bus 208. In the example, control data may be exchanged between the baseband processor 204 and the image sensor 206 as well as other peripheral devices 218 via the control data bus 208. According to I2C protocols, clock speeds on the SCL wire may be up to 100 KHz for normal I2C operation, up to 400 KHz for I2C fast mode, and up to 1 MHz for I2C fast mode plus (Fm+). These operating modes over an I2C bus may be referred to as a CCI mode when used for camera applications.

In some instances, two or more slave devices 214, or 218a may request attention of the baseband processor 204 by asserting a predefined logic level on a corresponding IRQ line 220, or 222.

A First Example Illustrating Use of a Common IRQ Bus to Reduce IRQ Lines

Figure 3:
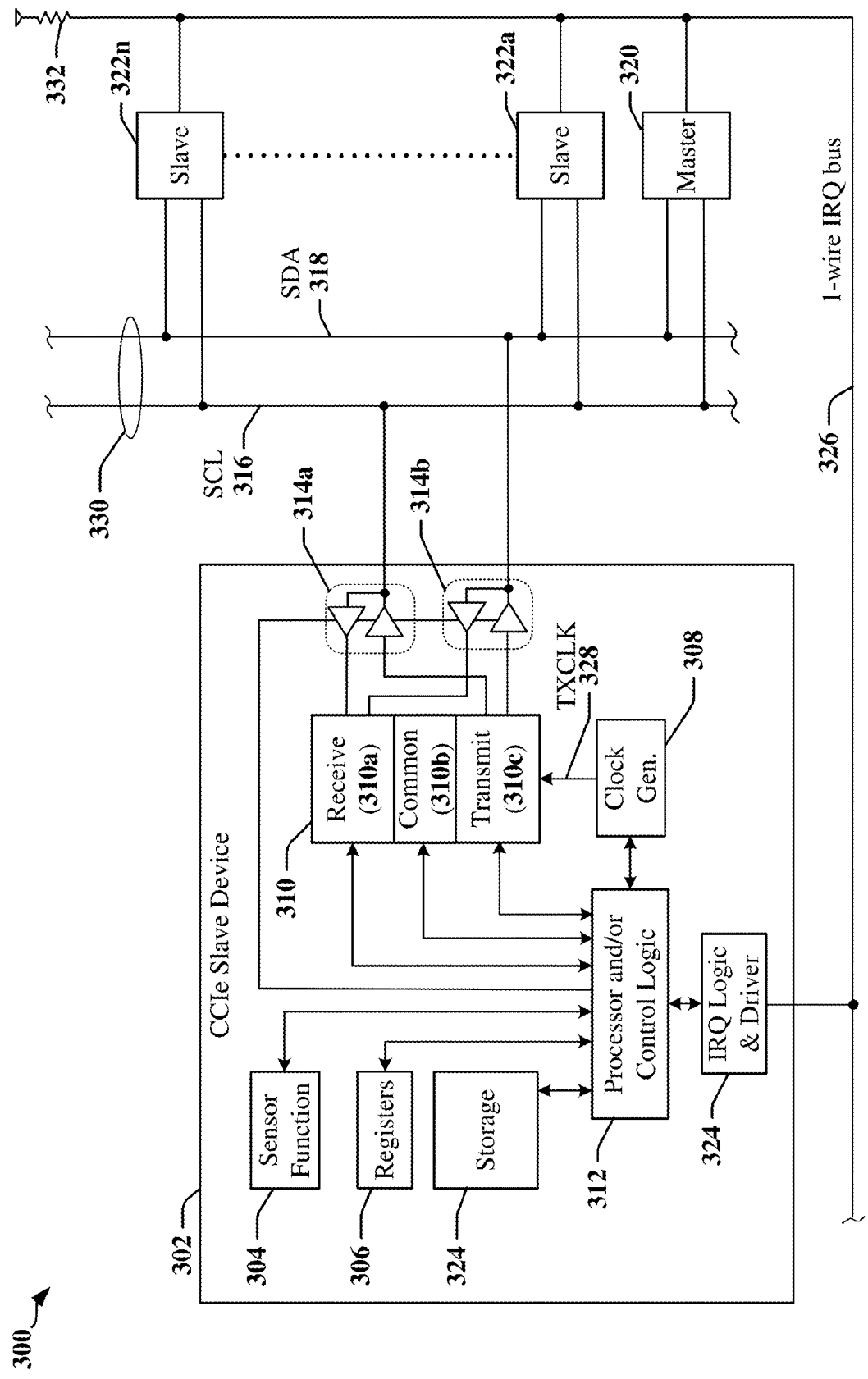
FIG. 3 is a diagram that illustrates a simplified system architecture for an apparatus employing a data link between IC devices according to certain aspects disclosed herein.

FIG. 3 is a block schematic diagram illustrating certain aspects of an apparatus 300 that may employ a communications bus such as a CCIe bus 330. The apparatus 300 may be embodied in one or more of a wireless mobile device, a mobile telephone, a mobile computing system, a wireless telephone, a notebook computer, a tablet computing device, a media player, a gaming device, or the like. The apparatus 300 may include multiple CCIe devices 302, 320, and/or 322a-322n, which communicate using a CCIe bus 330. The CCIe bus 330 can extend the capabilities of a conventional CCI bus for devices that are configured for enhanced features supported by the CCIe bus 330. For example, the CCIe bus 330 may support a higher bit rate than a CCI bus 330. According to certain aspects disclosed herein, some versions of the CCIe bus 330 may be configured or adapted to support bit rates of 16.7 Mbps or more, and some versions of the CCIe bus may be configured or adapted to support data rates of at least 23 megabits per second.

In the example illustrated in FIG. 3, an imaging device 302 is configured to operate as a slave device on the CCIe bus 330. The imaging device 302 may be adapted to provide a sensor control function 304 that manages an image sensor, for example. In addition, the imaging device 302 may include configuration registers 306 and/or other storage devices 324, a processing circuit and/or control logic 312, a transceiver 310 and line drivers/receivers 314a and 314b. The processing circuit and/or control logic 312 may include a processor such as a state machine, sequencer, signal processor or general-purpose processor. The transceiver 310 may include a receiver 310a, a transmitter 310c and certain common circuits 310b, including timing, logic and storage circuits and/or devices. In some instances, the transceiver 310 may include encoders and decoders, clock and data recovery circuits, and the like.

A transmit clock (TXCLK) signal 328 may be provided to the transmitter 310c, where the TXCLK signal 328 can be used to determine data transmission rates for a CCIe communication mode. The TXCLK signal 328 may be embedded within sequences of symbols transmitted on the CCIe bus 330, when both the SDA wire 318 and the SCL wire 316 are used to encode transmitted data. In one example, the TXCLK signal 328 may be embedded using transition clock transcoding, whereby data to be transmitted over the physical link 330 is transcoded such that a change of state of at least one wire 316 and/or 318 occurs between each pair of consecutive symbols transmitted on the CCIe bus 330.

The CCIe devices 302, 320, and/or 322a-322n may communicate using the two-wires 316, 318 of the CCIe bus 330. For example, the two-wire CCIe bus 330 may support CCIe big-directional, half-duplex modes of communication that can provide significantly greater data rates than the data rates supported by I2C or CCI modes of operation. The CCIe devices 302, 320, and/or 322a-322n may transmit data on both the SCL wire 316 and the SDA wire 318 of the control data bus 330, with clock information embedded in a sequence of symbols transmitted on the two-wire control data bus 330. Certain CCIe devices 320 may be configured as a bus master, and certain devices 302, and/or 322a-322n may be configured as slave devices. The CCIe devices 302, 320, and/or 322a-322n may be compatible with, or coexist with I2C and/or CCI devices coupled to the control data bus 330, such that a CCIe device 302, 320, or 322a-322n may communicate with one or more other CCIe devices 302, 320, and/or 322a-322n using CCIe protocols and signaling specifications, even when I2C devices are monitoring the control data bus 330. One example disclosed herein provides an interface that can handle multiple slaves 302, and/or 322a-322n coupled to the bus, with a single master device 320, when both CCIe and I2C/CCI devices are deployed on the same bus. In the latter example, two or more CCIe devices 302, 320, and/or 322a-322n may communicate using CCIe protocols, and any communication transaction with an I2C or CCI device is conducted in accordance with I2C bus protocols.

According to certain aspects described herein, the CCIe devices 302, 320, and/or 322a-322n may be coupled to a shared interrupt request (IRQ) bus 326. According to one aspect, the shared IRQ bus 326 may be a single line coupled to the slave devices 302, and/or 322a-322n as well as to the master device 320. This shared IRQ bus 326 may be pulled up (e.g., pull high) when idle using a resistance 332 or the like. The shared IRQ bus 326 may be pulled low when a slave device 302, 322a-322n asserts an interrupt signal. That is, each slave device 302, 322a-322n may independently request access to transmit on the control data bus 330 by sending an IRQ signal to the master device 320.

In some examples, the single line IRQ bus 326 may be an asynchronous bus that is unmanaged by a master device 320 or any other device 302, 322a-322n. Accordingly, the slave devices 302, 322a-322n can unilaterally assert an IRQ signal at any time.

In another example, the single line IRQ bus 326 may be dedicated to unidirectional signal transmissions from slave devices to the master device. That is, the single line IRQ bus may be used for only IRQ signals and not other types of signals.

In one example, the control data bus 330 may be a CCIe compatible bus.

In another example, the control data bus 330 may be a bidirectional bus between the slave devices 302, 322a-322n and the master device 320.

A Second Example Illustrating Use of a Common IRQ Bus to Reduce IRQ Lines

Figure 4:
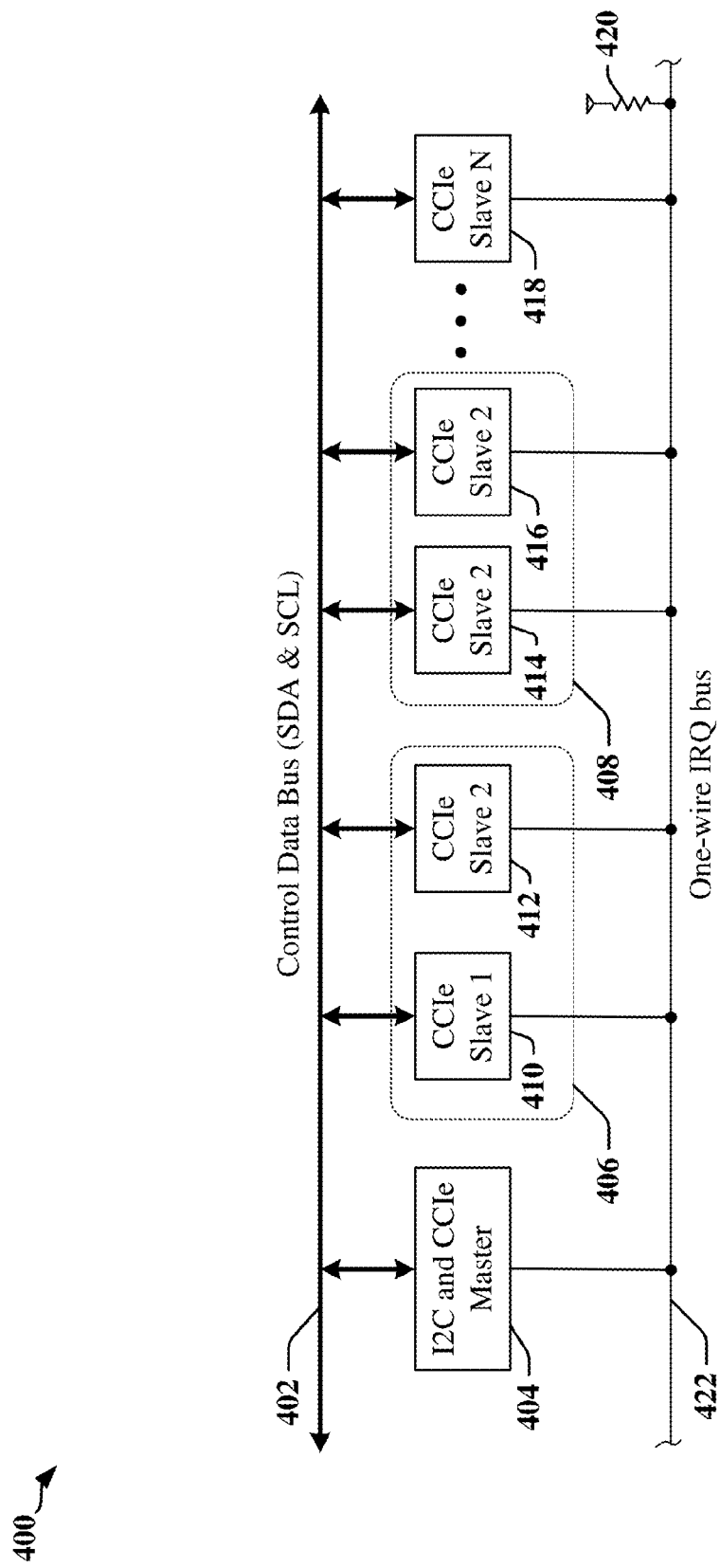
FIG. 4 is a block diagram illustrating how a single wire IRQ bus may be shared by a plurality of slave devices and one or more master devices according to certain aspects disclosed herein.

FIG. 4 is a block diagram 400 illustrating an example in which one or more slave devices 410, 412, 414, 416, 418 may request attention of a bus master 404 by asserting a predefined logic level on a common or shared single-line IRQ bus 422. A single-wire IRQ bus 420 may be shared by a plurality of slave devices 410, 412, 414, 416, 418, which may include I2C, CCI and/or CCIe devices. In the depicted example, each of the slave devices 410, 412, 414, 416, 418 may be adapted to support CCIe modes of communication, and the bus master device 404 may be adapted to serve as a bus master in I2C, CCI and CCIe modes of operation.

According to one aspect, a shared single-line IRQ bus 422 is coupled to the slave devices 410, 412, 414, 416, 418 to the master device 404. A pull-up resistance 420 may be coupled to the wire of the IRQ bus 422 in order to define the signaling state of the IRQ bus 422 when none of the slave devices 410, 412, 414, 416, 418 are asserting an interrupt request. In one example, the slave devices 410, 412, 414, 416, 418 may drive the IRQ bus 422 low to interrupt or request an interrupt of the master device 404. That is, each slave device 410, 412, 414, 416, and 418 may independently assert an interrupt request by driving the IRQ signal in order to request attention from the master device 404.

The common, shared single-wire IRQ bus 422 may be shared by a plurality of slave devices 410, 412, 414, 416, 418 by configuring each of the slave devices 410, 412, 414, 416, 418 to provide an indication of the identity of one or more slave devices 410, 412, 414, 416, and/or 418 that have asserted an interrupt request. In some instances, two or more of the slave devices 410, 412, 414, 416, 418 may contend for the attention of the master device 404, and the indication of the identity of these contending slave devices 410, 412, 414, 416, and/or 418 may be used to determine which request for attention from the master device 404 is to be granted. In one example, each slave device 410, 412, 414, 416, 418 may be configured to assert an interrupt request by driving the IRQ bus 422 for period of time that has a length corresponding to the identity of the device 410 412, 414, 416, 418 driving the IRQ bus 422.

In some instances, the length of a pulse used to drive the IRQ bus 422 may identify a group 406, 408 of the slave devices 410, 412, 414, 416, 418 that includes a slave device 410, 412, 414, 416, 418 that is contending for the attention from the master device 404. In one example, a first plurality of slave devices 410, 412 may be in a first group 406 and a second plurality of slave devices 414, 416 may be in a second group 408, and such groupings may be, for example, pre-configured or dynamically defined (by enumeration, for example) upon boot-up by the master device 108. Such groupings allow the master device 404 to more quickly identify which slave device triggered an IRQ signal on the IRQ bus 422 without unacceptable delays. Each slave device 410, 412, 414, 416, or 418 may be configured to generate a pulse having a width defined and/or assigned to a group 406, 408 to which the slave device 410, 412, 414, 416, or 418 belongs. For example, the slave devices 410 and 412 in a first group 406 may be configured to generate a pulse on the shared single-wire IRQ bus 422 that has a different duration than the duration of a pulse generated by the slave devices 414 and 416 in a second group 408. Each group 406 and 408 includes at least one slave device.

The duration of an assertion of the IRQ bus 422 may determine if a requesting slave device 410, 412, 414, 416, or 418 is granted the attention of the master device 404. In one example, a prioritization scheme may assign longer pulse widths to higher priority slave devices 410, 412, 414, 416, 418 and shorter pulse widths to lower priority slave devices 410, 412, 414, 416, 418, in operation, a first slave device 410, 412, 414, 416, or 418 may assert an interrupt request by providing a pulse on the IRQ bus 422. A second, higher-priority slave device 410, 412, 414, 416, or 418 may assert an interrupt request by providing a pulse on the IRQ bus 422 that has a longer width than the width of the pulse provided by the first slave device 410, 412, 414, 416, or 418. When the IRQ bus 422 has been asserted, the master device 404 may use the duration of the assertion of the IRQ bus 422 to identify the highest-priority group 406 or 408 that includes an asserting slave device 410, 412, 414, 416, and/or the highest-priority slave device 410, 412, 414, 416, or 418 that is asserting the IRQ bus 422. The master device may then use signaling on the control data bus 402 to scan an IRQ status register on one or more slave devices 410, 412, 414, 416, 418 that is assigned the pulse width that was observed on the IRQ bus 422.

In some instances, a first slave device 410, 412, 414, 416, or 418 may yield to a second slave device 410, 412, 414, 416, or 418 when the IRQ bus 422 continues to be actively driven after termination of the pulse provided by the first slave device 410, 412, 414, 416, or 418, indicating that at least the second, higher-priority slave device 410, 412, 414, 416, or 418 is also requesting the attention of the master device 404 by driving the IRQ bus 422 with a longer pulse width. In such circumstances, the first slave device 410, 412, 414, 416, or 418 may revert to an idle or dormant mode until a next opportunity to contend for the control data bus 402 arises.

In some instances, the single wire IRQ bus 422 may be shared by slave devices 410, 412, 414, 416, 418 and one or more master devices 404. In this example, the slave devices 410, 412, 414, 416, 418 may be logically grouped. For example, a first group 406 may include a first plurality of slave devices 410, and 412, and a second group 408 may include a second plurality of slave devices 414, and 416. Such groupings may be, for example, pre-configured, dynamically defined and/or defined by enumeration by the master device 404 at initialization. The use of groups 406, 408 may permit the master device 404 to more quickly identify one or more slave devices 410, 412, 414, 416, and/or 418 that assert an interrupt request by driving the IRQ bus 422.

In some instances, the single-line IRQ bus may operate asynchronously, without management of a master device 404 or another device. In asynchronous operation, a slave device 410, 412, 414, 416, or 418 may unilaterally drive the IRQ bus 422 at any time. In some instances, the slave devices 410, 412, 414, 416, 418 may confirm that IRQ bus 422 is idle (i.e. not driven by another device) prior to asserting an interrupt request.

In some instances, the single-line IRQ bus 422 may be dedicated to unidirectional signal transmissions from slave devices 410, 412, 414, 416, 418 to the master device 404. That is, the IRQ bus 422 may be reserved for interrupt request signaling and other types of signals are not supported on the IRQ bus 422.

Groups 406, 408 of slave devices 410, 412, 414, 416 may be configured to use a distinct IRQ signal. In one example, a first group 406 may use a first signal having a first period, a second group 408 may use a second signal having a second period, and so on. In some instances, a slave device 418 that is not grouped with another slave device may be treated as a group of one device, and may be assigned to use a third signal having a third period. The period of an IRQ signal may be defined as the length of time for which the IRQ bus 420 is driven (e.g. pulled low) by the asserting slave device 410, 412, 414, 416, or 418. Other forms of signal differentiation may be used. For example, different IRQ signal voltage levels may be assigned to different groups 406, 408 of slave devices 410, 412, 414, 416, and/or a slave device 418 that is unassigned to a group or otherwise treated as the sole member of a group.

In some instances, a group 406, 408 may define a logical group of slave devices 410, 412, 414, 416, 418, such that each group 406, 408 may include at least one slave device 410, 412, 414, 416, 418. A group 406, 408 may include multiple slave devices 410, 412, 414, 416, 418. The number of slave devices 410, 412, 414, 416, 418 assigned to each group 406, 408 may be determined based on factors such as the duration of time to query and identify each potential asserting slave device 410, 412, 414, 416, 418 in the group 406, 408. For instance, an unacceptably long delay may result when all slave devices 410, 412, 414, 416, 418 couple to the IRQ bus 422 are queried by the master device 404.

The time to identify an asserting slave device 410, 412, 414, 416, 418 may be substantially reduced through the use of distinct IRQ signals to identify a group 406, 408 in which a slave device 410, 412, 414, 416, 418 has asserted an IRQ, and then querying each member slave device 410, 412, 414, 416, 418 in the identified group 406, or 408. The master device 404 may detect the occurrence of an assertion of the IRQ bus 422, and the master device 404 may determine the duration of the assertion. Based on the determined duration of the IRQ assertion, the master device 404 may identify a group 406 or 408 corresponding to a duration of the length observed by the master device 404. The master device 404 may then query each slave device 410, 412, 414, 416, 418 in the group 406, 408 to identify which slave device triggered or asserted the IRQ signal. In one example, the master device 404 may determine that an IRQ assertion originated from a first group 406. The master device 404 may transmit a request or command over the control data bus 402 to a first slave device 410, or 412. The master device 404 may transmit a register status request, for example. In response, the first slave device 410, or 412 may transmit status information to the master device 404. If the status information indicates that the first slave device 410, or 412 is not the source of the IRQ request, the master device 404 may transmit a register status request over the control data bus 402 to a second slave device 412, or 410 in the first group 406. This process may be repeated for all slave devices 410, 412 the first group 406 until a slave device 410, 412 that asserted the IRQ signal is identified.

Figure 5:
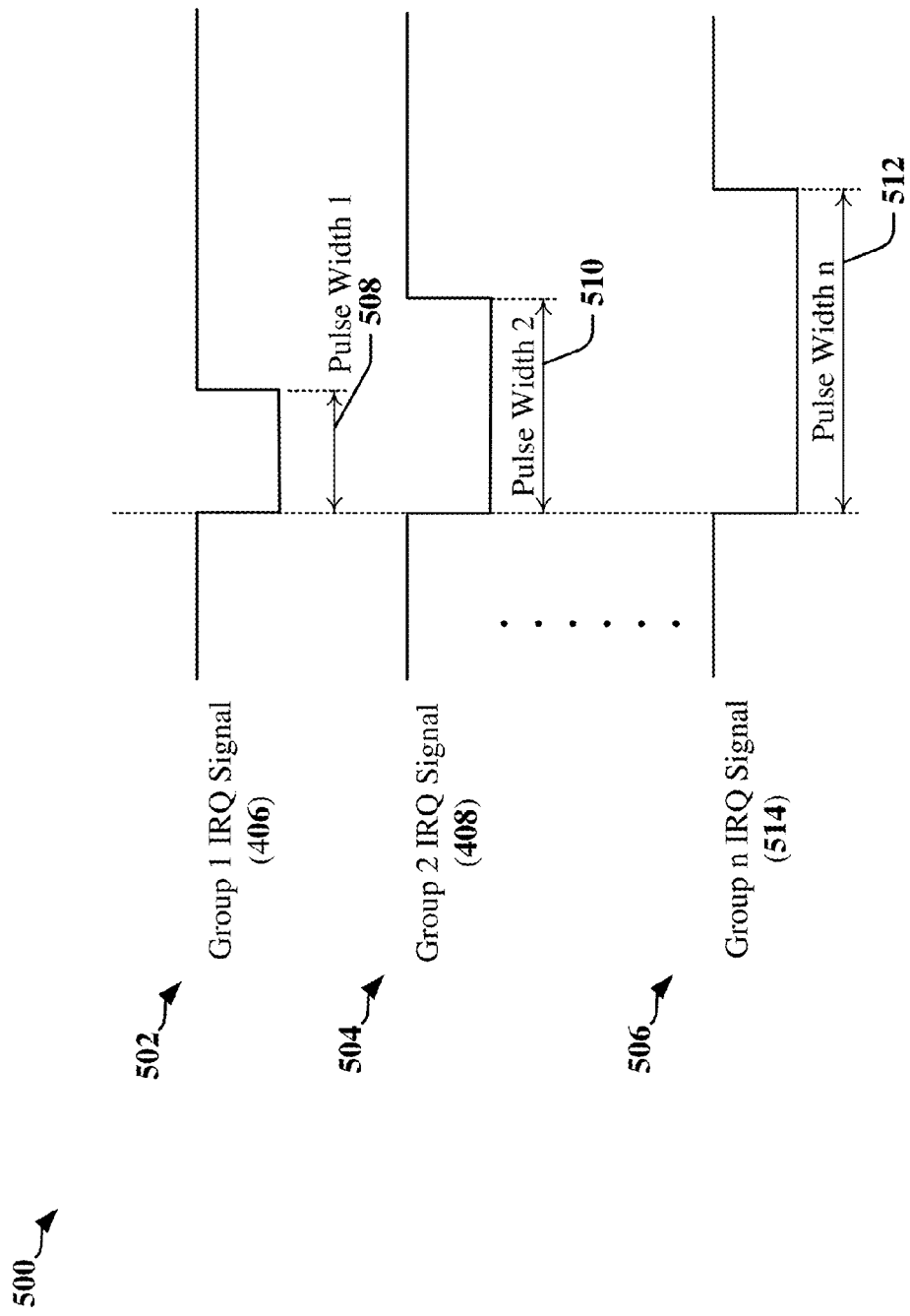
FIG. 5 illustrates examples of different IRQ signals that may be assigned or associated with different groups according to certain aspects disclosed herein.

FIG. 5 is a timing diagram 500 illustrating examples of timing of IRQ signals 502, 504, 506, used by different groups 406, 408, 514, respectively. Different IRQ signal timing may be assigned or associated with each different group 406, 408, 514, and/or the IRQ signal timing of the member slave devices 410, 412, 414, 416, 418 of each group 406, 408, or 514 may be based on, or derived from the IRQ signal timing assigned or associated with the corresponding group 406, 408, 514. Each group 406, 408, 514 may include a single one of the member slave devices 410, 412, 414, 415, 418 or a plurality of the member slave devices 410, 412, 414, 416, 418. A first group 406 may use an IRQ signal 502 having a first pulse width 508, a second group 408 may use an IRQ signal 504 having a second pulse width 510, and an nth group 506 may be configured to use a third IRQ signal 506 having a third pulse width 512.

Figure 6:
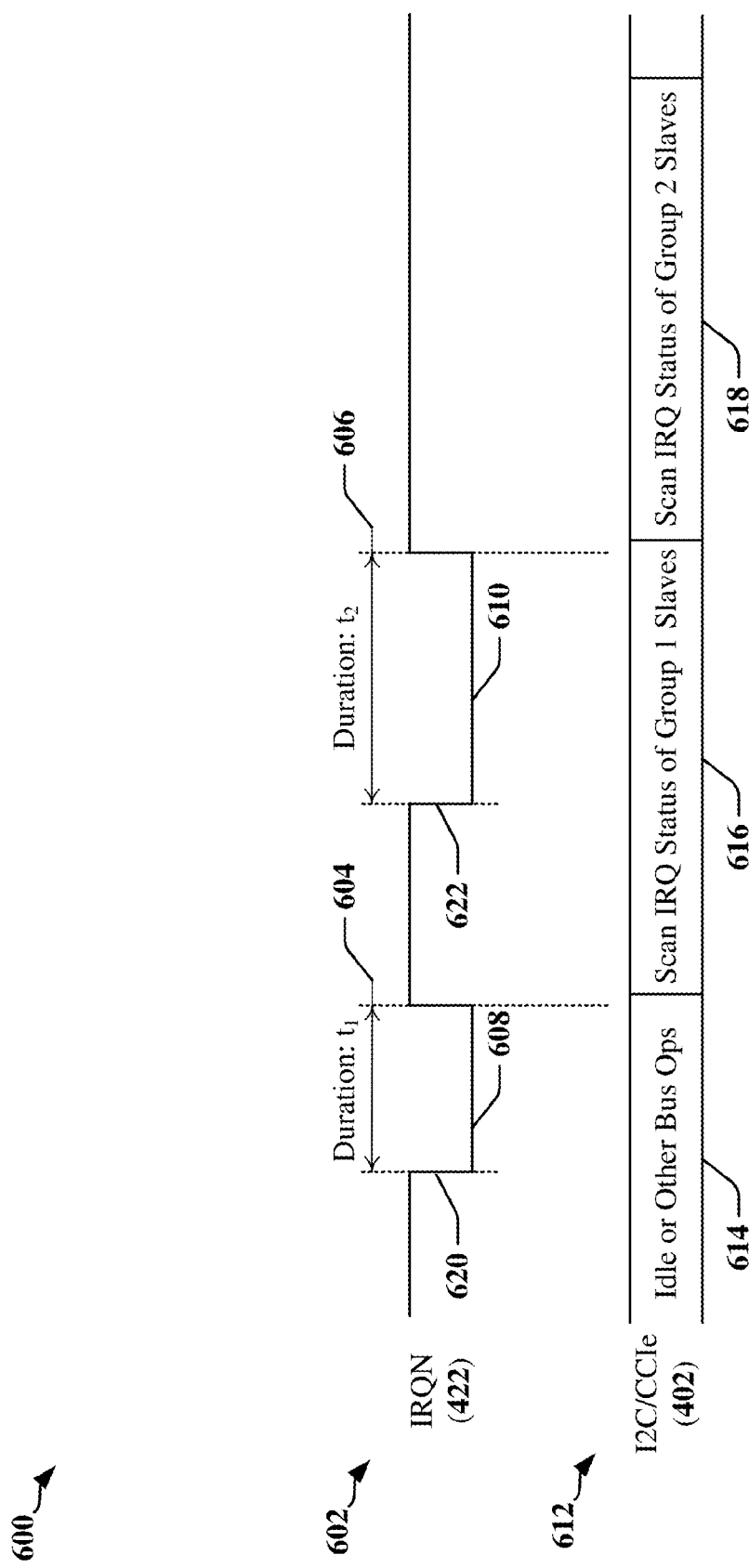
FIG. 6 illustrates monitoring for IRQ signals and identification of an IRQ-asserting slave device by a master device according to certain aspects disclosed herein.

FIG. 6 illustrates the operation of a shared IRQ bus 422 from the perspective of a bus master device 404. The example may apply to timing 612 of operations on a control data bus 402 that is operated in accordance with I2C, CCI and/or CCIe protocols. The bus master device 404 may monitor the timing 602 of signals on the IRQ bus 422 to determine whether an interrupt request has been asserted. The bus master device 404 may identify the slave device asserting the interrupt request based on the duration 604, 606 of a pulse 608, 610 on the IRQ bus 422.

In the example, groups 406, 408 of slave devices may be configured to drive the IRQ bus 422 for predefined periods of time 604, 606. Accordingly, the bus master device 404 may monitor the AIR bus 422 for pulses 608 and 610, and may measure or time the durations 604, 606 of any detected pulses 608, 610. In one example, the bus master device 404 may include a timer or counter that is initiated upon detecting a transition 620, 622 at the beginning of the pulse 608, 610. The timer or counter value after the termination of the pulse 608, 610 may then be compared to the predefined durations associated with each group 406, 408.

In the example, the data control bus 402 may be idle during a first period of time 614, before a first pulse 608 is received. When a first IRQ signal is asserted on the shared single line IRQ bus 422, the bus master device 404 detects that the IRQ bus has been pulled low, and determines the period, width, or duration 604 of the pulse. For example, the bus master device 404 may determine that the duration 604 of the first pulse 608 is consistent with an interrupt request from a member of a first group of devices 406 upon termination of the first pulse 608. The bus master device 404 may initiate a scan 616 of the members of the first group of devices 406 to determine their IRQ status and identify which member or members of the first group 406 asserted the IRQ request 608. In one example, the bus master device 404 may transmit commands and/or requests on the control data bus 402 to each member of the first group 406 that cause the recipient of each request to respond with IRQ status. The bus master device 404 may exchange data, control and other information with the identified interrupting member of the first group 406.

A second interrupt request pulse 610 may be received at some point after the first interrupt request pulse 608. The second interrupt request pulse 610 may have a duration 606 that corresponds to a second group of slave devices 408. Upon receipt of the second interrupt request pulse 610, the bus master device 404 may detect, determine or calculate the pulse width, period, or duration 606. The bus master device 404 may then initiate a scan 618 of the members of the second group of devices 409 to determine their IRQ status, and to identify which member or members of the second group 408 asserted the IRQ request corresponding to the second pulse 610.

Figure 7:
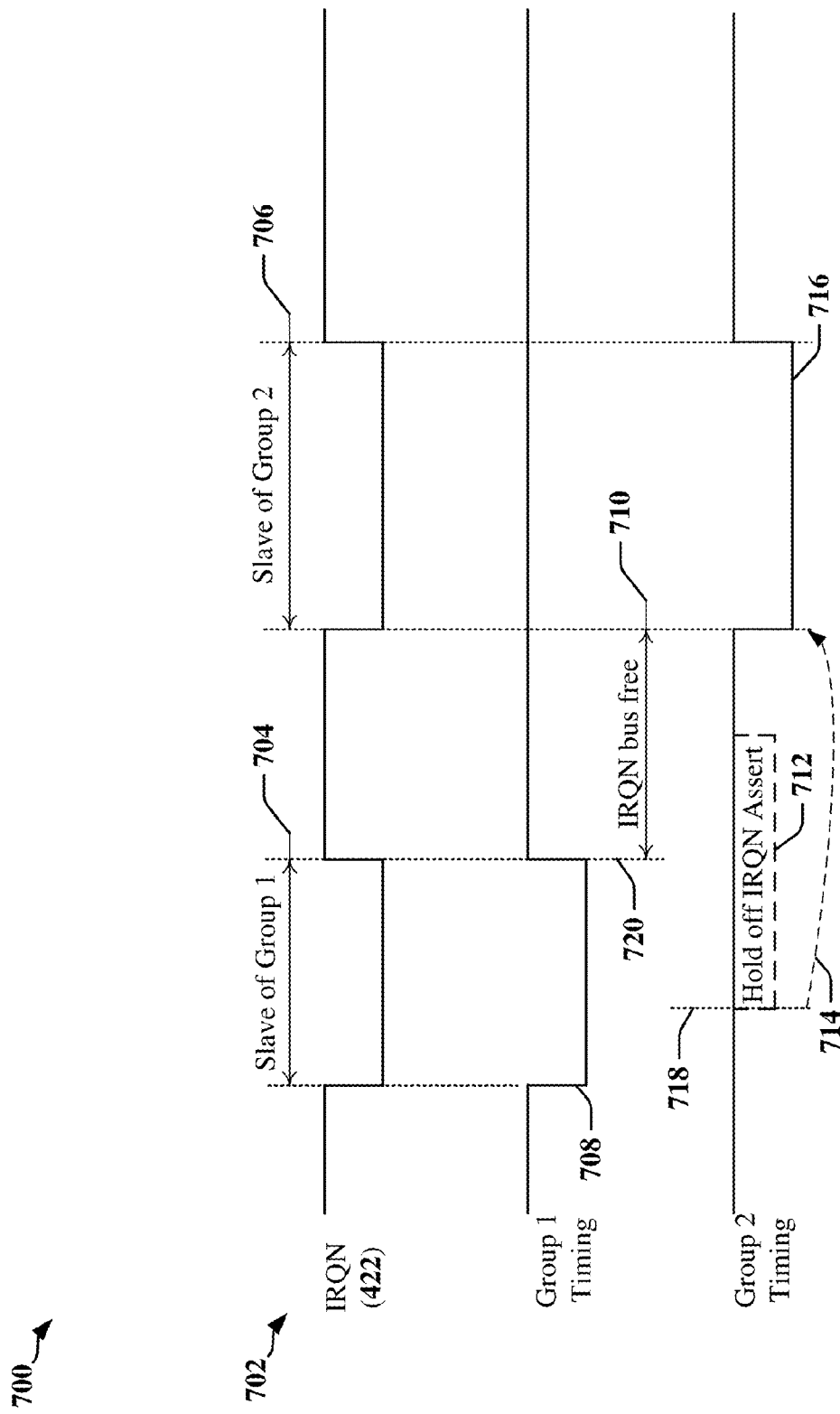
FIG. 7 illustrates a first technique that can avoid simultaneous assertions of IRQs on a shared single line IRQ bus according to certain aspects disclosed herein.

FIG. 7 is a timing diagram illustrating a method for avoiding the occurrence of simultaneous, overlapping, and/or conflicting interrupt requests according to certain aspects disclosed herein. In some instances, it may be desirable to avoid the occurrence of overlapping IRQ pulses that may lead to conflicting or contending interrupt requests. Conflicting interrupt requests may be avoided by configuring the slave devices to monitor the IRQ bus 422 prior to asserting an interrupt request. Interrupt requests 712 may be deferred 714 if another device has already asserted an interrupt request 708 on the shared single line IRQ bus 422.

In the depicted example, a first pulse 704 is asserted on the IRQ bus 422 by a slave device from the first group of devices 406. A second slave device may wish to assert an interrupt request during the duration 704 of the first pulse 708. According to one aspect, the second slave device may delay assertion of the interrupt request on the IRQ bus 422. At a time 718, the second slave device may decide to initiate an interrupt request. Upon checking the IRQ bus 422, the second slave device may determine that a pulse 708 has been asserted on the IRQ bus 422 by another slave device. Accordingly, the second device may initiate a hold-off or delay period 712 to allow the IRQ bus 422 to return to an idle state. The hold-off period 712 may have a predefined duration, a duration that includes a minimum back-off period and/or a random delay, or a period that terminates a predefined time after the IRQ bus 422 returns to an idle state. The second slave device may be precluded from asserting an interrupt request for a minimum period of time 710 during which the IRQ bus 422 is to be free or idled. The IRQ bus free time period 710 may be measured from the point in time 720 at which the first pulse 708 on the IRQ bus 422 terminates and, for example, the IRQ bus 422 returns to a logic high state. The next interrupt request 716 may be asserted after the minimum bus free time 710 expires. Upon expiration of the minimum bus free time 710, the second slave device may assert an interrupt request by providing a pulse 716 on the IRQ bus 422. In the example, the second slave device is a member of the second group of slave devices 408, and the duration 706 of the second pulse 716 may be different from the duration 704 of the first pulse 708.

Figure 8:
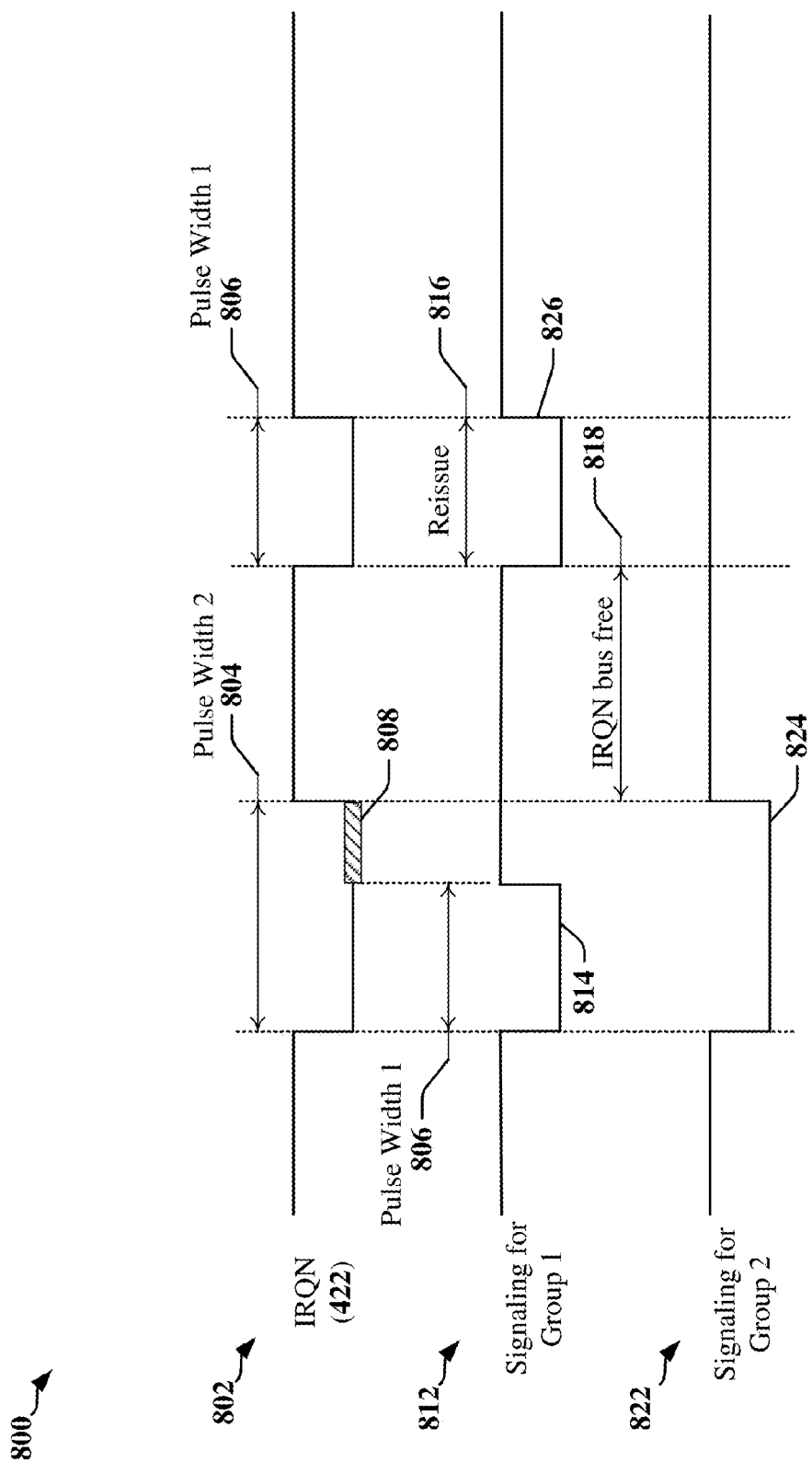
FIG. 8 illustrates a second technique that can handle simultaneous assertions of IRQs on a shared single line IRQ bus according to certain aspects disclosed herein.

FIG. 8 is a timing diagram 800 that illustrates an example of a mode of operation of a single-line IRQ bus that may be employed when simultaneous IRQ signals are supported by an I2C, CCI, and/or CCIe interface, The simultaneous IRQ signals may result in contentions and/or conflicts between individual slave devices and/or between slave devices in different groups 406, 408 that use a shared single IRQ bus 422. The timing of signals on the IRQ bus 422 is illustrated in a first timing chart 802, while the contributions by slave devices in the first and second groups 406, 408 are illustrated in second and third timing charts 812, 822, respectively. A first IRQ pulse 814 is asserted by a first slave device in the first group 406 at the same time or concurrently with a second IRQ pulse 824 asserted by a second slave device in a second group 408. The second IRQ pulse 824 may have a longer duration 804 than the duration of the first pulse 806. After the termination of the first pulse 814, the first slave device may recognize that a higher priority device has asserted an interrupt request because of the presence of a portion 808 of the second pulse 824 on the IRQ bus 422. The first slave device may recognize this condition 808 of the IRQ bus 422 as an effective collision, contention or conflict by monitoring the IRQ bus 422 after termination of the first pulse 814. The first device may then determine that the second slave device has a higher priority and may defer a renewed request until after the IRQ bus free period 818, which commences after termination of the second pulse 824. The bus master device 404 may detect the duration of the second pulse 824 and address the second group 408 of devices to identify and service the source of the interrupt request. The bus master device 404 may not be aware of the first pulse 814.

The first slave device may reissue its interrupt request by providing a third pulse 826 on the IRQ bus 422 after expiration of the IRQ bus free period 818.

Figure 9:
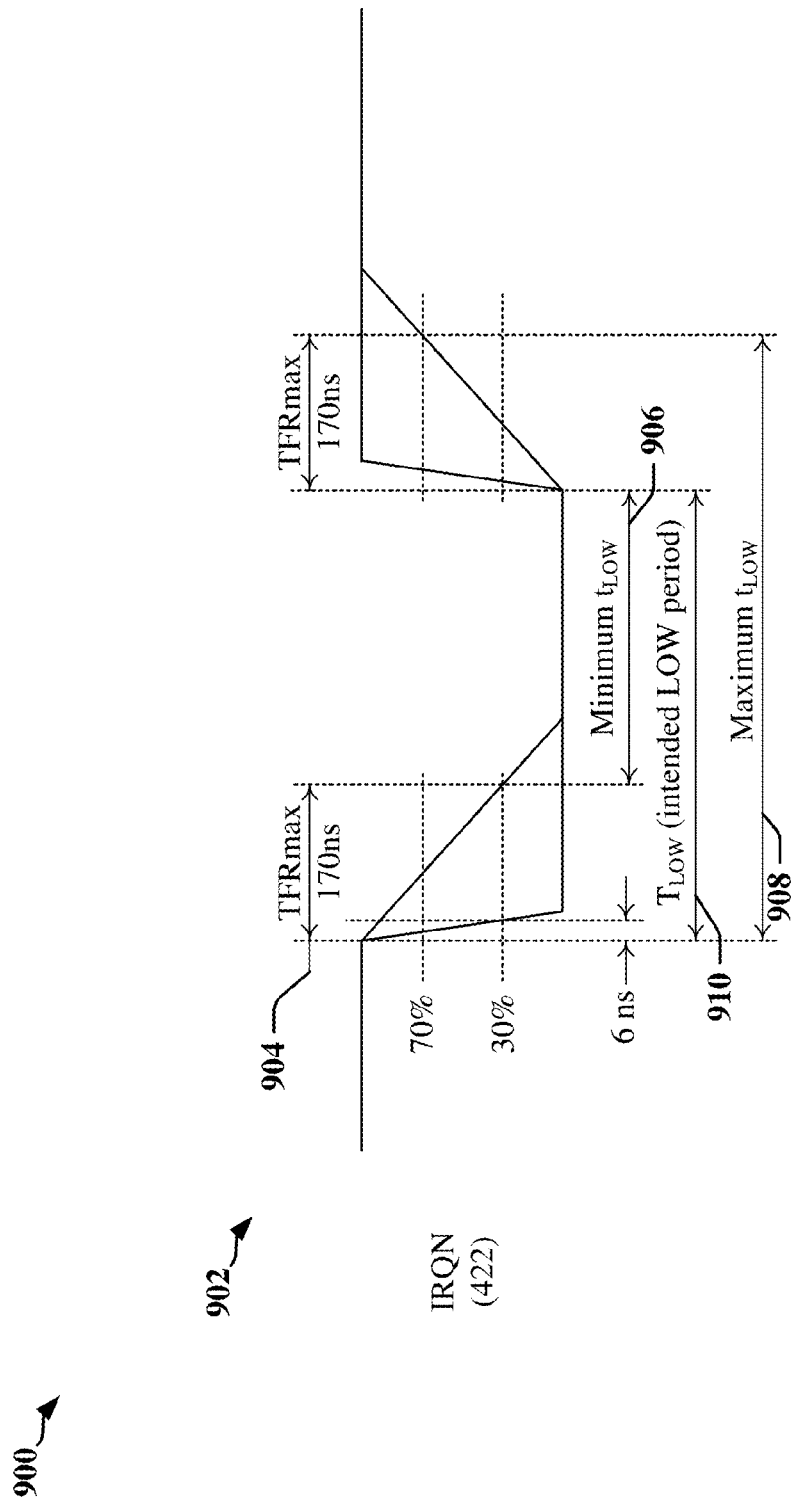
FIG. 9 illustrates timing associated with a shortest IRQ signal length.

FIG. 9 is a timing diagram 900 illustrating the timing tolerance related to an IRQ pulse, where the tolerances may be determinative of the minimum IRQ pulse width. In some instances, protocols governing signaling on the I2C, CCI, and/or CCIe interface may define a minimum value for the low duration ($t_{LOW}$) 906 to permit detection by an I2C, CCI, and/or CCIe master device 404, although for the purposes of this description it may be assumed that the low duration may not be subject to a specified minimum. The timing diagram 900 illustrates a single pulse 902.

In the example timing diagram 900, the minimum threshold voltage for detecting a "high" signaling state is at 70% of switching circuit supply voltage ("VDD") level and the maximum threshold voltage for detecting a "low" signaling state is 30% of VDD level. A receiver may determine either a high or low signaling state for a voltage level of the IRQ bus 422 that lies between 30% and 70% of VDD level, depending on receiver input levels. A maximum fall-rise time (TFRmax) 904 may be defined. The duration of TFRmax 904 may be determinative of the duration of a low period ($T_{LOW}$) 910 assigned to a slave device for asserting an interrupt request. The value of $T_{LOW}$ 910 may be selected to enable a master device 404 to distinguish between IRQ signals from different groups of slave devices. From the perspective of the master device 404, a low condition may be observed on the IRQ bus 422 if:

$$TRFmax < T_{LOW}.$$

In order to distinguish between groups 406, 408 of slave devices, different units of $T_{LOW}$ may be assigned as the IRQ pulse width for the groups 406, 408. In one example, a first group 406 may be assigned an IRQ pulse width of $T_{LOW}$, while a second group 408 may be assigned an IRQ pulse width of $2 \times T_{LOW}$. In this example, the low period observed by the bus master device 404 may be calculated as follows:

First group 406: $T_{LOW} - TFR < t_{LOW} < T_{LOW} + TFR$

Second group 406: $2T_{LOW} - TFR < t_{LOW} < 2T_{LOW} + TFR.$

Note that after a first slave device asserts IRQ signal low, a second slave device may not detect IRQ signal low for a period of time extending TFRmax to $t_{LOWmin}$, which must be at least TFRmax in duration. Therefore, TLOW>3TFR max, and tLOW min >2TFRmax. Accordingly, a minimum value for $t_{LOW}$ 906 may be calculated as follows:

$$2T_{LOW} - TFR > T_{LOW} + TFR$$

$$\rightarrow 2TFRmax < T_{LOW}$$

$$\rightarrow 3TFRmax < T_{LOW}$$

$$\rightleftarrows 2TFRmax < t_{LOWmin}.$$

The side-band IRQ method illustrated in FIGS. 3-9 requires the use of an extra pin for each slave and master device. Slave devices in particular are often limited in size/space available and it would be desirable to eliminate the use of side-band interrupts.

In-Band Interrupt Mechanism Over Shared Bus

Figure 10:
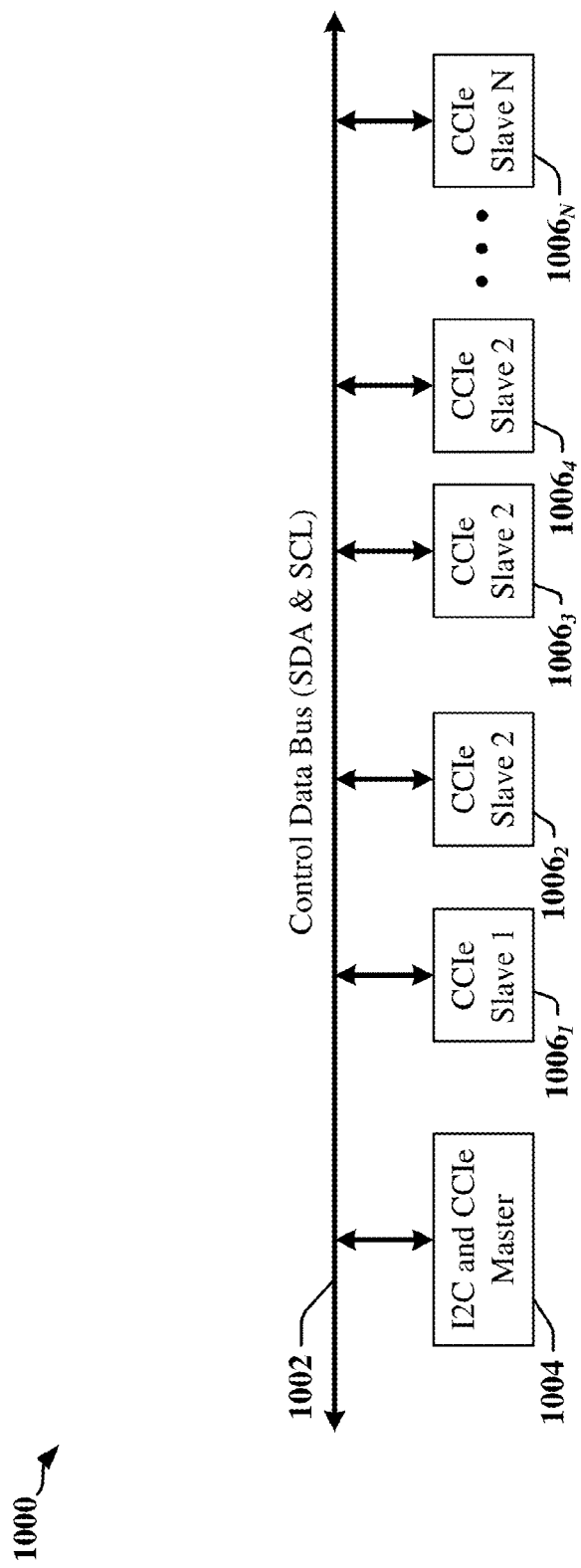
FIG. 10 is a block diagram illustrating a plurality of slave devices that may be configured for in-band interrupt according to certain aspects disclosed herein.

FIG. 10 is a block diagram illustrating a system 1000 in which the interrupt bus has been eliminated in favor of in-band interrupts. The system 1000 may include a master device 1004 and a plurality of slave devices 1006$_1$-1006$_N$ coupled to a shared control data bus 1002. In one example, the control data bus 1002 may be an I2C bus comprising two wires, a clock line (SCL) and a serial data line (SDA). The clock line SCL may be used to synchronize all data transfers over the I2C bus 1002. The data line SDA and clock line SCL are coupled to all devices 1004 and 1006$_1$-1006$_N$ on the I2C bus 1004. In this example, interrupts are sent in-band over the data control bus 1002. In some instances, the data control bus 1002 may support both I2C devices and CCIe devices at the same time.

Figure 11:
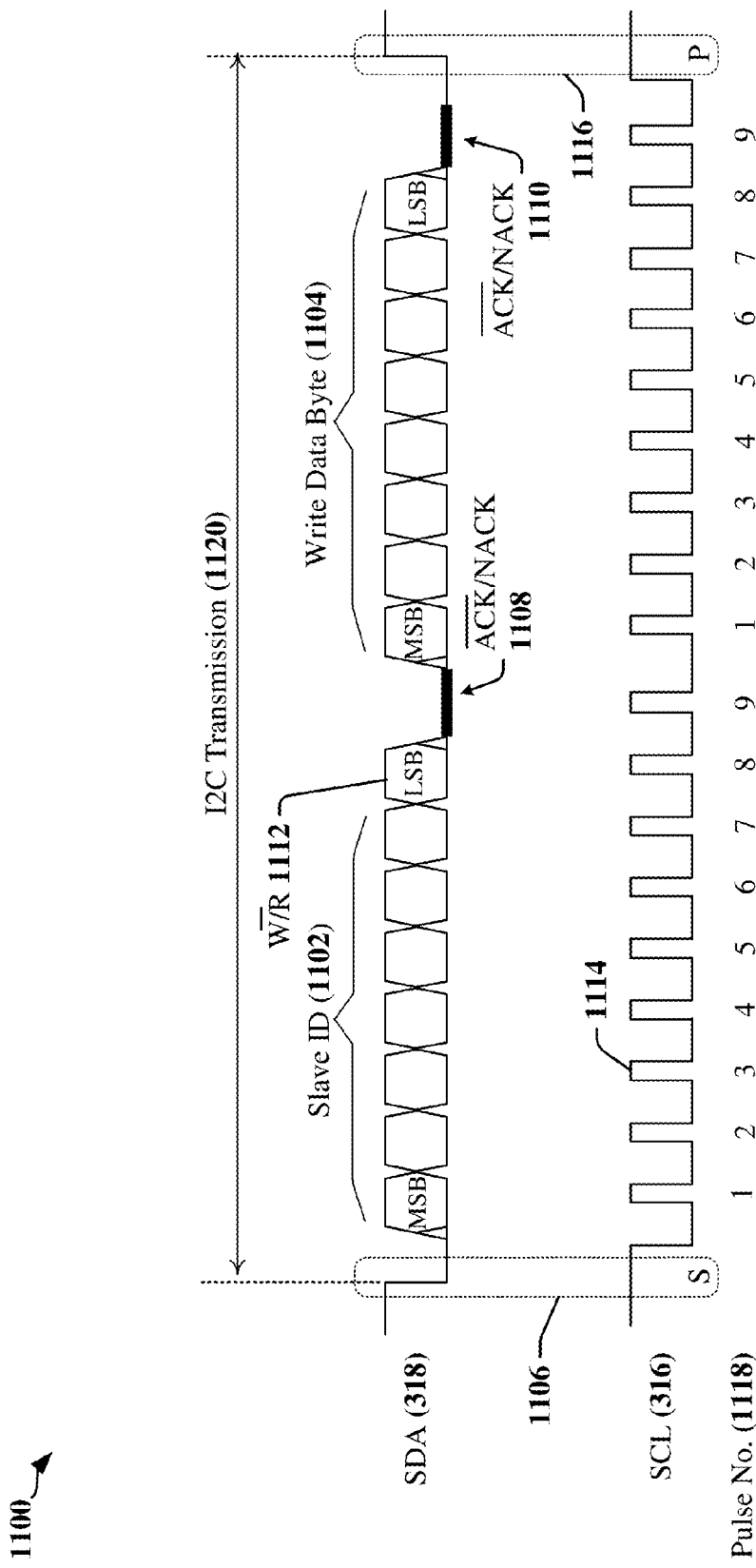
FIG. 11 is a timing diagram illustrating an I2C one byte write data operation.

FIG. 11 is a timing diagram 1100 illustrating an example of single-byte write data operation when the serial bus 330 (see FIG. 3) is operated in accordance with I2C protocols. Each I2C transmission 1120 commences with a start condition 1106 that is asserted on the serial bus 330, and terminates when a stop condition 1116 is asserted on the serial bus 330. The start condition 1106 is asserted when the SDA signal wire 318 transitions low while the SCL signal wire is held in a high state. The stop condition 1116 is asserted when the SDA signal wire 318 transitions high while the SCL signal wire is held in a high state. According to I2C protocols, transitions on the SDA signal wire 318 occur when the SCL signal wire 316 is low, except for start condition 1106 and stop conditions 1116.

In typical I2C operations, an 2C master node sends a 7-bit slave ID 1102 on the SDA line 318 to indicate which slave node on the I2C bus the master node wishes to access, followed by a Read/Write bit 1112 that indicates whether the operation is a read or a write operation, whereby the Read/Write bit 1112 is at logic 0 to indicate a write operation and at logic 1 to indicate a read operation. Only the slave node whose ID matches with the 7-bit slave ID 1102 is permitted respond to the write (or any other) operation. In order for an I2C slave node to detect its own ID 1102, the master node transmits at least 8-bits on the SDA line 318, together with 8 clock pulses on the SCL line 316. This behavior may be exploited to transmit data in CCIe operating modes in order to prevent legacy I2C slave nodes from reacting to CCIe operations.

Figure 12:
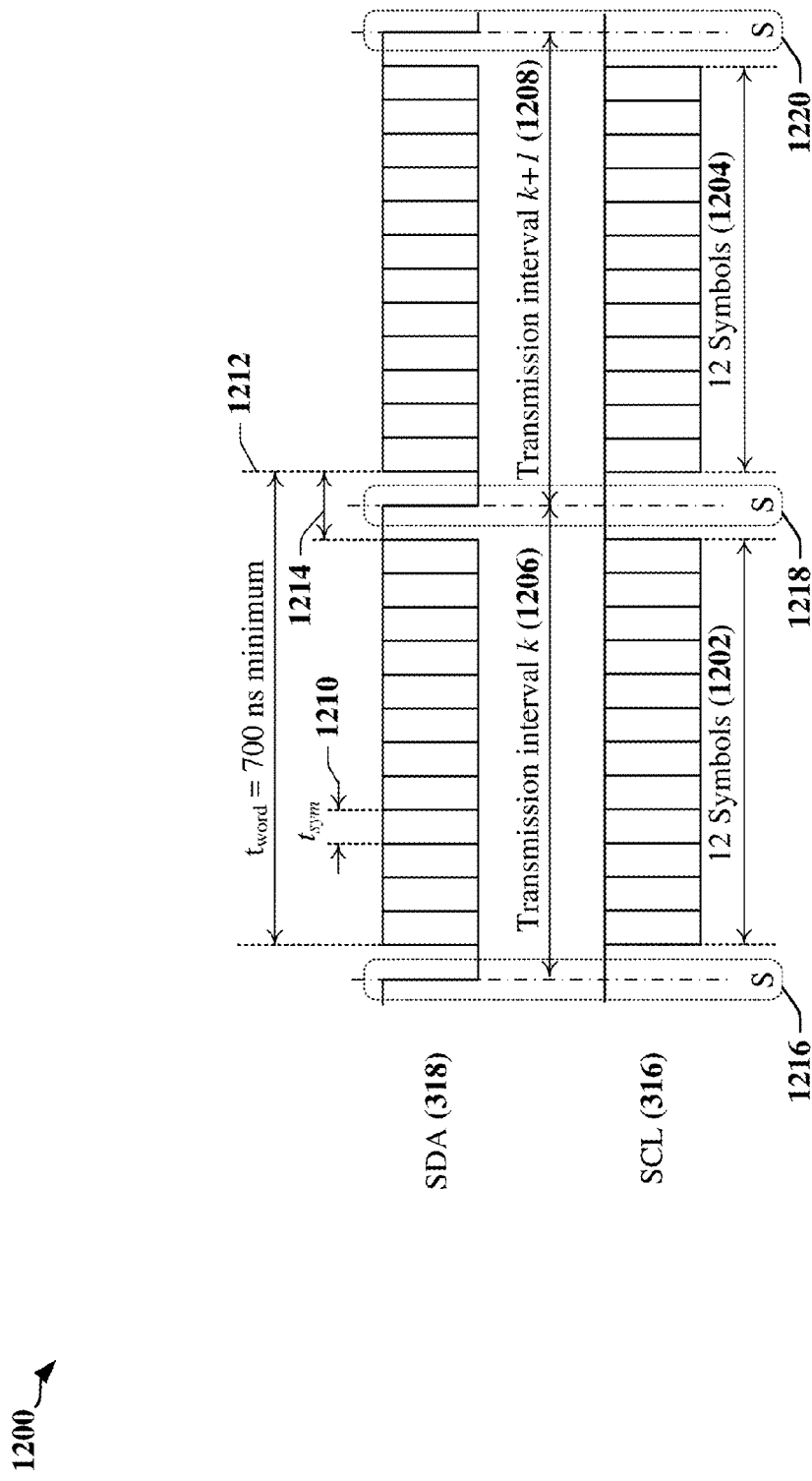
FIG. 12 is a timing chart illustrating an example of data transmissions on a serial bus in accordance with CCIe protocols.

FIG. 12 is a timing diagram 1200 that illustrates data transmission on a serial bus 330 that is operated in accordance with CCIe protocols, and when two or more communicating devices 202, 220, 222a-222n are configured or adapted to communicate in accordance with CCIe protocols. In a CCIe transmission, data bits may be transcoded into twelve symbols for transmission over the SDA line 318 and the SCL line 316, and the mode of transmission may be referred to as "CCIe mode." CCIe mode is source synchronous, driven by push-pull drivers. A device that transmits data over the control data bus 330 also transmits clock information embedded in the data. Consequently, only one device on the control data bus is allowed to drive the bus at any one time.

In certain CCIe modes of operation, data is encoded into a set of two-bit symbols transmitted sequentially on the signal wires 316, 318 of the CCIe bus. Sequences of symbols 1202, 1204 may be transmitted in successive transmission intervals 1206, 1208. Each sequence of symbols 1202, 1204 is preceded by a start condition 1216, 1218, 1220. The start conditions 1216, 1218, 1220 are asserted when the SDA signal wire 318 transitions low while the SCL signal wire is held in a high state. According to CCIe protocols, transitions on the SDA signal wire 318 may occur at the same time that transitions occur on the SCL signal wire 316 when a sequence of symbols 1202, 1204 is being transmitted. In some CCIe modes, start conditions 1216, 1218, 1220 may occupy two symbol intervals.

In the illustrated example, each sequence of symbols 1202, 1204 includes 12 symbols and encodes 20-bit data elements that may include 16 bits of data and 3 bits of overhead. Each symbol in the sequence of 12 symbols 1202, 1204 defines the signaling state of the SDA signal wire 318 and the SCL signal wire 316 for each symbol period ($t_{sym}$) 1210. In one example, push-pull drivers 214a, 214b used to drive the signal wires 316, 318 may support a symbol period 1210 of 50 ns duration, using a 20 MHz symbol clock. The two-symbol sequence, which may be denoted as {3,1}, is transmitted in the period 1214 between consecutive sequences of symbols 1202 and 1204. For the resulting 14-symbol transmission (12 symbols payload and a start condition 1216, 1218, 1220), the minimum elapsed time 1212 between the start of a first transmission 1206 and the start of a second transmission 1208 may be calculated as:

$t_{word} = 14 \times t_{sym} = 700$ ns

Thus, 20 bits may be transmitted every 700 ns, yielding a raw bit rate of approximately 28.6 Mbps with a useful bit rate of approximately 22.86 Mbps, since 16 data bits are transmitted in each 12 symbol word 1206, 1208.

Figure 13:
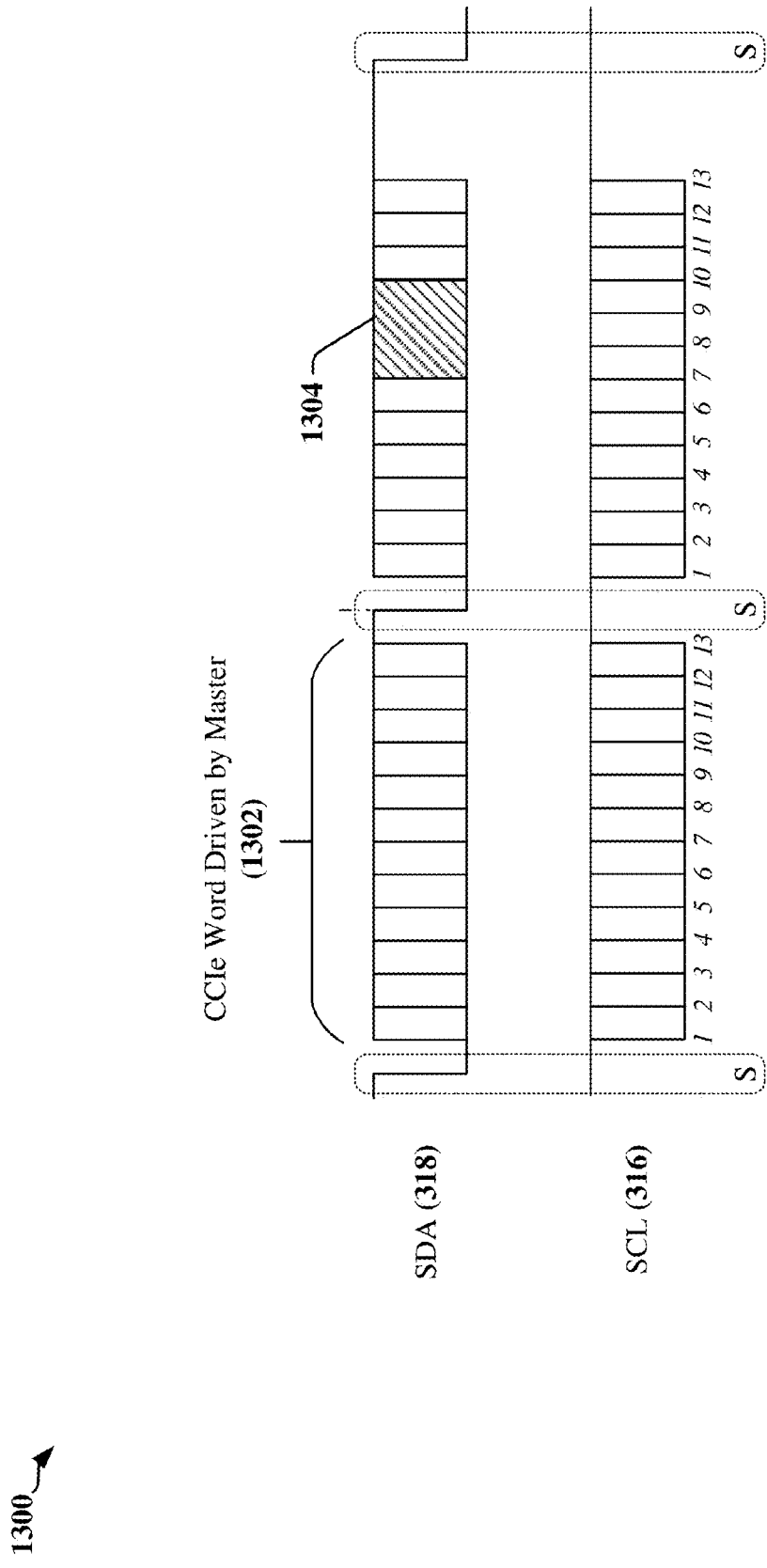
FIG. 13 is a timing diagram illustrating the potential occurrence of a collision.

The master device controls access to the bus, and any device that wishes to transmit over the control data bus 330 is required to request a grant of access to the control data bus 330 from the master device. Such request may be made by issuing an interrupt request. According to certain aspects, a CCIe device may issue an interrupt request through an in-band interrupt mechanism that occurs according to predefined timing. The use of such an in-band interrupt mechanism can prevent bus contention and/or collisions. FIG. 13 includes a timing diagram 1300 that illustrates the occurrence of a collision 1304. Collisions 1304 may be avoided when an interrupt mechanism prevents slave devices from driving either the SDA line 318 or SCL line 316 of the control data bus 330 while the master device is driving 1302 the control data bus 330.

Figure 14:
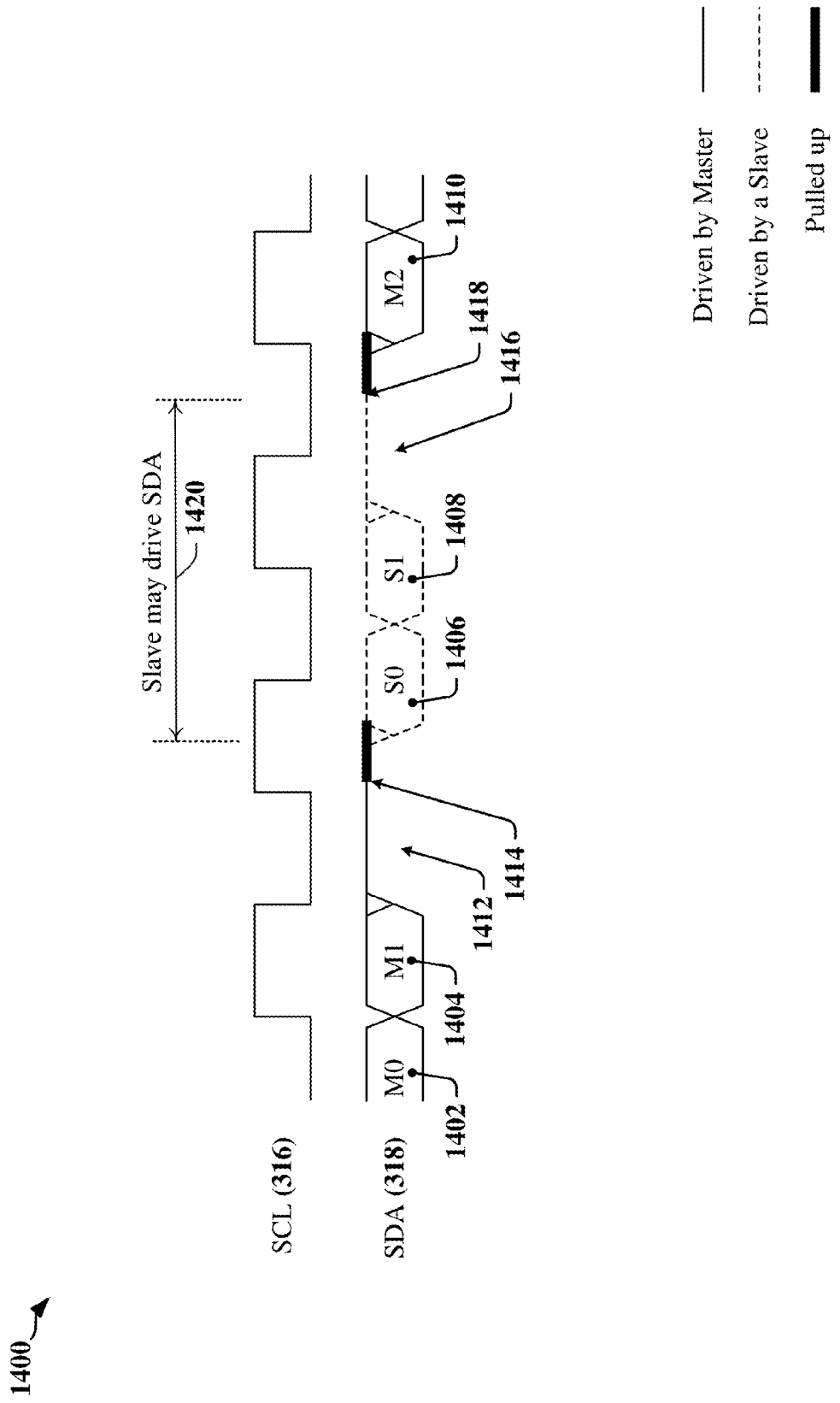
FIG. 14 is a timing diagram illustrating a technique for avoiding the collision illustrated in FIG. 13.

FIG. 14 is a timing diagram 1400 that illustrates a solution to avoid the potential for collisions of FIG. 13. In this approach, the protocol defines when an in-band IRQ may be issued. In one example, the master device may drive the clock on the SCL line 316 during a defined period of time 1420 when the slave is permitted to drive the SDA line 318. In operation, the master device may drive the SDA line 318 high and enable a pull-up to maintain the high state after transmitting 1402, 1404 on the SDA line 318. The SDA line 318 may be released at some point 1414, after which a slave may transmit 1406, 1408 on the SDA line 318. The slave may then drive 1416 the SDA 318 high and release the SDA line 318 at a point in time 1418. The master device may then begin transmitting 1410 on the SDA line 318.

Figure 15:
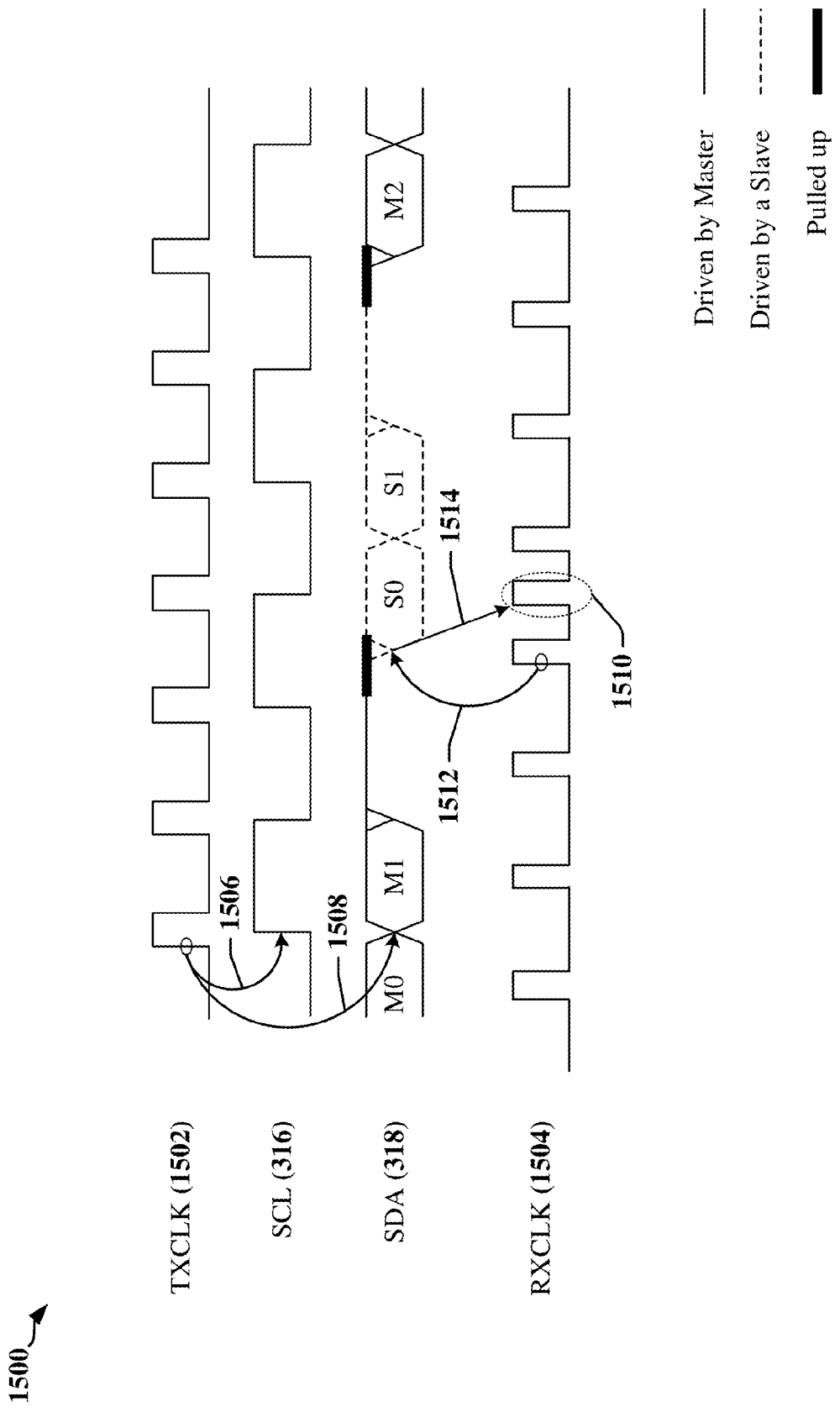
FIG. 15 is a timing diagram illustrating the potential occurrence of an additional or erroneous clock pulse when in-band IRQ is used.

As illustrated in the timing diagram 1500 of FIG. 15, an in-band IRQ sent by a slave device on the SDA line 318 may cause an erroneous clock 1510 to be detected. In CCIe mode, symbol transitions are used to generate a receiver clock (RXCLX) 1504. All receiving devices recover clock timing from state transitions of the control data bus 330. The state transitions correspond to signaling state changes of the SDA line 318 and/or the SCE line 316, and the state transition is to be timing aligned between the SDA line 318 and the SCL line 316. A CCIe clock data recovery (CDR) circuit may tolerate some skew between the SDA line 318 and the SCL line 316, although skew larger than CDR's tolerance can cause the CDR to generate the extra receiver clock pulse 1510 resulting a synchronization loss at the CCIe word boundary.

Figure 16:
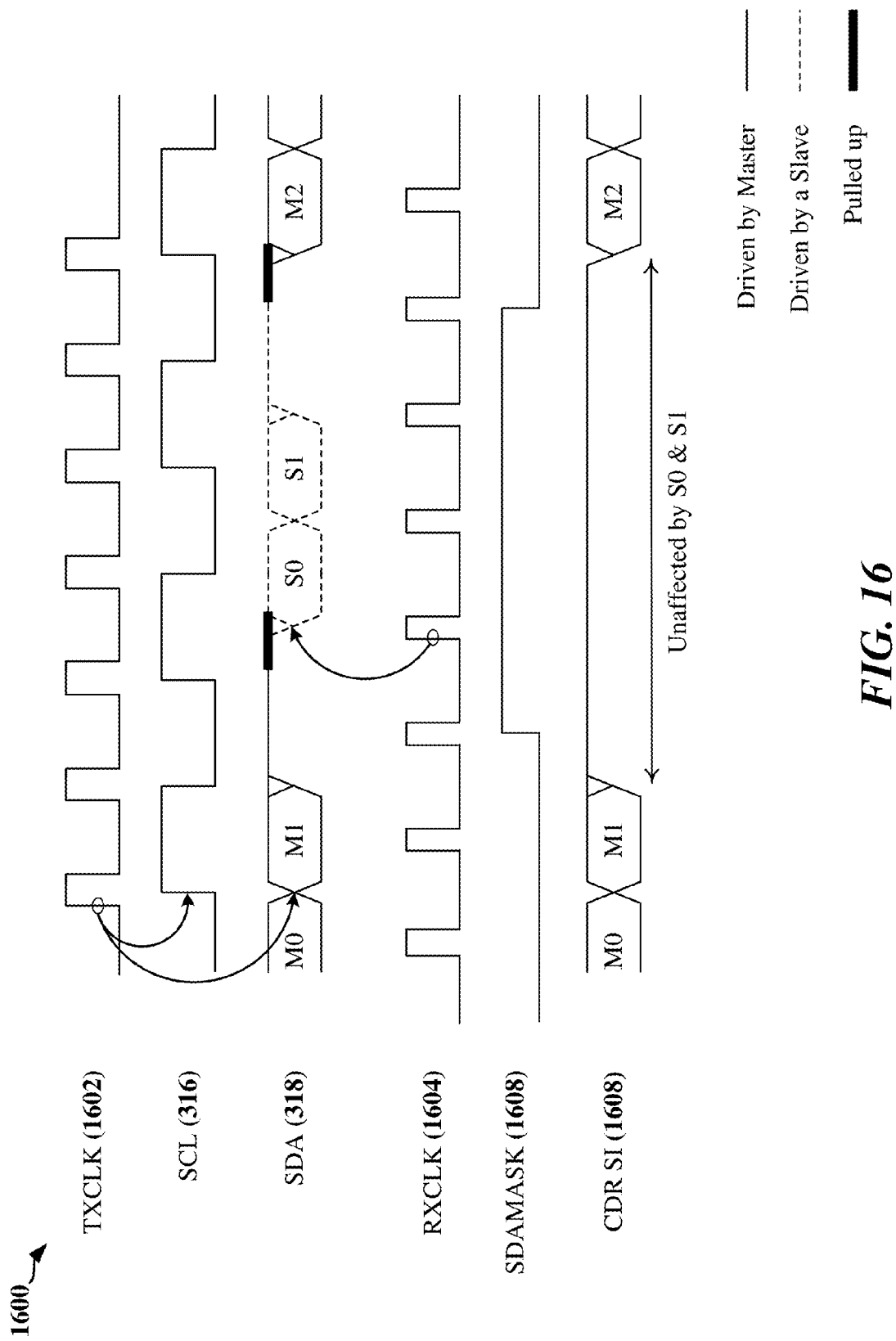
FIG. 16 is a timing diagram illustrating the suppression of additional or erroneous clock pulses according to certain aspects disclosed herein.

FIG. 16 is a timing diagram 1600 that illustrates one solution that may avoid the generation of the extra pulse 1510 on the RXCLK 1504 and potential synchronization loss. An SDA masking (SDAMASK) signal 1608 that gates or masks the signal that is used for in-band IRQ at the clock data recovery circuit input by each device, including the master device and slave devices. For instance, each CDR circuit masks the SDA line 318 or the SCL line 316 (whichever line is used for in-band IRQ) during in-band IRQ transmissions. If, for example, a master device permits a slave device to drive the SDA line 318 with a particular in-band IRQ protocol, all devices on the control data bus 330 then are required to mask their SDA line 318 input during that period to prevent erroneous/extra RXCLIK pulses from being detected. In one example, each device gates the SDA line 318 to hold its value into the CDR circuit as 1 (or high) during the in-band IRQ period.

Figure 17:
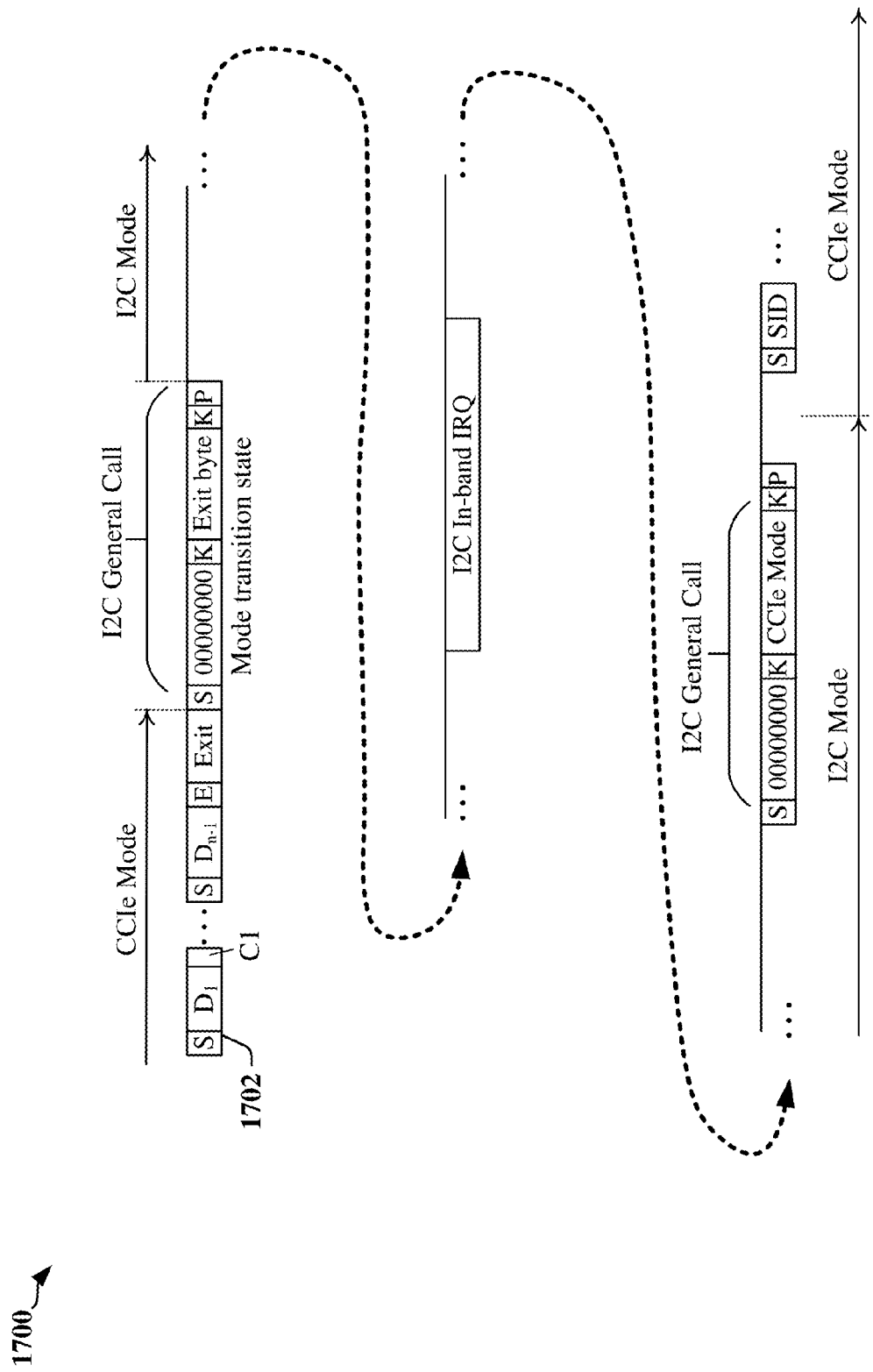
FIG. 17 illustrates one approach to implementing an in-band IRQ period while supporting both I2C and CCIe modes in accordance with certain aspects disclosed herein.

FIG. 17 is a diagram 1700 that illustrates one approach to implementing an in-band IRQ period while supporting both I2C mode and CCIe mode. In this approach, CCIe mode is exited, then the in-band IRQ is issued while in I2C mode. After the in-band IRQ is issued, the control data bus reverts back to CCIe mode. However, having to switch to I2C mode just to issue in-band IRQs creates overhead (both hardware and time) that is too large.

Figure 18:
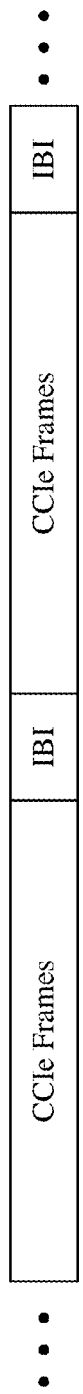
FIG. 18 illustrates an example in which in-band IRQ is issued while in CCIe mode.

FIG. 18 is a diagram 1800 that illustrates an example in which in-band IRQ (IBI) is issued while in CCIe mode. Ideally, the protocol may be maintained as compact as one or two CCIe words so that in-band IRQs can be issued as often as possible with as minimum protocol overhead as possible. For example, a periodic IRQ window may be defined.

Among other consideration, the in-band IRQ period may be available even when the bus system is in low-power mode to prevent "starvation" by the slave devices. One solution to this may be to define an in-band IRQ within a CCIe "heartbeat" word which is periodically transmitted by the by the master device over the bus to allow synchronization of the slave devices. The master device may send this "heartbeat" CCIe word at a rate that is slow enough for power saving but fast enough not to starve slaves. This "heartbeat" CCIe word may serve as an indicator to slave devices that they may issue IRQs.

Figure 19:
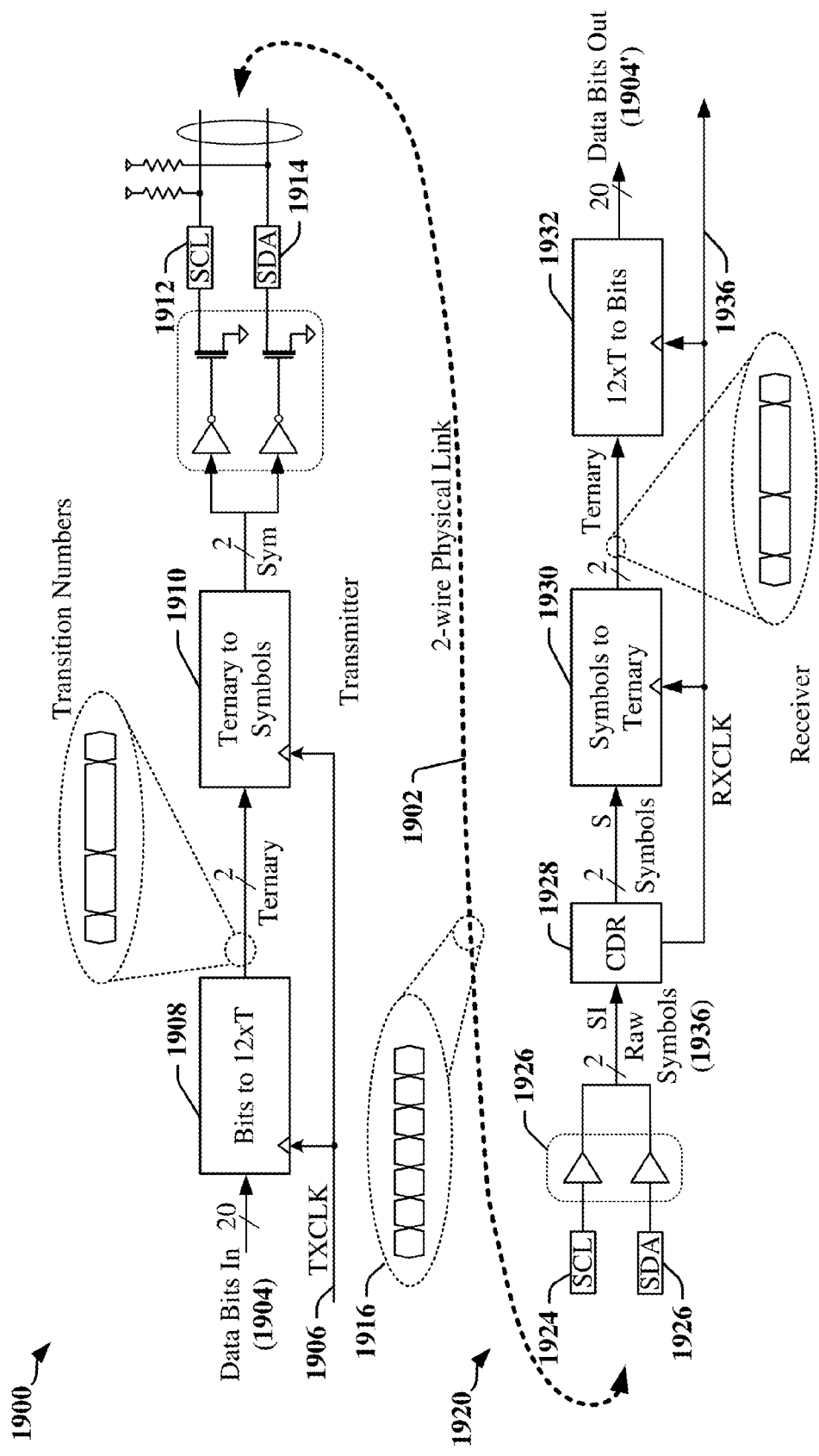
FIG. 19 illustrates an example of a method for transcoding of data bits into transcoded symbols at a transmitter to embed a clock signal within the transcoded symbols.

FIG. 19 is a block diagram illustrating one example of a method for transcoding of data bits into transcoded symbols at a transmitter to embed a clock signal within the transcoded symbols. At the transmitter 1900, input data bits 1904 are converted into a multi-digit ternary (base 3) number, where each digit may be referred to as a "transition number." The ternary number is then converted into a set of (sequential) symbols which are transmitted over the clock line SCL 1912 and the data line SDA 1914 of a physical link 1902. In one example, an original 20-bits of binary data is input to a bit-to-transition number converter block 1908 to be converted to a 12-digits ternary number. Each digit of a 12-digits ternary number represents a "transition number." Two consecutive transition numbers may have the same value. Each transition number is converted into a sequential symbol at a transition-to-symbol block 1910 such that no two consecutive sequential symbols have the same value. Because a transition in symbol value (and signaling state of the wires 1912, 1914) is guaranteed between the symbols in every pair of sequential symbols, the sequential symbol transition may serve to embed a clock signal. Each sequential symbol 1916 is then sent over a two wire physical link 1902 which may include an I2C bus having a SCL line 1912 and a SDA line 1914.

Figure 20:
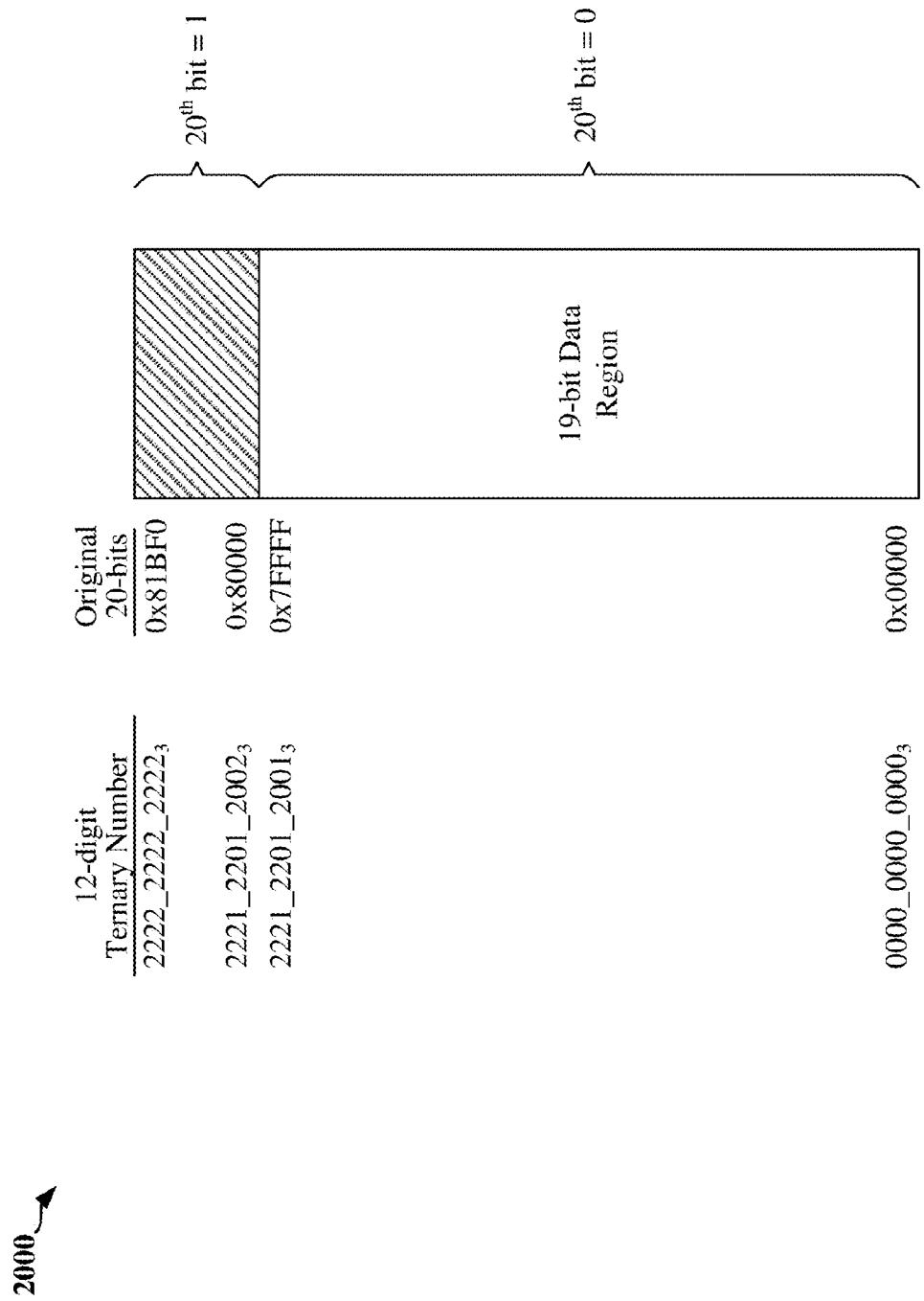
FIG. 20 illustrates an example of the encoding of bit 19 in a CCIe transmission.

FIG. 20 is a diagram 2000 that illustrates an example of the encoding of bit 19 (i.e., the $20^{th}$ bit when the bit count starts at the first bit being bit 0). In other words, as is typical in the computer sciences, counting bit wise begins at zero, and bit 19 is the $20^{th}$ bit. Here, the bits 0-18 are represented within the ternary number range of $0000\_0000\_0000_3$ to $2221\_2201\_2001_3$. The ternary numbers in the range of $2221\_2201\_2002_3$ to $2222\_2222\_2222_3$ may be unused for data transmission. Consequently, the ternary number range $2221\_2201\_2002_3$ to $2222\_222\_2222_3$ may be used to represent bit 19 (i.e., $20^{th}$ bit). In other words, $2221\_2201\_2002_3$ ternary is 1000_0000_0000_0000_0000 binary (0x80000 hexadecimal) and $2222\_2222\_2222_3$ ternary (0x81BF0) is the largest 12 digit ternary number possible. FIGS. 21 and 22 illustrate one example of $20^{th}$ bit (bit 19) utilization, and the number space of the $20^{th}$ bit (bit 19) in which the heartbeat may be transmitted.

FIG. 21 is a table 2100 that illustrates an example in which bit 19 may span the numbers $2221\_2201\_2002_3$ to $2222\_2222\_2222_3$, and that range of numbers may be subdivided into subdivisions on the left side 2102 of FIG. 21. CCIe is a multi-master control data bus architecture and control of the control data bus can be transferred from one master device to another master device. Consequently, a "master bus request" command is available (within subrange $2222\_1121\_0210_3$ to $2222\_2112\_1121_3$ as well as a "master handover" (within subrange $2222\_2220\_0002_3$ to $2222\_2221\_1210_3$).

FIG. 22 is a table 2200 that illustrates a range within the bit 19 number space that may be used to define a heartbeat as disclosed herein.

Figure 23:
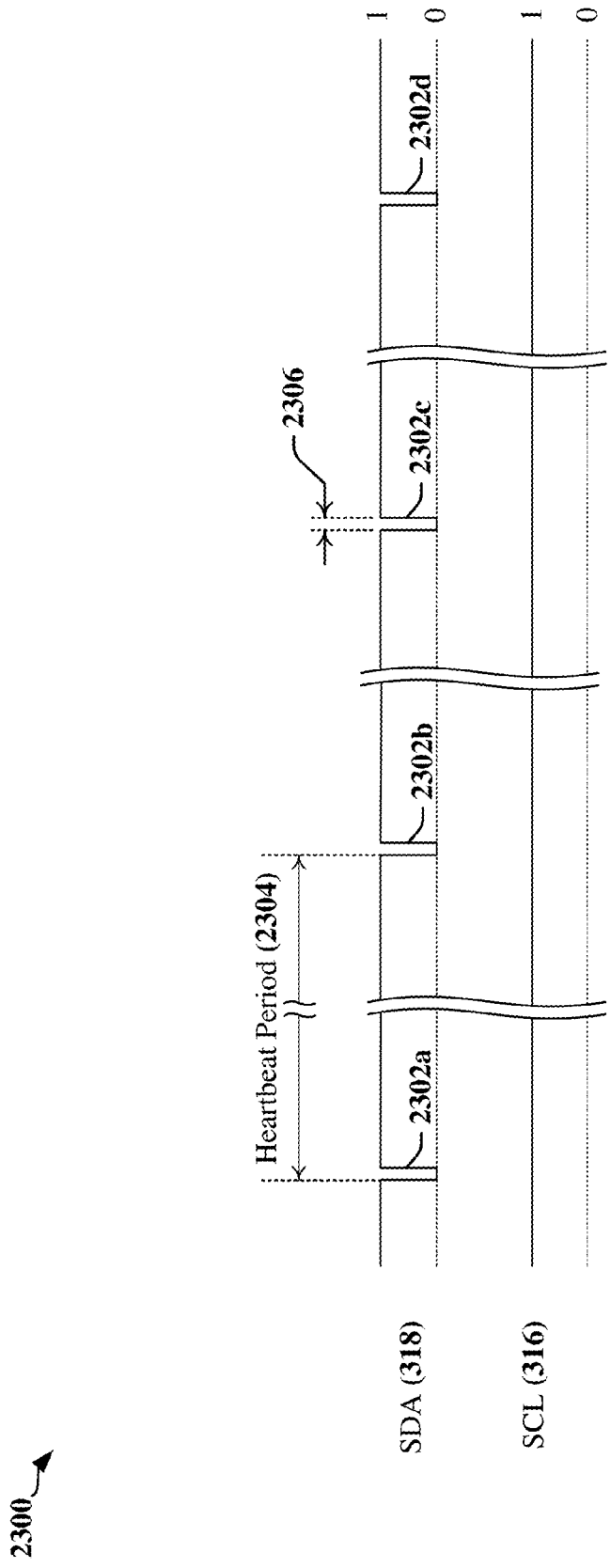
FIG. 23 illustrates a heartbeat clock according to certain aspects disclosed herein.

FIG. 23 is a timing diagram that illustrates a heartbeat clock 2300 having heartbeat pulses 2302a, 2302b, 2302c, 2302d. A control word 2202 (see FIG. 22) that is defined according to certain aspects disclosed herein may be used to provide the heartbeat clock 2300. The heartbeat clock 2300 may provide pulses 2302a, 2302b, 2302c, 2302d that have relatively short duration 2306 and that are separated by relatively large periods of time 2304. In one example, the pulses 2302a, 2302b, 2302c, 2302d may be defined as a one-symbol duration (e.g., 50 ns), and the pulses may be separated by 30 microseconds (30 μs), thereby providing a heartbeat clock with a frequency of 33.33 kHz. In this example, CCIe slave devices may use the 33.33 kHz clock extracted from heartbeat words for various standby operations.

Figure 24:
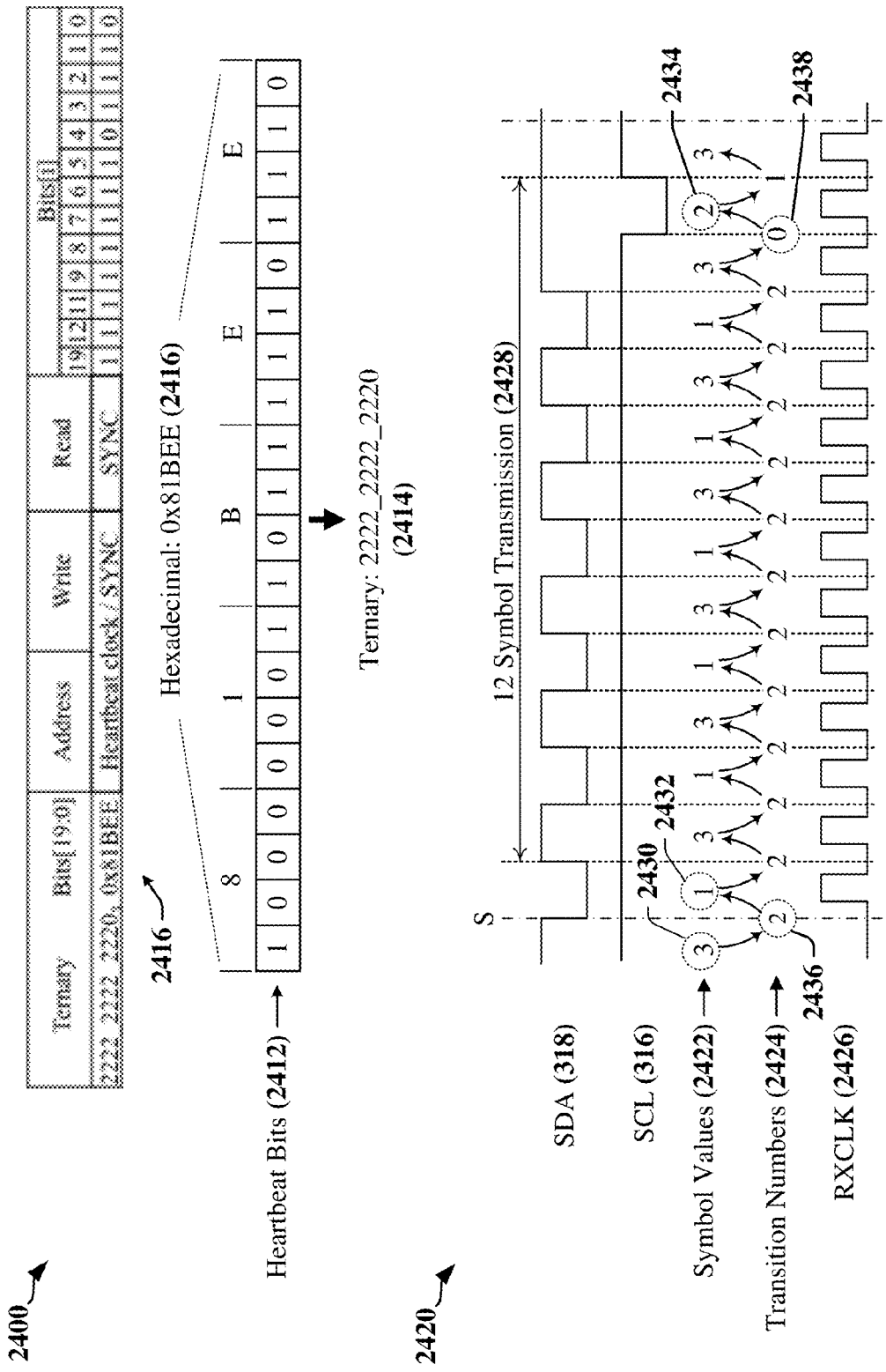
FIG. 24 illustrates an example of a control word that may be transmitted in compliance with CCIe protocols, and in a manner that enables the CCIe devices to obtain a heartbeat clock according to certain aspects disclosed herein.

FIG. 24 illustrates an example 2400 of a control word 2416 that may be transmitted in compliance with CCLe protocols, and in a manner that enables the CCIe devices to obtain a heartbeat clock, including the heartbeat clock 2300 illustrated in FIG. 23. In one example, the control word 2416 may be expressed as the hexadecimal number 0x81BEE, which produces a bit pattern 2412 that is mapped to a transition number that may be expressed as a 12-digit ternary number 2414. The transition number that may be encapsulated with start condition values to produce a set of 14 transition numbers 2424 calculated to produce a 12-symbol sequence 2428 that is provided in a stream of symbols 2422. As illustrated in the timing diagram 2420, every other symbol 2430 of the 12-symbol sequence 2428 has a value of '3' which results in a high voltage level on both the SDA signal wire 318 and the SCL signal wire 316. In the example, minimal currents may flow in the SDA signal wire 318 and the SCL signal wire 316 when both the SDA signal wire 318 and the SCL signal wire 316 are in the high state. A symbol value of '3' may minimize power consumption associated with the serial bus 330. The 12-symbol sequence 2422 also includes symbols 2432, 2434 that have the value '1' or '2,' which cause either the SDA signal wire 318 or the SCL signal wire 316 to be driven low, while the other of the SDA signal wire 318 or the SCL signal wire 316 remains high. In each 12-symbol transmission 2428, one symbol 2434 may be provided with a value of '2,' while the remaining symbols 2432 have a value of '1.' As a result, the heartbeat control word 2416 produces 6 pulses on the SDA signal wire 318 and one pulse on the SCL signal wire 316 each time the control word 2416 is transmitted. In one example, a 1.43 MHz clock may be provided on the SCL signal wire 316 by repetitively transmitting the heartbeat control word 2416.

First Example of an In-Band IRQ Technique

Figure 25:
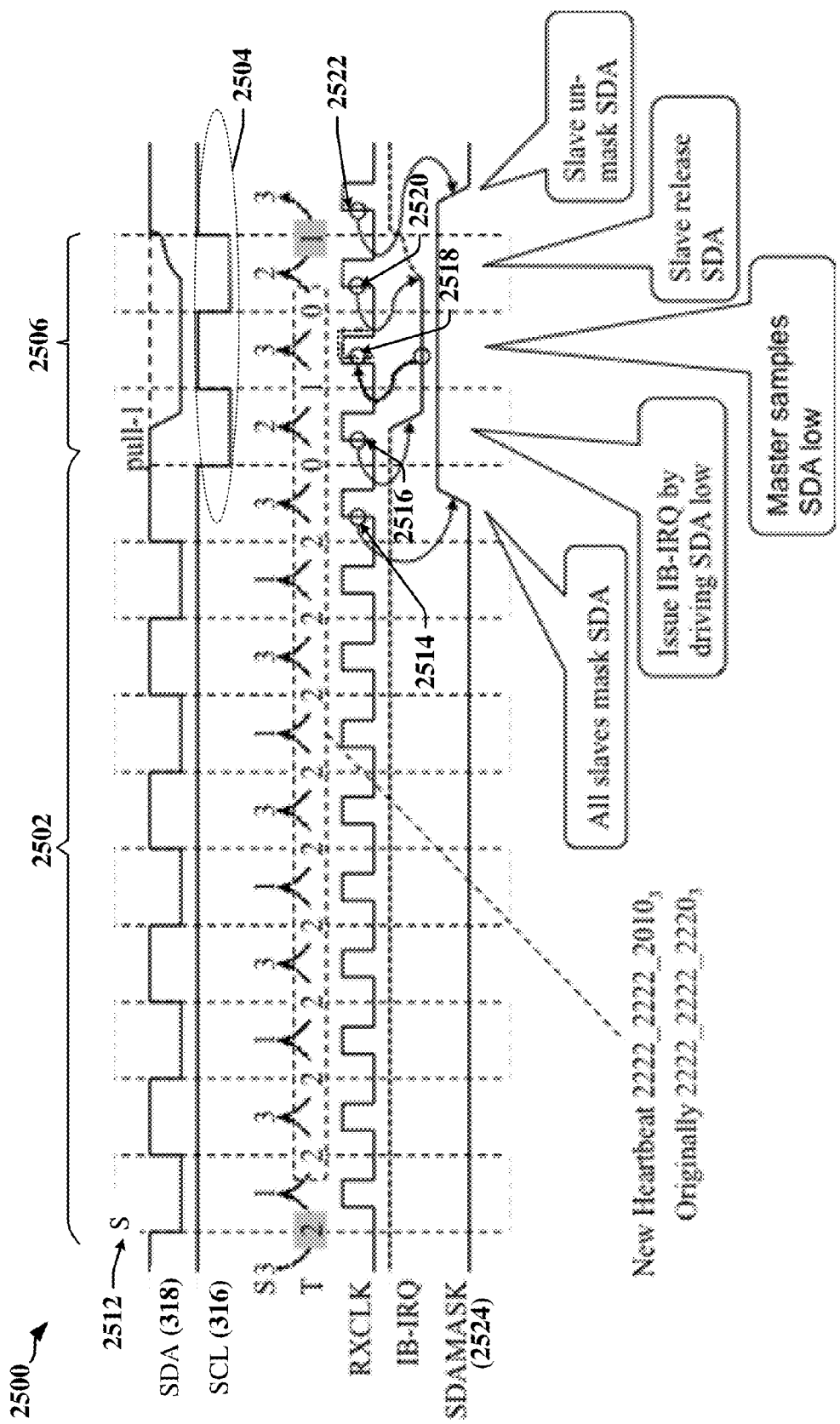
FIG. 25 illustrates an example of a heartbeat clock be transmitted over the SDA line of a CCIe bus.

FIG. 25 illustrates an example of a heartbeat clock may be transmitted over the SDA line 318 and SCL line 316. In this example, the heartbeat clock includes a first portion 2502 of the heartbeat clock is transmitted on the SDA line 318, while a second portion 2504 of the heartbeat clock may be transmitted on the SCL line 316, thereby creating a larger space 2506 for the in-band IRQ on the SDA line 318.

According to the protocol, a receiving slave device may detect, for example, the $n^{th}$ RXCLK 2514 after the start S indicator 2512. The $n^{th}$ RXCLK 2514 may trigger an internal SDA mask 2524 within a receiving slave device to internally mask the SDA line 318.

At the n+1 RXCLK 2516, the slave device may trigger an IRQ by pulling the SDA line 318 low. The SDA line 318 is pulled high by the master device or floats, so that when it is pulled low (by a slave device) this serves to indicate an in-band IRQ. At the n+2 RXCLK 2518, the master device may sample the SDA line 318 to ascertain whether an in-band IRQ has been asserted. At the n+3 RXCLK 2520, the slave device may release the SDA line 318, such that the in-band IRQ is de-asserted. Between n+3 and n+4 RXCLK 2522, the master device re-enables the SDA driver and starts driving the SDA line 318 high. Accordingly, a receiving device (e.g., slave device) can safely release SDA mask 2824 at n+4 RXCLK 2522. At the n+4 RXCLK 2522, the slave device may release the SDA mask 2524. In this manner, an IRQ may be transmitted by a slave device during the IRQ period 2506 defined on the SDA line 318.

Figure 26:
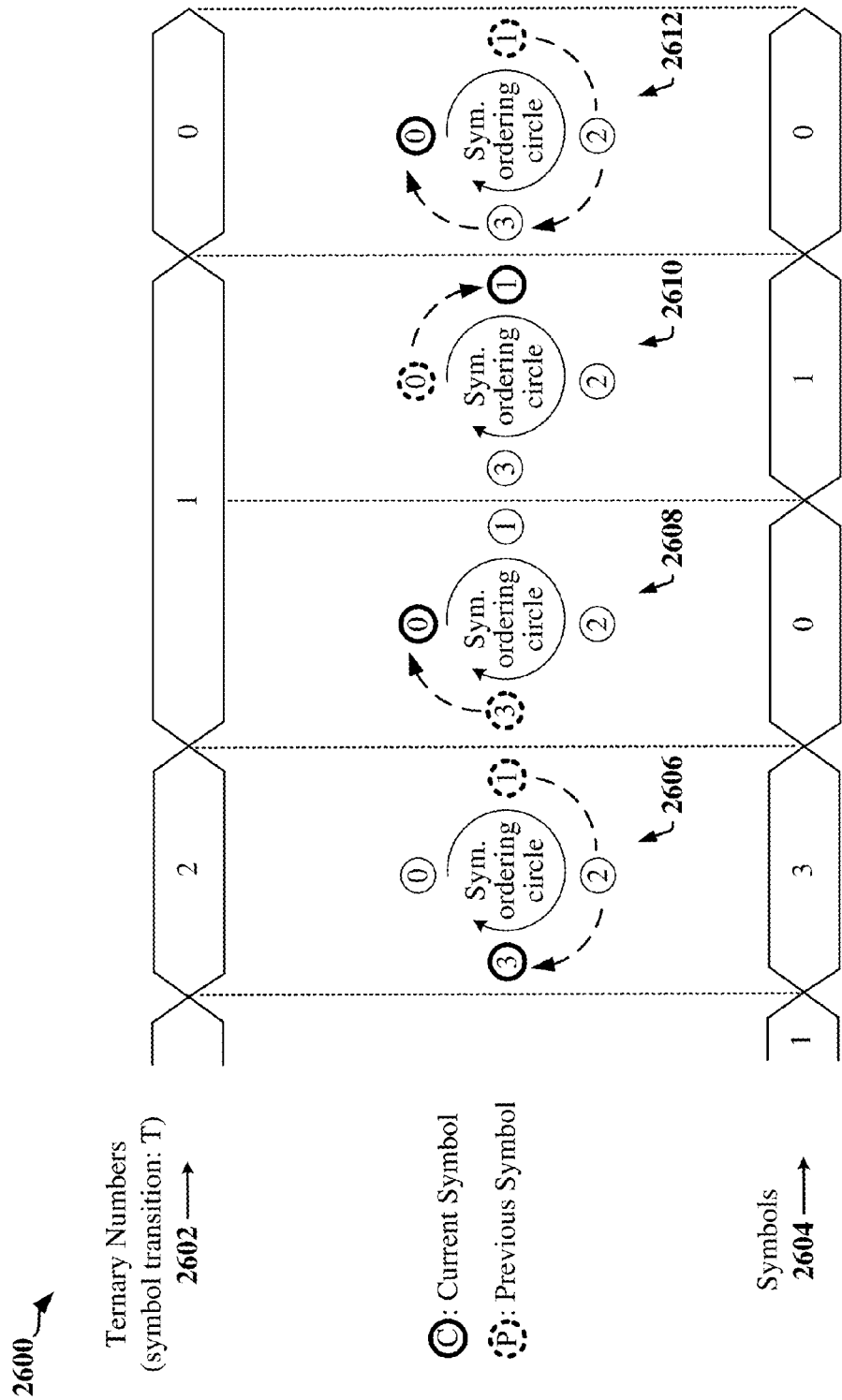
FIG. 26 illustrates a scheme for converting between ternary transition numbers and sequential symbols in accordance with certain aspects disclosed herein.

FIG. 26 is a diagram 2600 illustrating one example of a scheme for converting between ternary numbers (transition number) 2602 and (sequential) symbols 2604. A ternary number, base-3 number, also referred to as a transition number, can have one of the 3 possible digits or states, 0, 1, or 2. While the same value may appear in two consecutive ternary numbers, no two consecutive symbols have the same value.

The conversion function is set forth illustratively in FIG. 6. On the transmission side (TX: T to S) the logic is $T_{tmp}$=T=0 ? 3:T and $C_s=P_s+T_{tmp}$. In other words, the transition number T is compared to zero and when T=zero, $T_{tmp}$ (T temporary) becomes equal to 3, else (when T not equal zero) $T_{tmp}$ becomes equal to T. And the current symbol ($C_s$) becomes the previous symbol ($P_s$) value plus $T_{tmp}$. For example, in a first cycle 2606, the T is 2, so $T_{tmp}$ is also 2, and with $P_s$ being 1, the new $C_s$ is now 3.

In a second cycle 2608, the transition number 1 is input in the next cycle, and the transition number is not 3, so T's value of 1 is added to the previous symbol's value of 3. Since the result of the addition, 4, is larger than 3, the rolled over number 0 becomes the current symbol.

In a third cycle 2610, the same transition number 1 is input. Because T is 1 $T_{tmp}$ is also 1. The conversion logic adds 1 to the previous symbol 0 to generate current symbol 1.

In a fourth cycle 2612, the transition number 0 is input. The conversion logic makes $T_{tmp}$ equal to 3, when T is zero. Accordingly, 3 is added to the previous symbol 1 to generate current symbol 0 (since the result of the addition, 4, is larger than 3, the rolled over number 0 becomes the current symbol).

Consequently, even if two consecutive ternary digits 2602 have the same numbers, this conversion guarantees that two consecutive symbol numbers have different state values. Because of this, the guaranteed symbol transition in the sequence of symbols 2604 may serve to embed a clock signal, thereby freeing the clock line SCL in an I2C bus for data transmissions. On the receiver side (RX: S to T) the logic is reversed: $T_{tmp}=C_s+4-P_s$ and $T=T_{tmp}=3 ? 0:T_{tmp}$.

Figure 27:
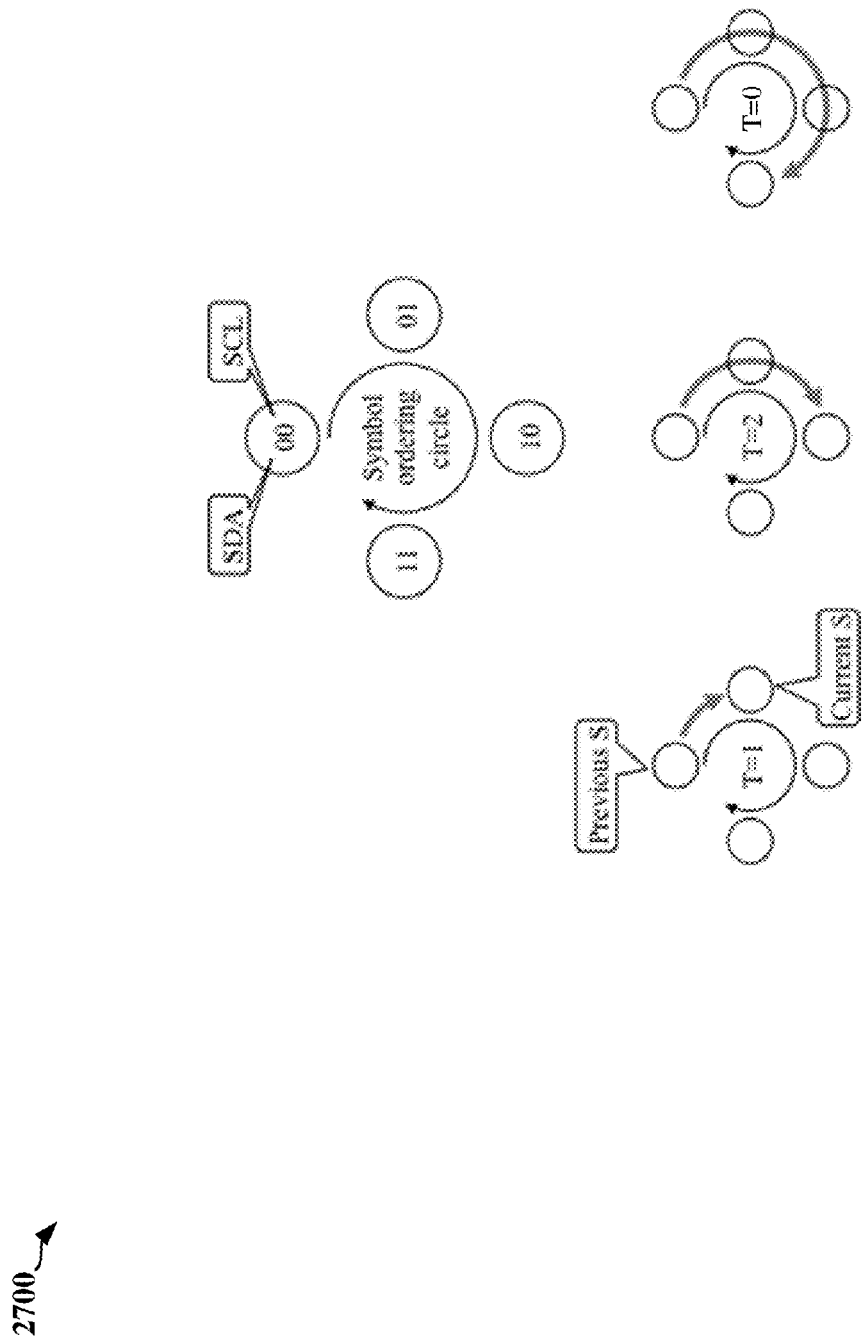
FIG. 27 illustrates one example of a technique for converting a transition number to a symbol number.

FIG. 27 is a first diagram 2700 that illustrates one example of a technique for converting a transition number to a symbol number. A symbol S may be transmitted over the SDA line 318 and SCL line 316 when a control data bus 330 is operated in CCIe mode. In one example, each symbol may be made up of 2 bits, with the LSB assigned to the SCL line 216 and the MSB assigned to the SDA line 218.

Each ternary transition number T may be characterized as follows:

T=1 when S transitions from previous state to current state clockwise by one state on the symbol ordering circle;

T=2 when S transitions from previous state to current state clockwise by two states on the symbol ordering circle; and T=0 when S transitions from previous state to current state clockwise by three states on the symbol ordering circle.

A data transmission over the data control bus 330 in CCIe mode may employ any transition number. That is, all possible transition number values are available to be used for generating each symbol that encodes data. The symbol is selected using the transition number to identify a symbol that is different from the previously transmitted symbol.

Figure 28:
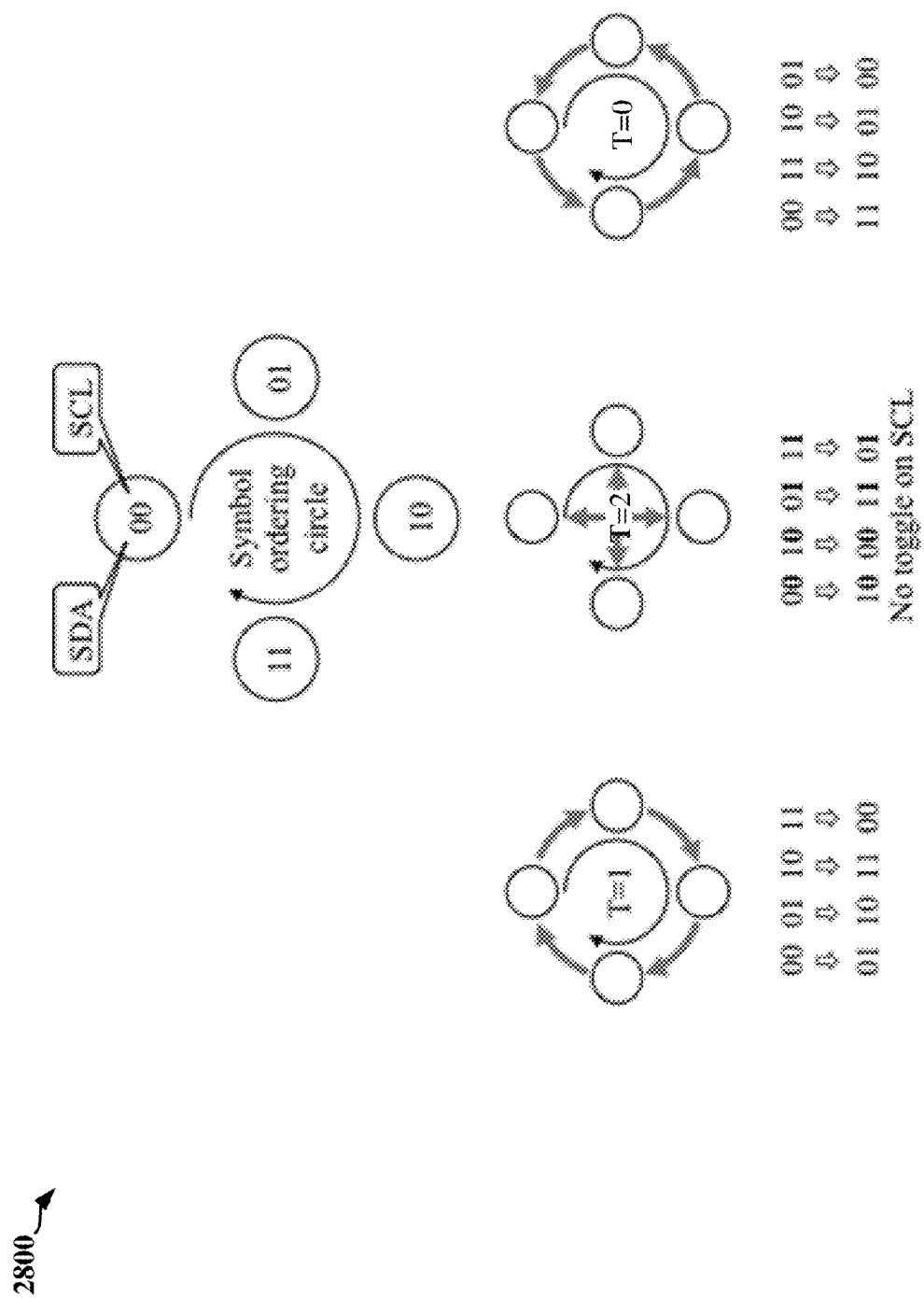
FIG. 28 illustrates certain aspects of the encoding technique illustrated in FIG. 27.

FIG. 28 is a second diagram 2800 that illustrates certain aspects of the encoding technique illustrated in FIG. 27. In this diagram 2800 each ternary transition number T may be characterized as follows:

T=1 when S transitions from previous state to current state clockwise by one state on the symbol ordering circle; and T=2 when S transitions from previous state to current state across the symbol ordering circle;

T=0 when S transitions from previous state to current state counter-clockwise by one state on the symbol ordering circle.

The second diagram 2800 shows that SCL line 316 always toggles when T=0 or 1, and the SCL line 316 does not toggle when T=2.

FIG. 29 is a diagram that illustrates certain conditions that may occur when an SDA mask 3122 is asserted, which may occur condition during an in-band IRQ period. As noted herein, the SDA line 318 is masked during the in-band IRQ period to avoid generation of extra clock pulses. The SCL line 316 does not toggle when transition number T=2 is sent, and according to I2C protocols, the SDA line 318 is observed to be always high regardless of its actual state when the SDA signal is masked, no symbol transition. Consequently, T=2 may be prohibited while SDA Mask=1, since a slave device generates no transitions on its receive clock if T=2 is during the SDA Mask period.

Figure 30:
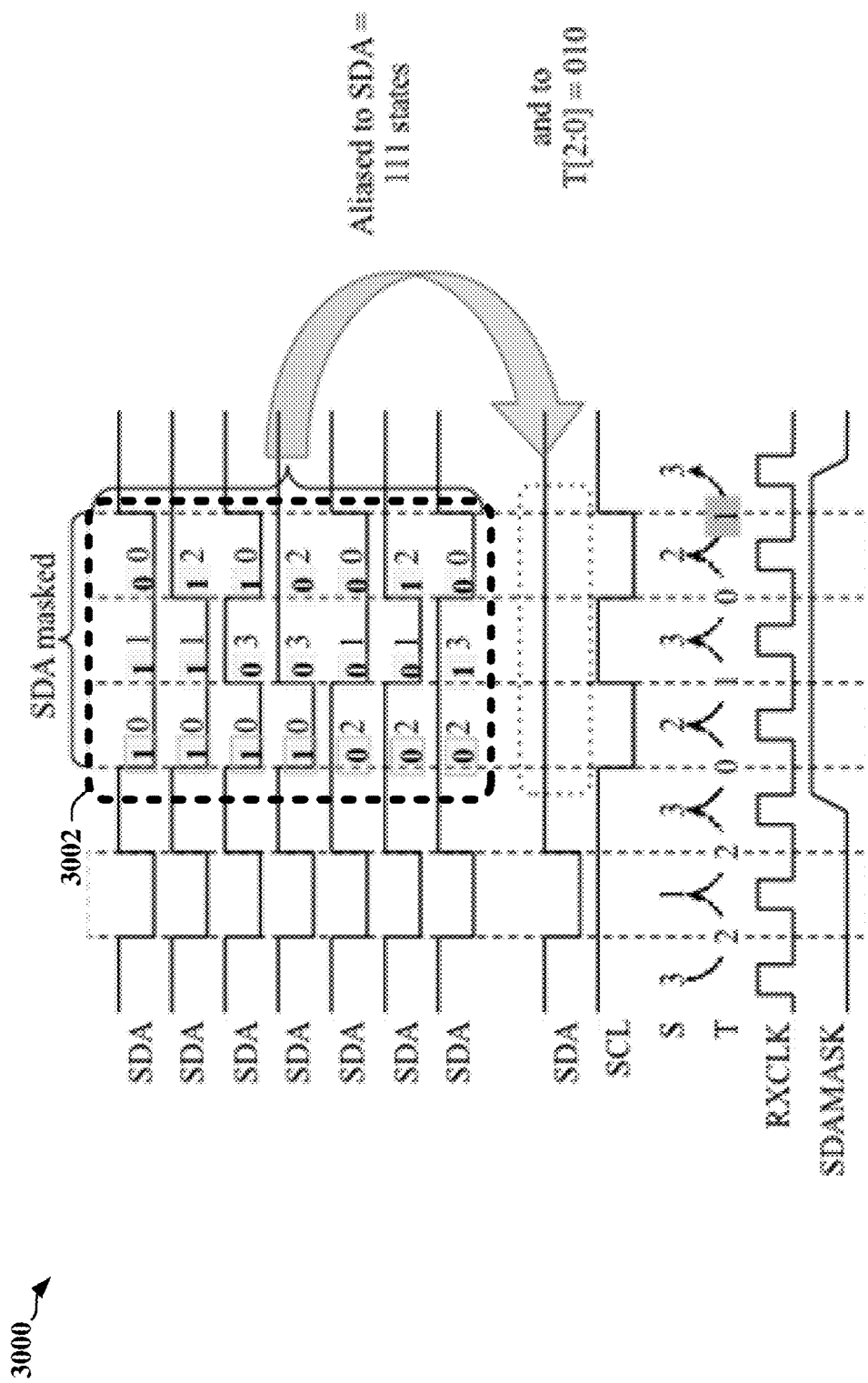
FIG. 30 illustrates a side-effect of the use of an SDA Mask.

FIG. 30 illustrates a side-effect of the use of an SDA Mask of FIGS. 25 and 29. Even if T is not equal to 2, any transition T values that would result in logic 0 for the SDA line 318 is aliased to T[2:0]=010 that assume SDA bit is always 1, because the SDA line 318 is always seen as logic 1 state during the in-band IRQ period.

Figure 31:
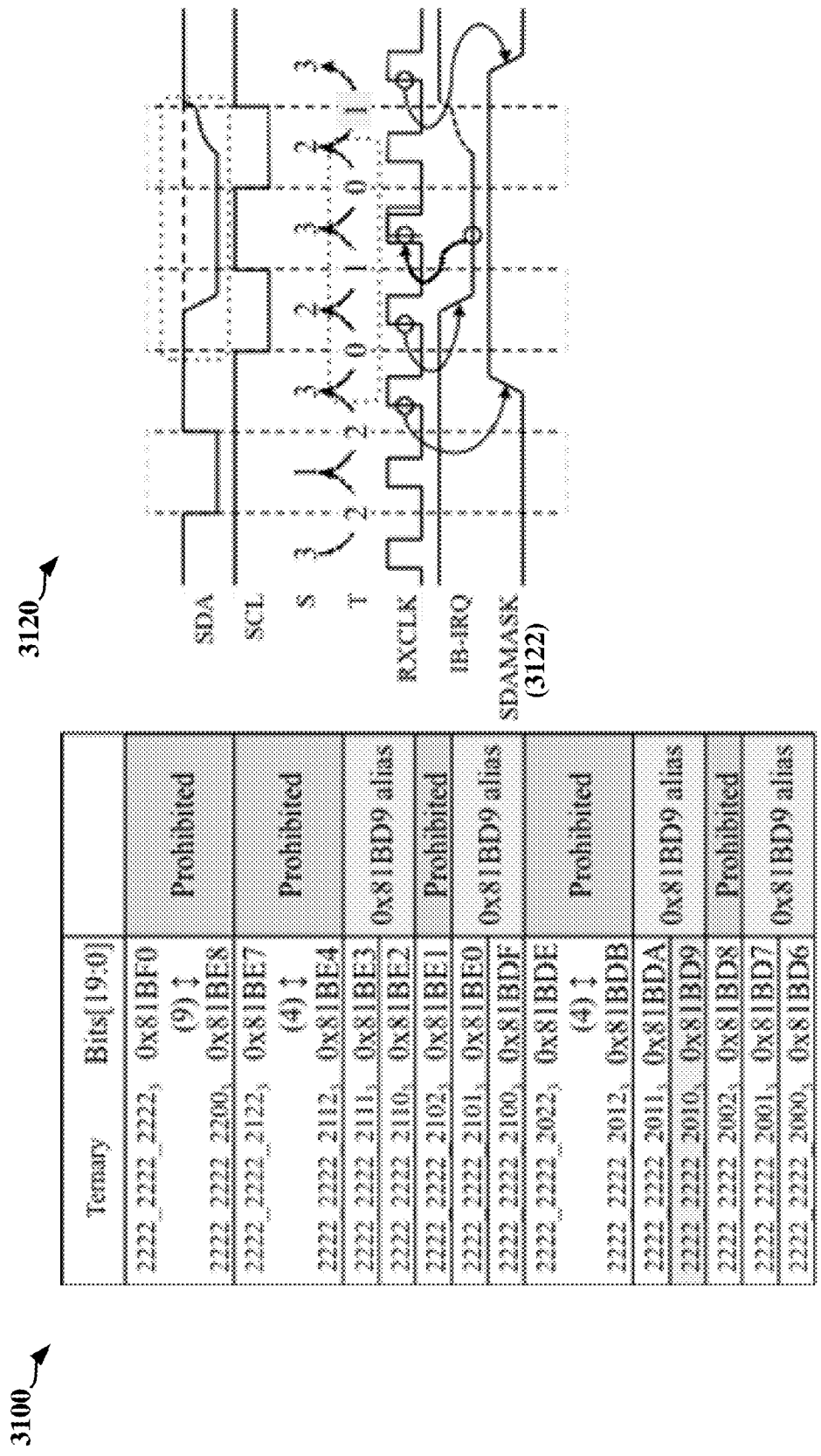
FIG. 31 illustrates certain aspects related to the use of a heartbeat clock for in-band IRQs.

FIG. 31 includes a table 3100 and timing diagram 3120 that illustrate certain aspects related to the use of a heartbeat clock for in-band IRQs. The heartbeat may be generated using values that occupy the number space 0x81BD6 through 0x81BF0 (i.e., 27 addresses) within the ternary number space. The fact that T=2 is prohibited and any other T combinations are aliased to T=010 while SDA Mask=1 means that a heartbeat word that supports in-band IRQ occupies not only one address, but it effectively occupies 27 addresses of Bit-19 region. The use of the particular heartbeat pattern prohibits use of the ternary number 2222_2222_2222, which is 81BF0 hex, and is very useful as the first word of the two-word CCIe synchronization. The ternary number 2222_2222_2222 facilitates absolute synchronization.

FIG. 32 is a table 3200 that illustrates an example of the use of Bit-19 of the ternary number illustrated in FIG. 31 to map CCIe mode transmissions. In this example, the heartbeat may be assigned to the ternary number 2222_2222_2010$_3$. Note that in this example, so long as a ternary number in the range of 2222_2222_2xxx$_3$ is detected, this may be interpreted as a heartbeat and/or in-band IRQ (e;g., 0x81BD9 hex).

Second Example of an In-Band IRQ Technique

Figure 33:
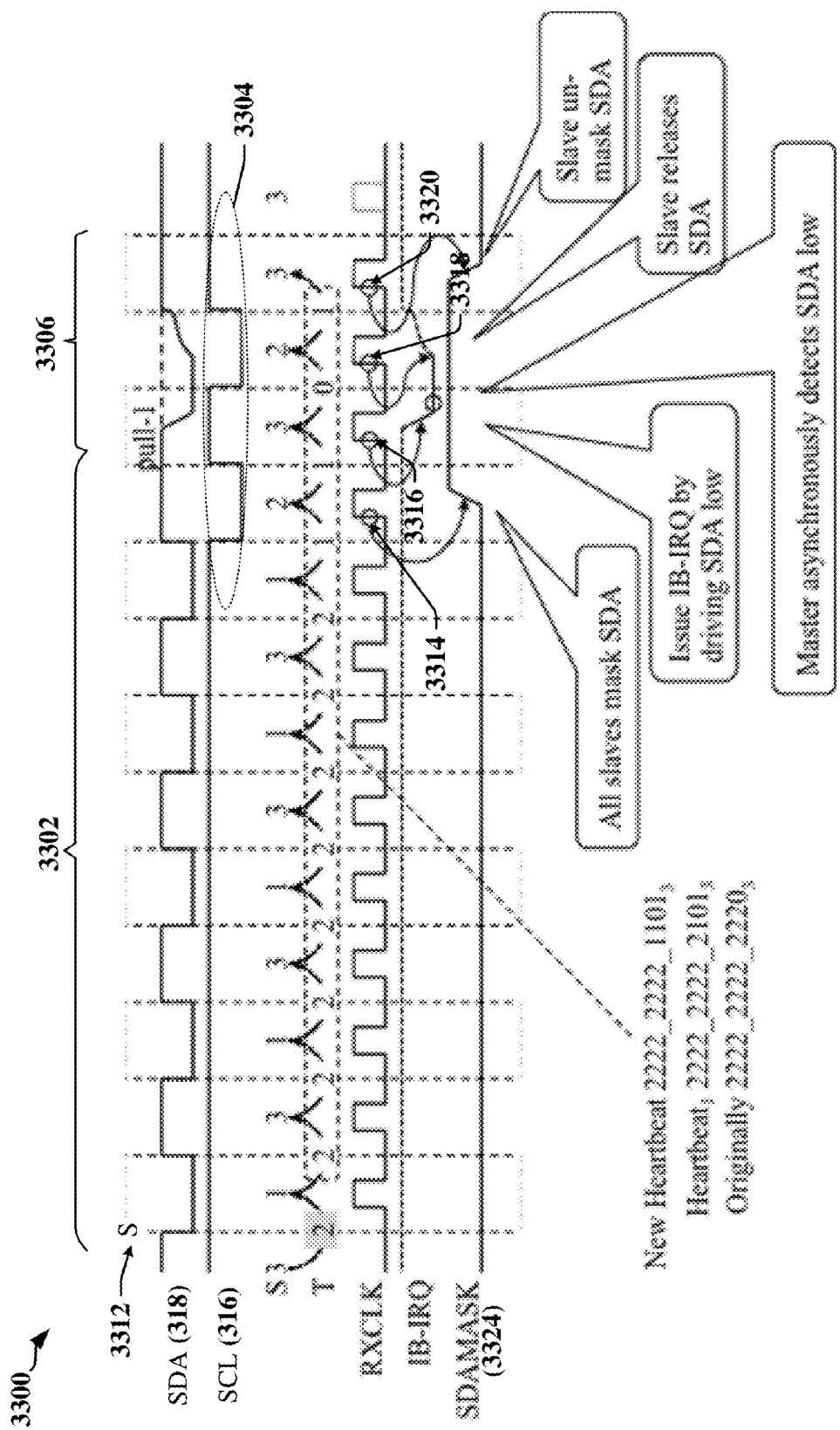
FIGS. 33 and 34 illustrate a technique for implementing in-band IRQ on a control data bus 330 that is operated or operable in CCIe mode in accordance with certain aspects disclosed herein.
Figure 34:
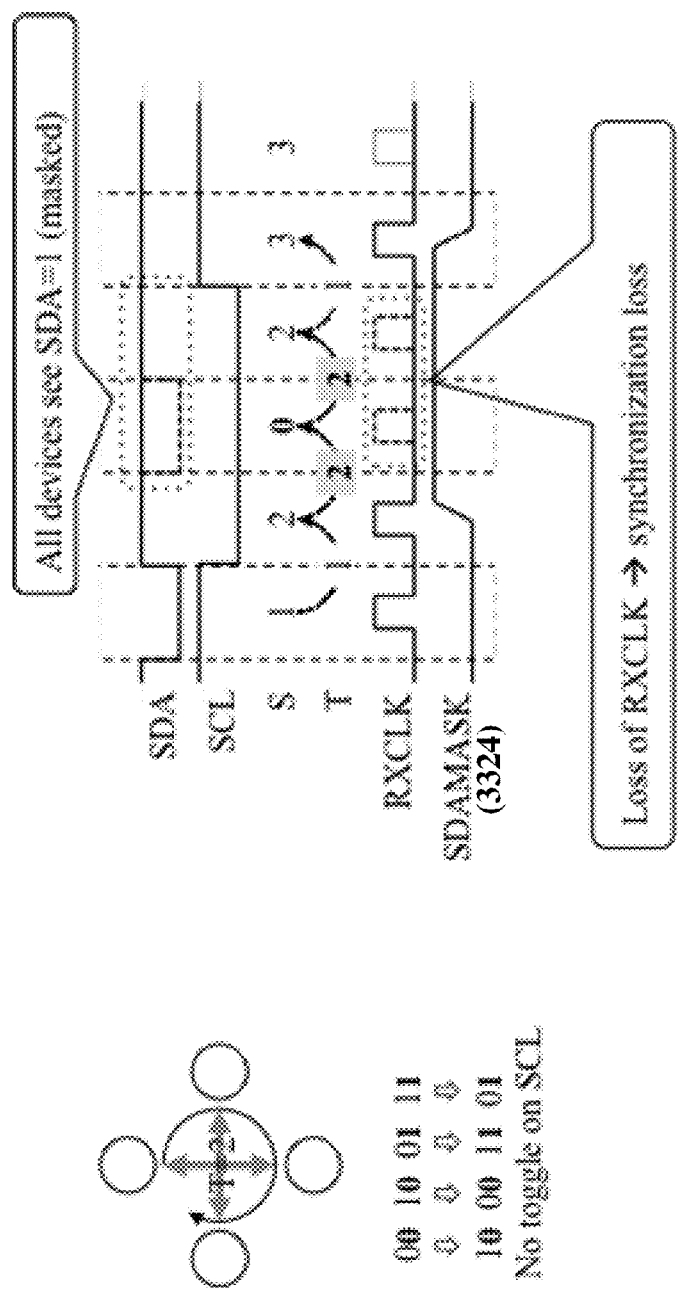

FIGS. 33 and 34 include timing diagrams 3300, 3400 that illustrate a technique for implementing in-band IRQ on a control data bus 330 that is operated or operable in CCIe mode. In one example, a reduction in the number of receiver clock RXCLK cycles needed to perform in-band IRQ may be reduced with respect to the example described in relation to FIG. 25. The timing diagram 3300 corresponds to a protocol for providing an in-band IRQ period 3306, in which a receiving slave device may detect, for example, the n$^{th}$ RXCLK pulse 3314 after the start S indicator 3312. The n$^{th}$ RXCLK pulse 3314 may trigger an internal SDA mask 3324 to internally (e.g., within a receiving slave device) mask the SDA line 318.

At the n+1 RXCLK pulse 3316, the slave device may trigger an IRQ by pulling the SDA line 318 low. Before the arrival of the n+1 RXCLK pulse 3316, the master device may cause the SDA line 318 to be pulled (weakly) to a high state using a resistive pull-up or the like. An in-band IRQ may be indicated when a slave device pulls the SDA line 318 low.

Rather than waiting until the next clock cycle, between the n+1 RXCLK pulse 3316 but before the n+2 RXCLK pulse 3318, the master device may monitor the SDA line 318 to ascertain if and/or when the SDA line 318 goes low as an indication that an in-band IRQ request has been asserted. It will be appreciated that such monitoring of the SDA line 318 by the master device may be performed only during the IRQ period to a synchronously detect any IRQ requests from slave devices. At the n+2 RXCLK pulse 3318, the slave device may release the SDA line 318 in order to de-assert the in-band IRQ. Between the n+2 and n+3 RXCLK pulses, the master device may re-enable SDA driver and may begin to drive the SDA line 318 to a high level. Consequently, the receiver of the asserting slave device can safely release SDA mask at the n+3 RXCLK pulse 3320. At the n+3 RXCLK pulse 3320, the slave device may release the SDA mask 3324. In this manner, an in-band IRQ may be transmitted by a slave device during the IRQ period 3306 defined on the SDA line.

Figure 35:
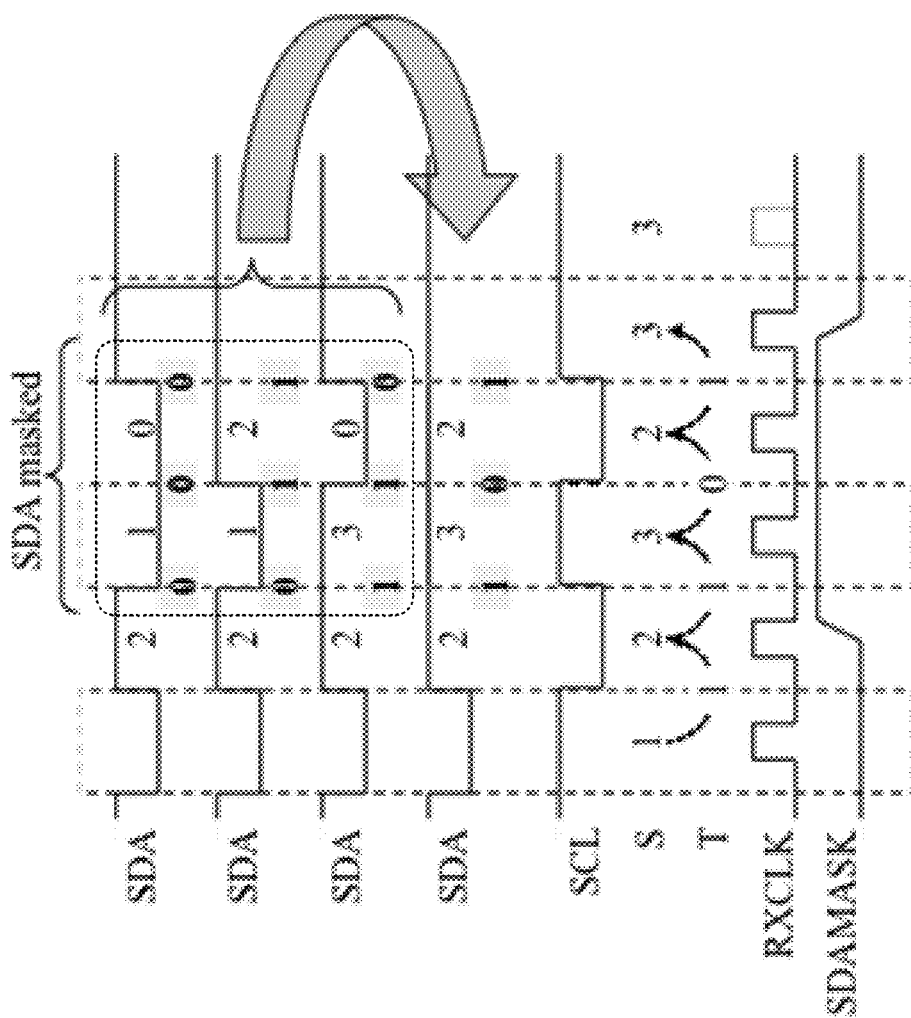
FIG. 35 illustrates aliasing conditions that may occur when an SDA Mask is employed.
Figure 36:
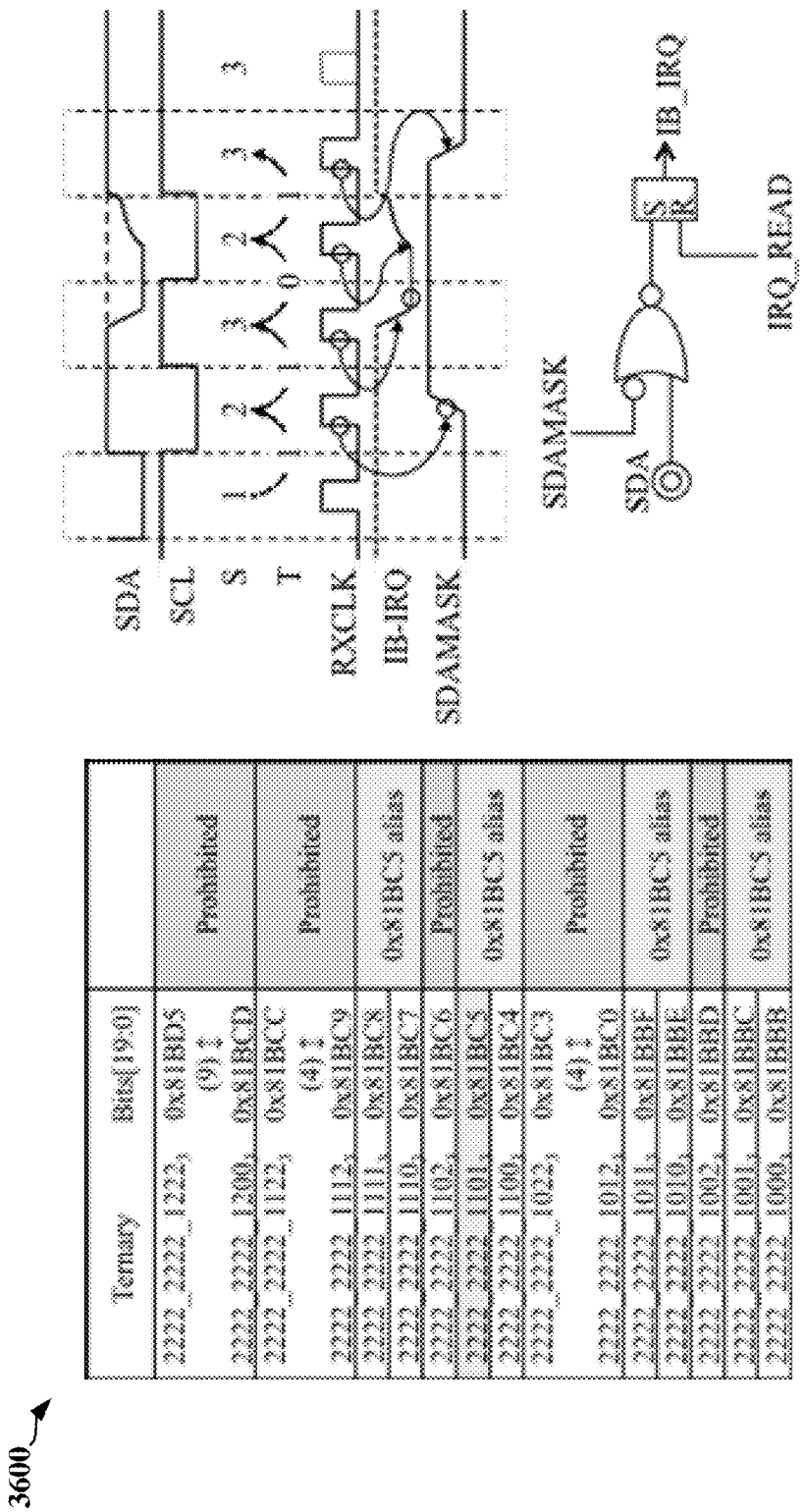
FIG. 36 illustrates certain aspects related to a heartbeat clock provided during in-band IRQ in accordance with certain aspects disclosed herein.

FIG. 35 is a timing diagram 3500 that illustrates aliasing conditions when an SDA Mask 3324 is employed, and FIG. 36 includes a timing diagram 3600 that illustrates certain aspects related to a heartbeat clock provided during in-band IRQ in accordance with the example presented in FIGS. 33-35. A heartbeat word may occupy the number space 0x81BBB~0x81BD5 (i.e., 27 addresses) within the ternary number space. Similar to the heartbeat discussed in relation to FIGS. 25-32, an alternative heartbeat for the example in FIGS. 33-35 also occupies 27 addresses of Bit-19 region. However, this alternative heartbeat does not prohibit use of the 2222_2222_2xxx ternary number space, such that the 2222_2222_2222 word is still available for synchronization. This heartbeat pattern may also necessitate that a master device use an asynchronous in-band IRQ detection circuit in order to accommodate a shorter in-band IRQ period.

Figure 37:
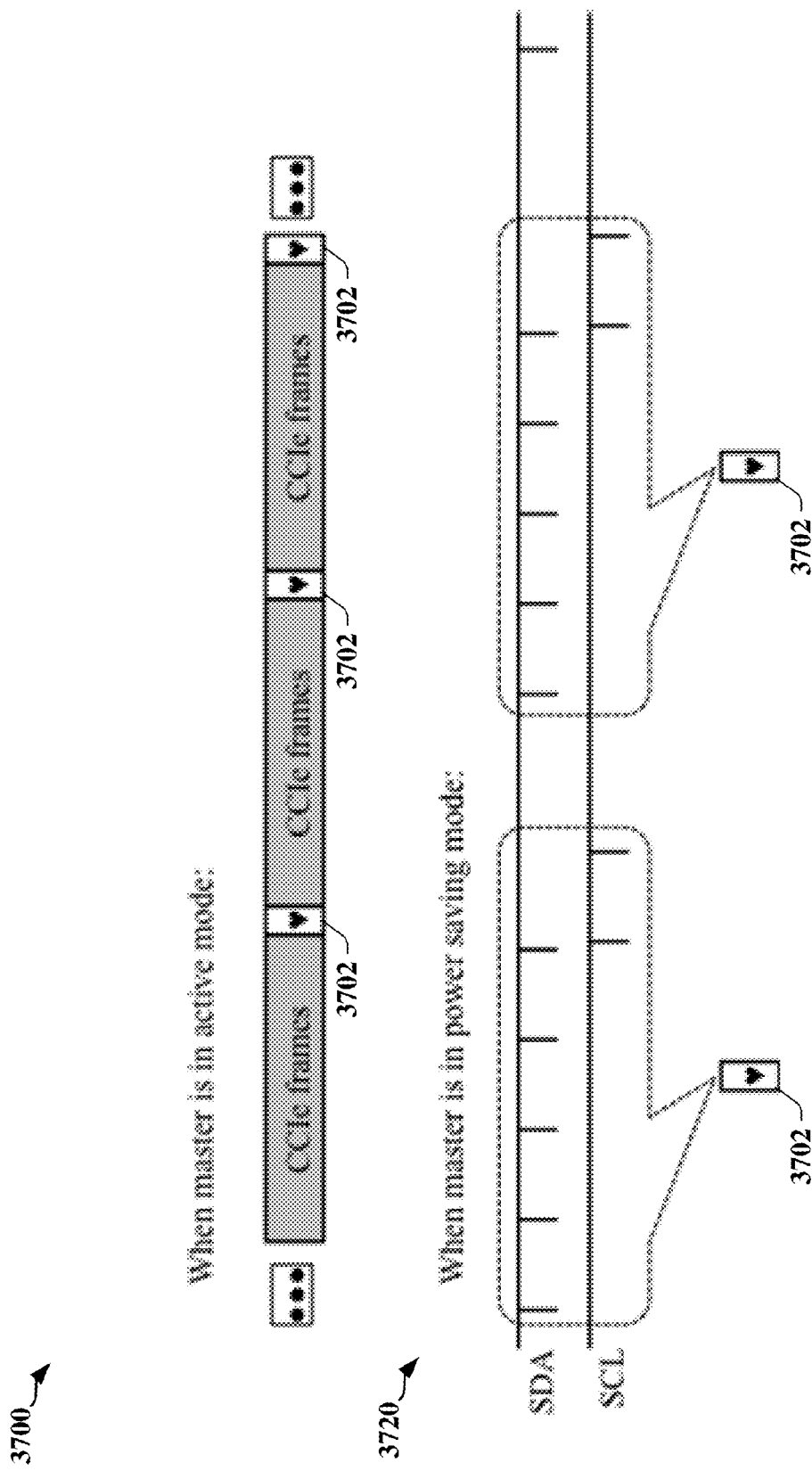
FIG. 37 illustrates a method by which heartbeats may be transmitted when the master device is in active mode or power sayings mode.

FIG. 37 is a diagram that illustrates a method by which heartbeats may be transmitted when the master device is in an active mode 3700 and when the master device is in a power savings mode 3720. During normal operations, the master device may be in active mode 3700, and the master device may periodically send the heartbeat word 3702 in order to allow slave devices to issue in-band IRQs. The heartbeat word interval may be such that it will not starve slaves of the opportunity to assert interrupts.

When the master device is in power saving mode 3720, the same heartbeat 3702 can also be transmitted, thereby allowing the slave devices on the bus an opportunity to issue an in-band IRQ during power saving mode.

Figure 38:
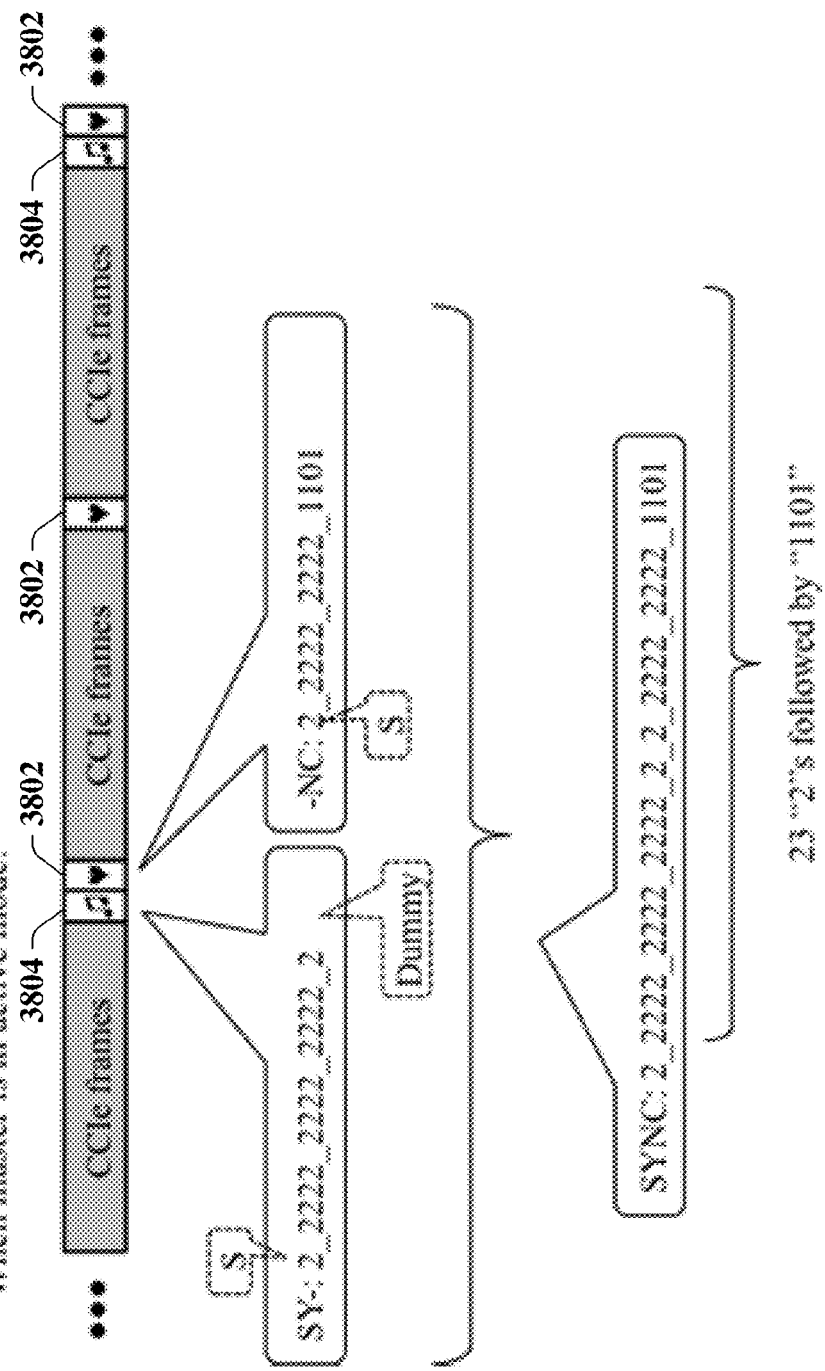
FIG. 38 illustrates a combination synchronization word and heartbeat word according to certain aspects disclosed herein.

FIG. 38 is a timing diagram 3800 that illustrates a combination synchronization word 3804 and heartbeat word 3802. The heartbeat word 3802 may serve as the second word of a two-word synchronization word sequence. In one example, the two-word synchronization sequence may start with a first word 3804 word having all digits=2 (value=2222_2222_2222) and denoted as "SY-", while the heartbeat word 3802 may have a value=2222_2222_1101 and be denoted as "-NC. The "SY-" word may cause receiving devices to generate 14 transition state 2s including one "2" associated with a Start condition, and one "2" after the last symbol when the symbol representing bus signaling state turns form 1 (SDA=0, SCL=1) to 3 (SDA=1, SCL=1). The "-NC" word may cause receiving devices to generate 9 transition state 2s including one "2" associated with a Start condition.

The combining of the "SY-" word and the "-NC" word may be referred to as a "SYNC" that provides a total of 23 transition state 2s followed by "1101" sequence. This sequence is a unique sequence and does not occur in other CCIe transactions. CCIe devices may use the sequence to synchronize to a CCIe word boundary.

FIG. 39 is a table 3900 that illustrates the synchronization and heartbeat mapping within Bit-19 of the CCIe protocol. Numerical space 0x81BD6 through 0x81BEF hex, spanning 27 numbers, may be prohibited in order to make the two word pattern "SY-NC" that includes twenty-three "2"s and the "1101" bit pattern are unique and used only for synchronization. The master device can periodically send "SY-" word before the heartbeat, which is "-NC" word, in order to allow slave devices to resynchronize in case of synchronization loss, or to permit hot-plugged slaves to synchronize to the bus.

In-Band SID Scan and Response

Each slave device coupled to a control data bus 330 may be uniquely identified by a slave identifier (SID). The master device may perform a scan of the slave devices coupled to the control data bus in order to learn their SIDs. A scan may be performed at start-up and/or power-up of a device, when a new device has been plugged onto the bus (hot-plug, for example), and/or periodically. When the master device senses that an IRQ has been issued by a slave device, it may then scan the slave devices to identify which device issued the IRQ. In one approach, the master device may initiate an SID scan in which a sequence of SIDs, or elements thereof, is sent and a slave device which matches such SID or SID element pull the SDA line low to indicate a match.

Figure 40:
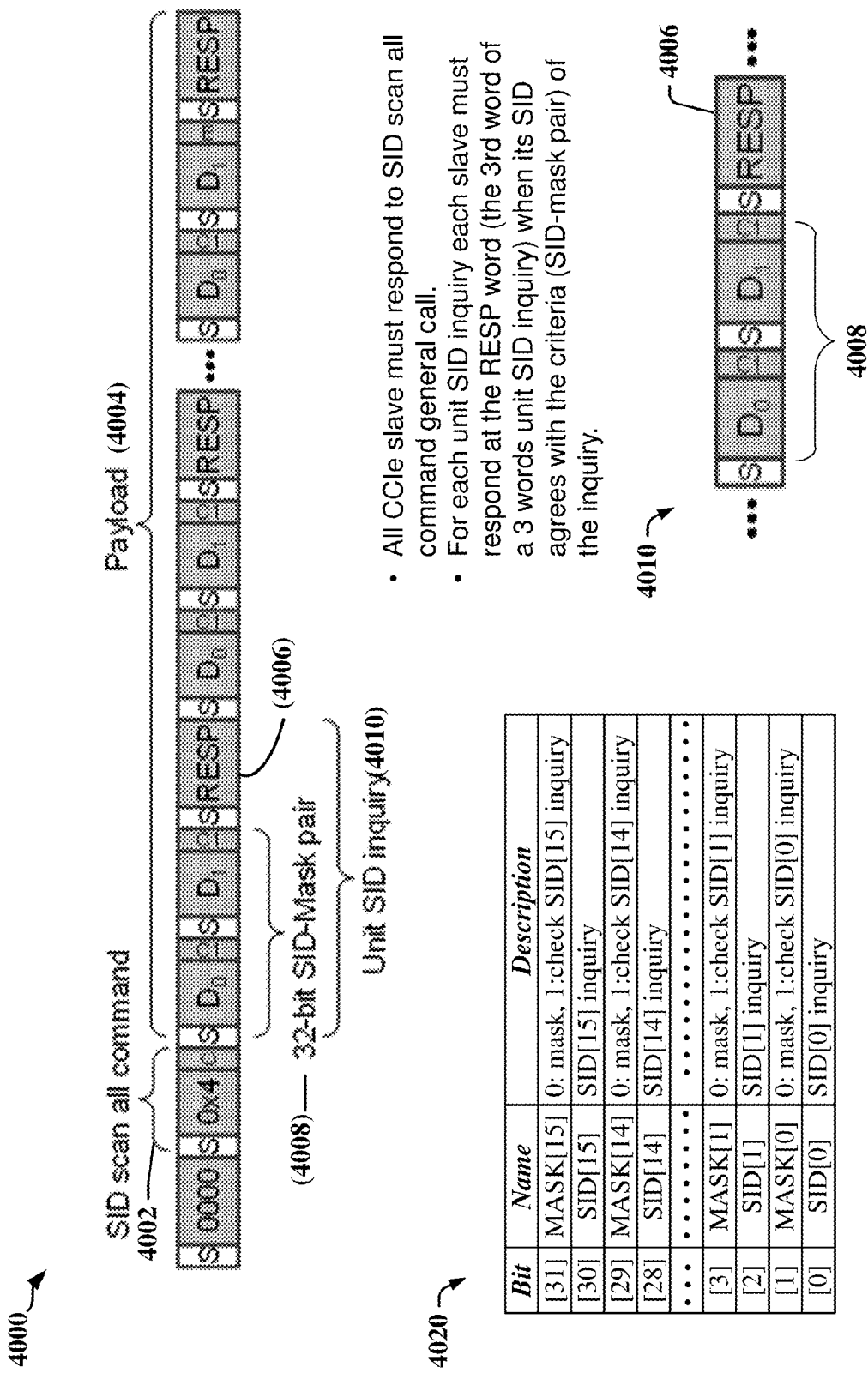
FIG. 40 illustrates one example of a "SID Scan All" command that may be issued by the master device over the control data bus to the slave devices in accordance with certain aspects disclosed herein.

FIG. 40 illustrates one example 4000 of a CCIe transmission that includes an SID "Scan All" command 4002 and its corresponding payload 4004. The SID "Scan All" command 4002 (identified by "0×4" code) may be issued by a master device. The payload 4004 may include a Unit SID inquiry sequence 4010. Each Unit SID inquiry sequence 4010 includes an SID Mask Pair 4008 and a response (RESP) word 4006. The SID Mask Pair 4008 may define a mask that identifies a bit position within an SID to inquire about.

As illustrated in the table 4020, the 32-bit SID Mask Pair 4008 (spread over two 16-bit data D0 and D1) serves to identify whether one or more bit locations of a 16-bit SID is being queried and, if so, for which value (or bit-settings) it is being queried. For instance, bit[1] of the SID Mask Pair 4008 may define whether bit[0] of an SID is to be checked or masked (i.e., not checked). If bit[1] indicates "check", then bit[0] of the SID Mask Pair 4008 defines whether the inquiry is for "0" or "1".

A period defined by the RESP word 4006 allows slave devices to respond to the SID inquiry in-band over the shared bus. For each Unit SID inquiry sequence 4010, each slave device which has one or more non-masked SID bits that match corresponding inquiry bits (i.e., the slave device's SID has one or more bits at an inquired location or locations that match the one or more inquiry bit) sends an inquiry response in-band over at least one line of the shared bus. This allows the master device to ascertain whether or not any slave device on the bus has a partially matching SID (i.e., an SID that has a bit at the inquired bit location that matches the inquiry bit).

Multiple Unit SID inquiry sequences 4010 are sent by the master device to fully identify the SID for all devices coupled to the shared bus.

The "Scan All" command 4002, or a variant thereof, may be issued on occasions that are not directly related to boot up of the master. In one example, the master device may scan for all slave devices coupled to the control bus in order to check whether all slave devices are in synchronization. In this example, the master device need not necessarily execute a complete "blind scan", and the master may issue inquiries without masks and/or with masks that do not exclude any SID bits from comparison because the master device may already know which slave devices are coupled to the bus. In another example, the master device may scan for all slave devices coupled to the control bus in order to check whether one or more specific devices are in synchronization. In this example, the master device may send only one unit SID inquiry for each slave device to be scanned.

Figure 41:
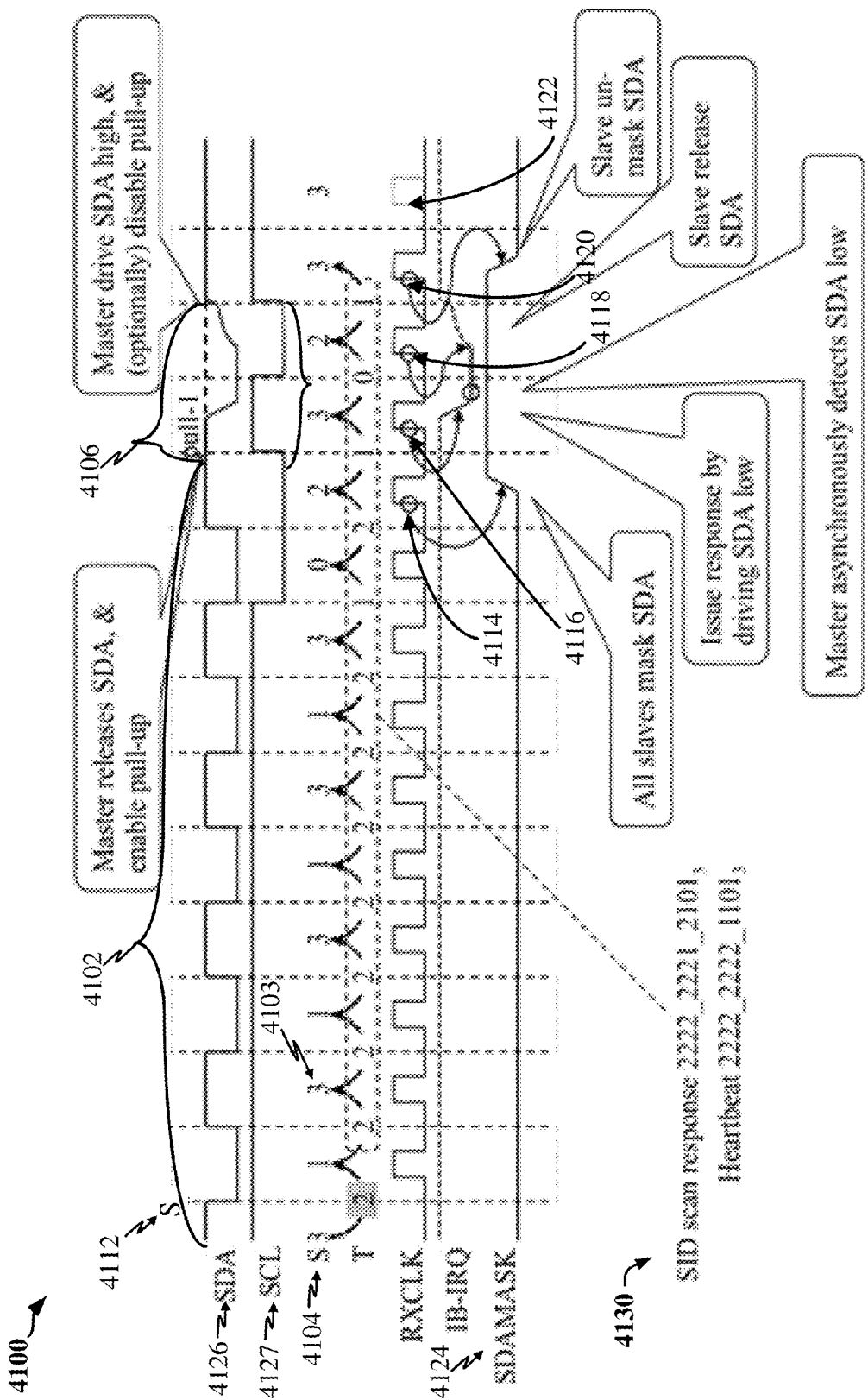
FIG. 41 illustrates timing of response of a slave device to the SID Scan All command received from the master device in accordance with certain aspects disclosed herein.

FIG. 41 illustrates a timing diagram 4100 for an SID Scan response (the RESP word 4006), over a shared bus comprising an SDA line and a SCL line. In this example, an SID scan response 4130 is identified by ternary number 2222_2221_21013 or hex 0x81B8F which is equal to the twelve-symbol sequence 3131_3130_2323. These symbols are transmitted over the SDA line 4126 and SCL line 4127. To allow the slave devices to use the SDA line 4126 to respond to an SID scan inquiry during a response period 4106, the master device releases the SDA line 4126 and causes the SDA line 4126 to be weakly pulled high. Each receiver device then masks the SDA line input to its clock data recovery circuit (CDR) for the response period 4106. The master toggles (changes states of) the SCL line so that each receiver device is able to recover a clock from such toggling on the SCL line while the SDA line is in use.

The RESP word 4006 may be nearly identical to a Heartbeat word. The RESP word 4006 may have at least one difference with respect to the Heartbeat word such that master and/or slave devices can differentiate the RESP word 4006 from the Heartbeat word. The Heartbeat word and the RESP word 4006 may be adjacent or nearly adjacent within a Bit-19 ternary space (i,e., a address space where the Bit-19 value is constant), leaving a large continuous region available for other control and signaling purposes. In one example, a large continuous region in the lower portion of a Bit-19 high region may be reserved and/or used for other purposes. The availability of in-band response capability provided by a RESP word 4006 enables slave devices to send a response in-band, instead of using a dedicated sideband IRQ line.

According to the CCIe protocol, a receiving slave device may detect, for example, the nth RXCLK 4114 after the start S indicator 4112. The nth RXCLK 4114 may trigger an internal SDA mask 4124 to internally (e.g., within a receiving slave device) mask the SDA line 4126 within each listening CCIe device.

At the n+1 RXCLK 4116, the slave device may assert/issue a response by pulling the SDA line 4126 low. The SDA line 4126 is weakly pulled high by the master device, so that when it is pulled low (by a slave device) this serves to indicate a positive response to the SID scan inquiry. By weakly pulling the SDA line 4126 high, this allows a slave device to pull the SDA line 4126 low to assert the response to the SID scan inquiry.

Rather than waiting until the next clock cycle, between the n+1 RXCLK 4116 but before the n+2 RXCLK 4118, the master device may monitor the SDA line 4126 to ascertain if and/or when it goes low, meaning a response has been asserted/issued. Note that such monitoring of the SDA line 4126 by the master device may be performed only during the response period 4106 to a synchronously detect any asserted/issued response from slave devices.

At the n+2 RXCLK 4118, the slave device may release the SDA line 4126.

Between n+2 RXCLK 4118 and n+3 RXCLK 4120, the master device may re-enable its SDA line driver and starts driving the SDA line 4126 high. Consequently, the receiver device (e.g., asserting slave device) can safely release SDA mask 4124 at n+3 RXCLK 4120.

At the n+3 RXCLK 4120, the slave device may release the SDA mask 4124. In this manner, an SID scan response may be transmitted by a slave device during the response period 4106 defined on the SDA line 4126.

Figure 42:
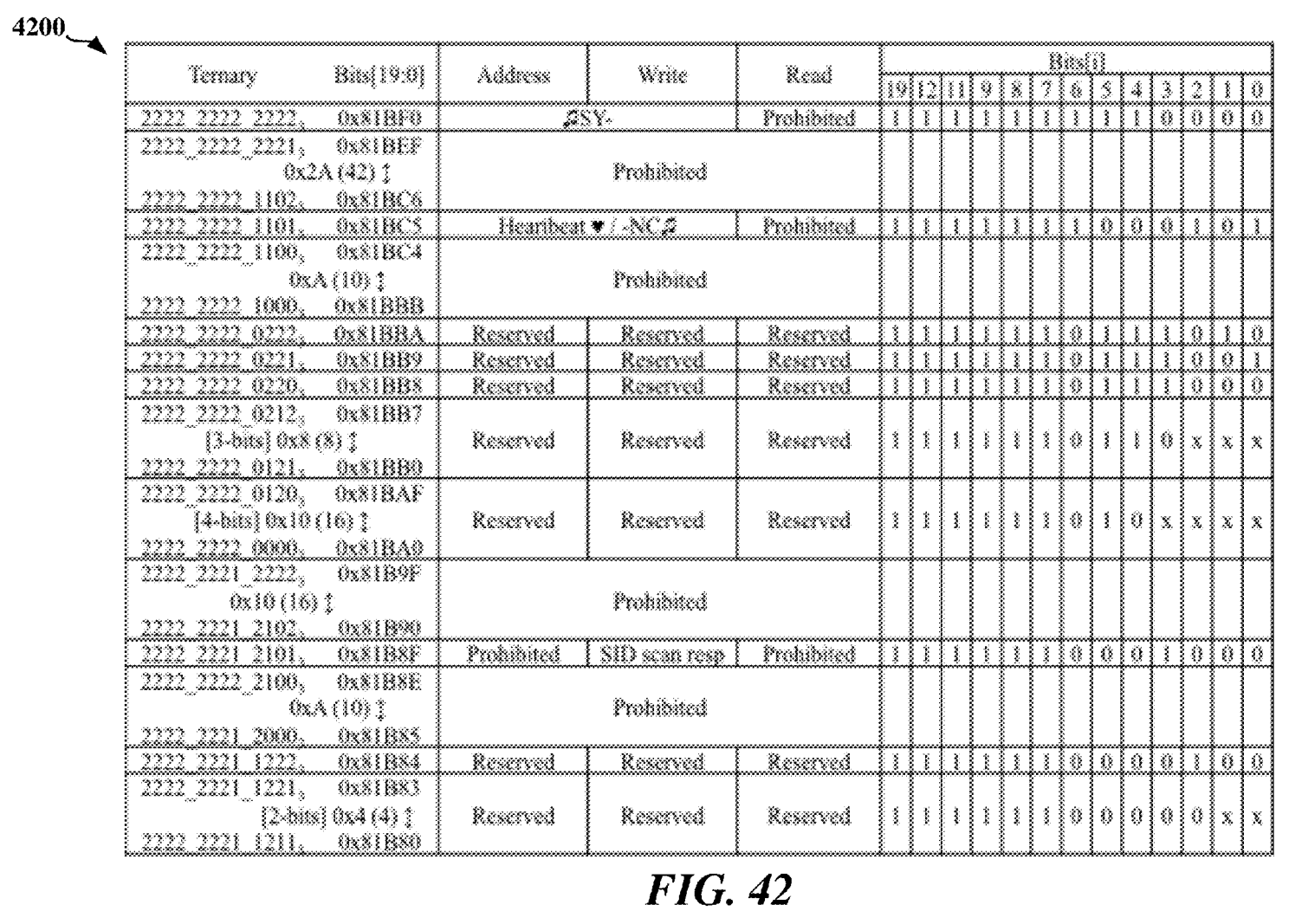

FIG. 42 is a table 4200 that illustrates possible SID scan response words that may be used by the CCIe protocol for a using ternary number 2222_2221_2101$_3$ (0x81B8F hex).

IRQ Group Inquiry

In order to identify an IRQ asserting slave device, the slave devices may be assigned or associated with a "group". Thus, the master device may send an inquiry to identify the slave device(s) that asserted an IRQ request. A slave device that asserted the IRQ may respond to the inquiry only within its assigned group, thereby identifying the asserting slave device to the master device.

Figure 43:
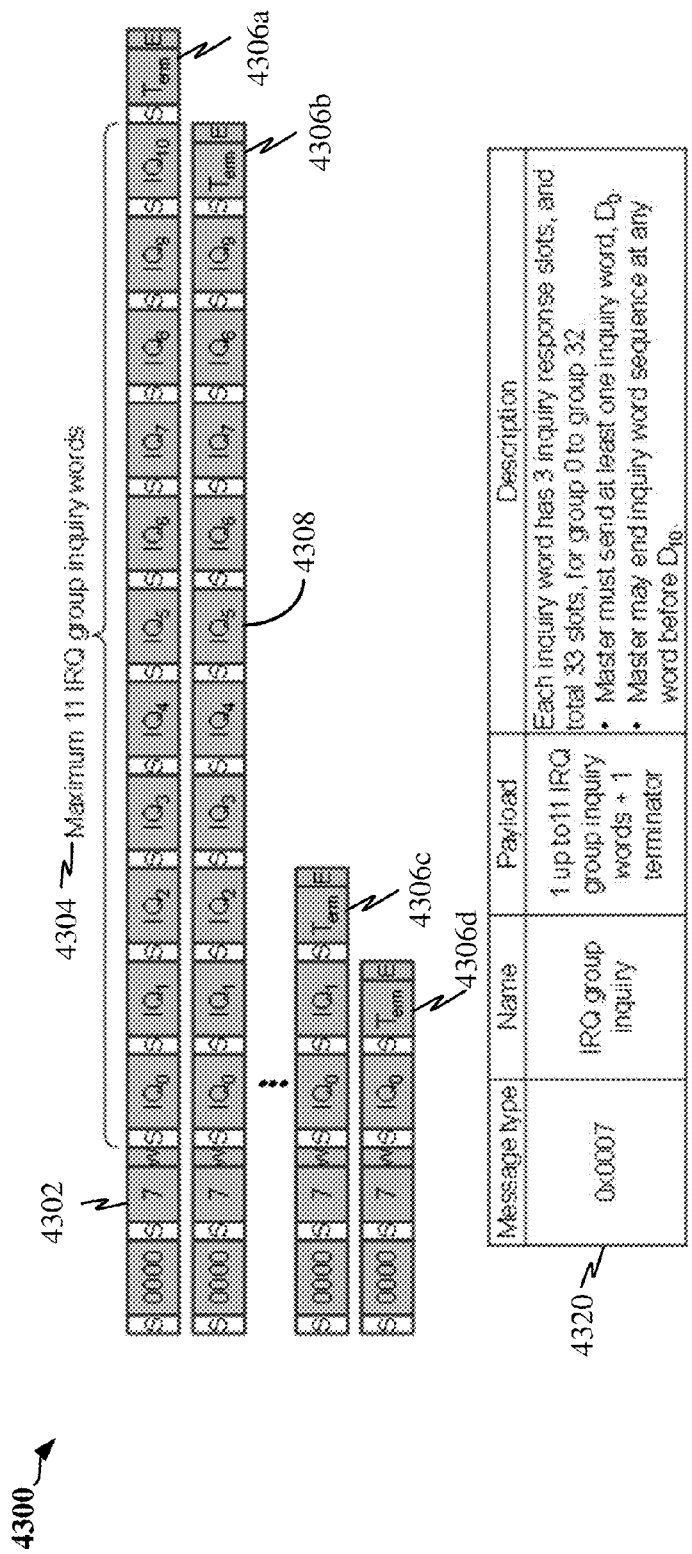
FIG. 43 illustrates an interrupt group inquiry call within one example of a CCIe protocol and in accordance with certain aspects disclosed herein.
Figure 44:
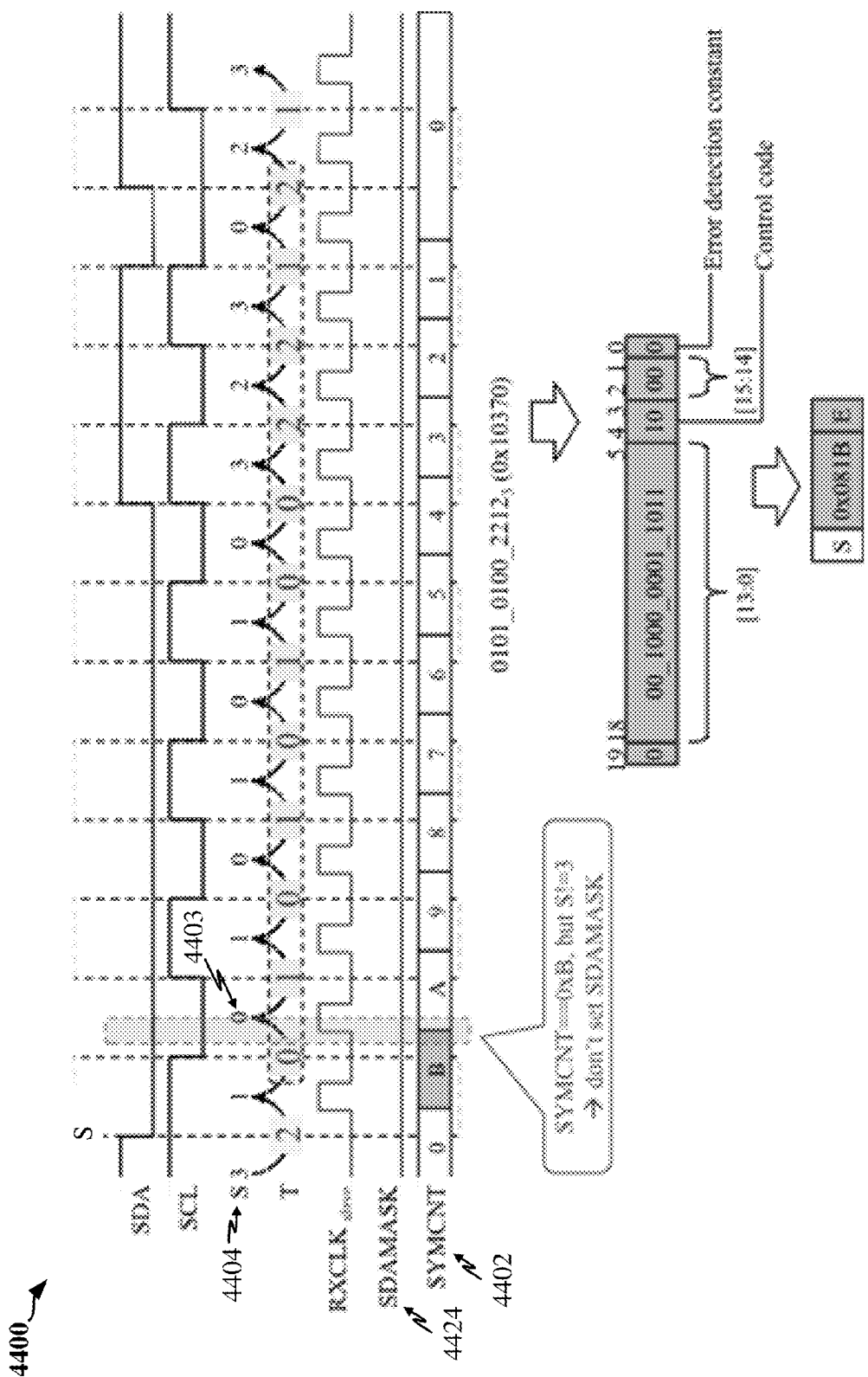
FIG. 44 illustrates one example of a terminator word for the interrupt group inquiry call illustrated in FIG. 43.

FIG. 43 is a diagram 4300 that illustrates an IRQ group inquiry general call within an exemplary CCIe protocol. The master device may broadcast a general call IRQ group inquiry 4320 to all slave devices on the shared bus. Following the IRQ group inquiry command 0x0007 hex 4302, a plurality of IRQ group inquiry words 4304 are sent. In one example, each inquiry word has 3 inquiry response slots, and total 33 slots, for group 0 to group 32. In one example, the inquiry words 4304 may include from one (1) to eleven (11) IRQ group inquiry words (IQ) and one terminator word (Term) 4306 at the end. An example of a terminator word 4400 is illustrated in FIG. 44. For each inquiry word 4304, all slave devices mask the SDA line of the shared bus. At each IRQ group inquiry (IQ) word 4308 of the payload 4304 of the general call, each slave receiver must start masking SDA at $T_{11}$ RXCLK and release the mask at dummy ($T_{-1}$) RXCLK.

In the example depicted in FIG. 43, the IRQ group inquiry may be determined when the message type of the call has the value 0×7. As noted, there may be three time slots in each IQ word of the payload of the general call assigned to three different IRQ groups. In each slot, one or more slave devices in each assigned group can drive the SDA line as an inquiry response to indicate it has issued an IRQ or is has an IRQ that has not been serviced. The master devices may choose numbers of IRQ group inquiry (IQ) words based on number of IRQ groups associated with the bus.

In some instances, or as needed, the master device may send a shorter inquiry word sequence than the sequence length needed to cover all existing groups. In one example, the shorter inquiry word sequence may be sent to shorten inquiry time for frequent and short latency events, and a full inquiry may be performed less frequently to cover all groups on the bus. The sequence of the IRQ group inquiry (IQ) words may conclude with a terminator word (Term).

As illustrated in FIG. 44, the symbol pattern of the terminator word 4400 may be chosen so that each receiver can recognize the word is a terminator word 4400 (i.e., the Term word 4306), rather than an IRQ group inquiry (IQ) at location $T_{11}$ such that receivers knows when to stop masking SDA and to terminate the IRQ group inquiry general call processing. The use of the terminator (Term word 4400) scheme permits the length of a payload to be flexibly set, and the length of the IRQ group inquiry (IQ) word sequence can exceed 11 words if necessary.

The IRQ group inquiry call may define bit values for certain words to simplify logic and decision making at the slave device related to variable length transmissions and the activation of an SDAMASK signal 4124, 4424. In one example, the difference between the RESP word 4006 (see FIG. 40) and certain other words associated with general calls may be observed in differences between the initial symbol 4103 of the RESP word illustrated in FIG. 41 and the initial symbol 4403 of the Term word 4306 (see FIG. 43) illustrated in FIG. 44. That is, differences that are apparent between the first (most significant) symbols 4103, 4403 of the corresponding transmitted sequences of symbols 4104, 4404 may be used by receivers to rapidly determine the disposition of the SDAMASK signal 4124, 4424 before decoding of the whole word is completed. In particular, the slave devices can detect a START condition as the symbol values {3, 1} in both received symbol sequences 4104, 4404. Upon detecting the START condition, each slave device may initialize a symbol counter (SYMCNT) 4402 that can be used to track the number of symbols received by the slave device. In one example, SYMCNT 4402 may be initialized with a value of 0xB, and SYMCNT 4402 may be decremented for each symbol received. Accordingly, the slave devices may determine the state of SDAMASK signal 4124, 4424 based on the value of the symbol 4103 or 4403 received when SYMCNT 4402 has a value of 0xB. When the RESP word 4006 is being received, the symbol 4103 has a value of 3 when SYMCNT 4402 has a value of 0xB, indicating that the SDAMASK signal 4124 is to be enabled. When the Term word 4306 is being received, the symbol 4403 does not have a value of 3 (here, the value is 0) when SYMCNT 4402 has a value of 0xB, indicating that the SDAMASK signal 4424 is to be disabled. The configuration of symbols used to encode the RESP word 4006 and the Term word 4306 enables slave devices to terminate RESP or general call sequences on-the-fly, thereby enabling variable length sequences to be handled.

In some instances, the three slots for the first IRQ group inquiry (IQ) are assigned to Group 0, 1, and 2. Groups with smaller numbers are assigned to earlier response slots. Group 0 may be reserved for hot-plugged devices or for devices that the master has not yet recognized on the bus system. Since at least one IRQ group inquiry (IQ) word must be sent, any hot-plugged device that issued an IRQ can always be recognized.

Figure 45:
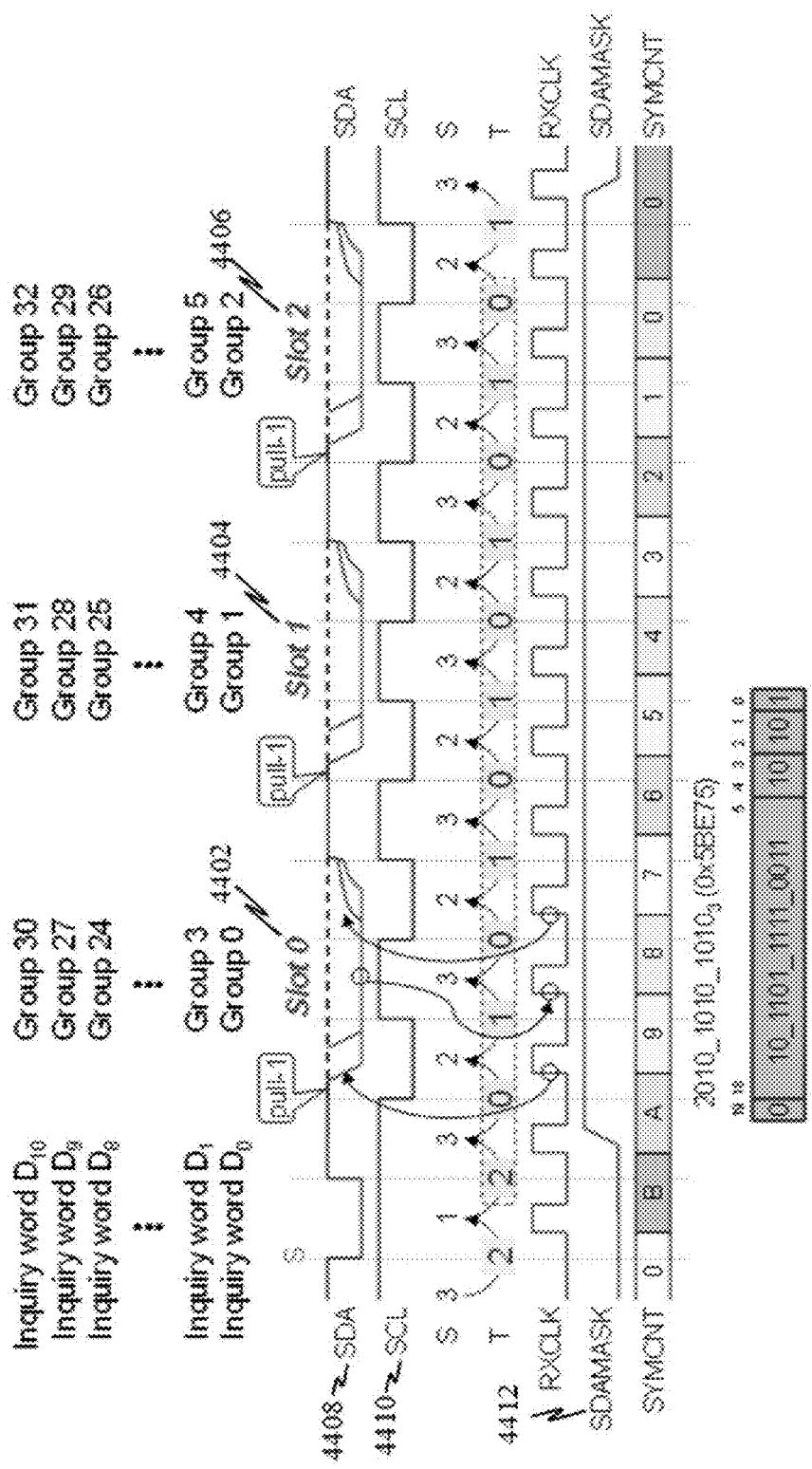
FIG. 45 illustrates an example of the response to a group inquiry call in accordance with certain aspects disclosed herein.

FIG. 45 illustrates the response to a group inquiry call. In this example, one or more response periods (i.e., inquiry words) may be defined on the SDA line 4508 by transferring clocking to the SCL line 4510 and using an SDA mask 4512. In this example, three separate slots 4502, 4504, and 4506 have been defined for each inquiry (IQ) word 4308 (see FIG. 43). Each of the three time slots 4502, 4504, and 4506 in each IQ word 4308 may be assigned to three different IRQ groups. The slave devices assigned to each slot 4502, 4504, and 4506 can drive the SDA line 4508 during the assigned slot 4502, 4504, and 4506 as an inquiry response to indicate it has issued an IRQ or is has an IRQ that has not been serviced. Since each IRQ group inquiry word 4308 has three inquiry response slots 4502, 4504, and 4506, and maximum 11 IRQ group inquiry (IQ) words can be in the general call payload 4304, there can be maximum 33 group slots in one call.

Up to thirty-two (32) devices may be assigned to groups such that only one device is in one group, thereby providing immediate identification of IRQ issuers. This approach identifies multiple IRQ groups at once, thereby reducing the number of IRQ scans necessary (e.g., fewer IRQ nesting). Alternatively, multiple devices may be assigned to each group, but an additional inquiry may be necessary by the master device to identify which of the plurality of devices in the group issued the IRQ.

The master device may chose the number of IRQ group inquiry (IQ) words to include in a general call based on number of IRQ groups on the bus system. In some examples, the master device may send a lesser number of inquiry words 4308 (e.g., less than a maximum number of eleven (11)). This may allow shortening the time for the IRQ group inquiry general call.

The sequence of the IRQ group inquiry (IQ) words ends with a terminator word (Term) 4306. The symbol pattern of the terminator word 4306 may be chosen so that each receiver slave device can recognize the word is a terminator (Term), not an IRQ group inquiry (IQ) at T11 RXCLK to know when to stop masking the SDA line 4508 and end of the IRQ group inquiry general call.

The three slots 4502, 4504, and 4506 for the first IRQ group inquiry (IQ) may be assigned to Group 0, 1, and 2. A group with smaller number may be assigned to earlier response slots.

In one example, Group 0 may be reserved for hot-plugged devices or devices that the master device has not yet recognized on the shared bus. Since at least one IRQ group inquiry (IQ) word must be sent, any hot-plugged device that issued an IRQ is always recognized.

Thanks to the use of the terminator (Term) word 4306, the length of a payload 4304 can be flexibly set, and the length of the IRQ group inquiry (IQ) word sequence can exceed 11 words if necessary.

IRQ group inquiry may be used for side-band IRQ, where a separate IRQ signal line may be used by slave devices to request interrupt service. The master can identify requesting devices using IRQ group inquiry, and the master device need not determine IRQ group by measuring IRQ assertion period with a precise free-running timer. In this respect, the slave devices need not generate IRQs with precise timing and the slave devices need not arbitrate IRQ. Accordingly, the slave device and/or master device can operate without a precise free-running timer to create and measure IRQ period for group identification.

According to certain aspects, IRQ group inquiry can support simultaneous IRQ assertions by multiple groups without any group being subjected to arbitration loss. The master device can recognize all IRQs at once, and slave devices need not keep repeating IRQs as a result of arbitration loss. Accordingly the slave devices are less likely to experience access "starvations."

Global Clock Read

CCIe is a source synchronous symbol transition clocking system. A device that sends data over the control data bus also sends clock information embedded within the data. Unlike I2C, all slaves devices must use their own clock source to generate read data with clock information. Techniques described herein for IRQ group inquiry, e.g., always toggling SCL line while having all slave devices mask their SDA input and allow slave devices to drive the SDA line, may also be used to perform a global clock read.

As can be appreciated from FIGS. 43-45, an IRQ group inquiry word may be limited to carrying only 3 slave responses, mainly in order to allow multiple slaves with different RXCLK timings to drive the SDA line within the same time slot. However, allowing only a single slave device to drive the SDA line during an SDA mask permits implementing a double data rate (DDR) global clock read.

Figure 46:
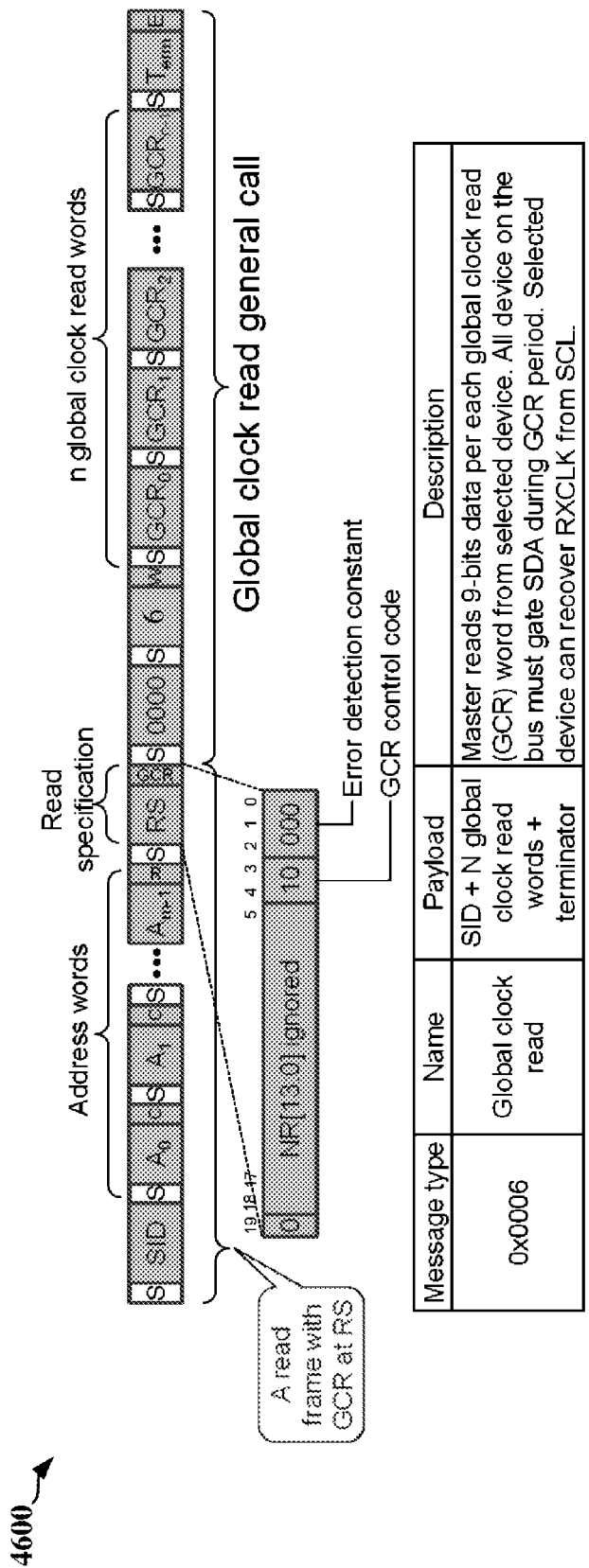
FIG. 46 illustrates one example of a DDR global clock read implementation in accordance with certain aspects disclosed herein.

FIG. 46 illustrates an example 4600 of a global clock read general call that corresponds to an example of a DDR global clock read implementation. Before starting a DDR global clock read sequence, the master device may issue some CCIe protocol transmission, such as general call. The general call transmission may indicate:

1. The following sequence is DDR global clock read.
2. The number of words of DDR global clock read.
3. The SID of the device from which to read data.
4. The register address of the device from which to read data.

Each of the devices on the bus is adapted or configured to understand that all of the CCIe transactions after the general call relate to DDR global clock read, until a specified number of words have been sent.

In the DDR global clock mode, all the devices on the bus may mask the SDA input to their clock data recovery (CDR) circuit during the symbol period including dummy symbol at the end of a word. The addressed slave device drives the SDA line 318 low at the 2nd RXCLK pulse (not including RXCLK by the START condition), and that logic 0 is used by the master device to calibrate its clock to sample the SDA line (SDACLK). From the 3rd RXCLK, the addressed slave device can drive out 9-bits of data serially. The 9-bits of data can be MSB first or LSB first or other format depending on system requirement. During this period, the master device provides or drives a DDR global clock on the SCL line. The slave device may drive the SDA line 318 high at the 12th RXCLK, and release the SDA line 318 at the 13th RXCLK.

The master device releases the SDA line 318 after the 1st symbol "3" is sent, and enables its SDA driver and drives the SDA line 318 high after the last symbol "2." After releasing the SDA line 318 the SDA line 318 may be weakly pulled to a high state. The master samples in SDA line 318 at SDACLK timing to shift-in the 9 read data bits. The master may resume driving the SDA line 318 after the last symbol ("2"), by transmitting the symbol "3".

Figure 47:
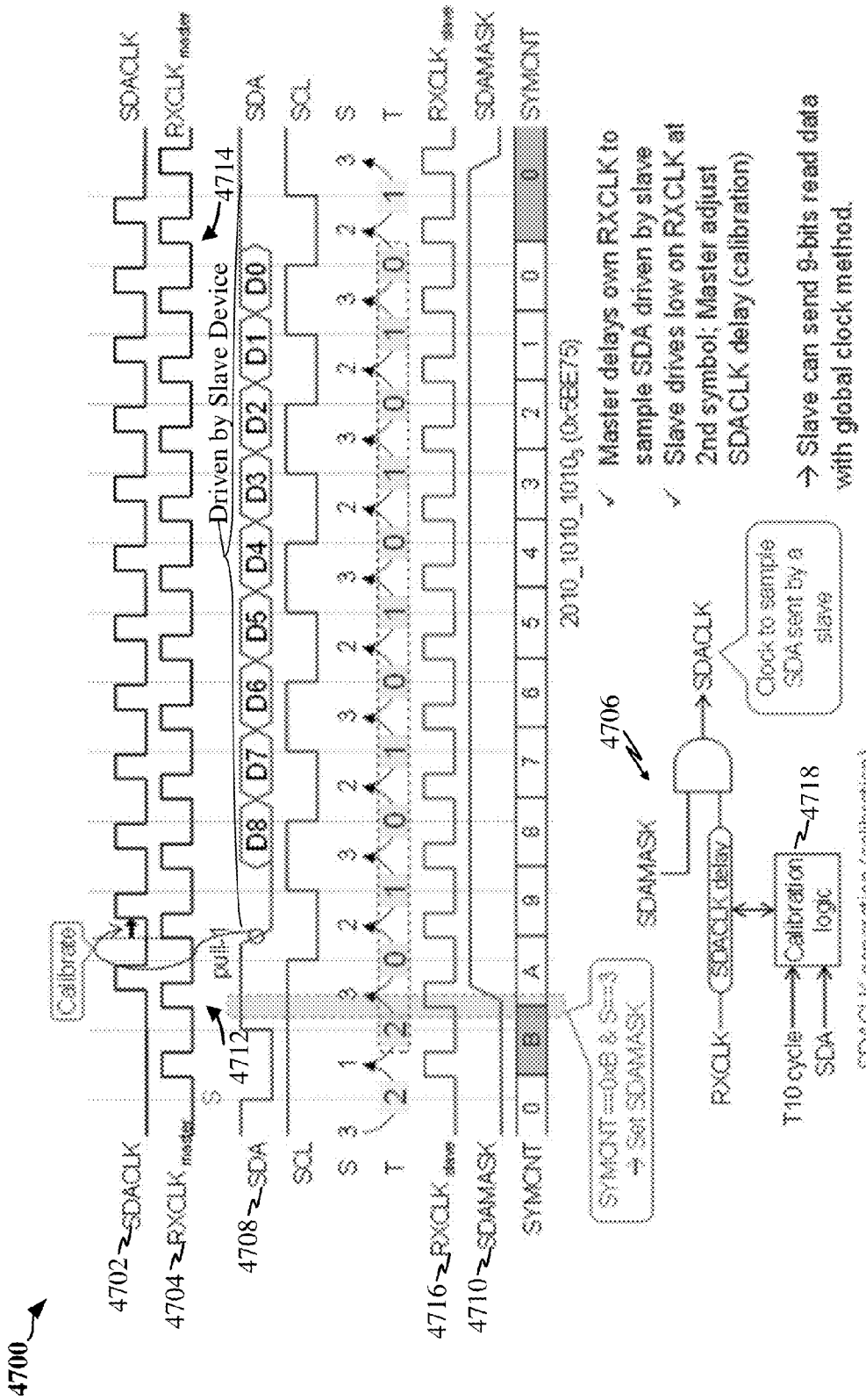
FIG. 47 illustrates timing associated with a DDR global clock read word according to certain aspects disclosed herein.

FIG. 47 is a timing diagram illustrating certain aspects of a global clock read word. A first clock signal SDACLK 4702 and a second clock signal RXCLK 4704, indicate internal signals within the master device. The second clock signal RXCLK 4704 may be generated by a clock data recovery circuit (CDR) of the master device. The first clock signal SDACLK 4702 may be generated by a clock generation circuit 4706 which may be used by the master device to sample data values from a SDA line 4708 (which is part of the shared bus) when driven by a slave device signal. The first clock signal SDACLK 4702 may be generated only when an SDAMASK signal 4710 is 1 (SDA line 4708 input to CDR is masked).

Since it is a slave device that drives the SDA line 4708 during a global clock read period, all the devices on the bus (including the master device) mask the SDA line 4708 input to their CDR during this period, which starts at the second clock signal RXCLK rising 4712 from the START condition and ends at the last RXCLK rising edge 4714 for the word by the dummy symbol.

In this example, the master device sends 0x5BE75 (2010_1010_1010$_3$) for a global clock read word. Since this is the payload portion of the global clock read general call, each device on the shared bus knows that global clock read words follows after the call message "6", each device also knows when to start and end the SDAMASK 4710.

In some instances, the SDACLK 4702 may be generated at the master device with a delay with respect to its RXCLK 4704 to cope with read data turnaround delay on the SDA line 318. The duration of the delay may be optimized by measuring turnaround delay of the first known data (e.g., 1 to 0 falling on the SDA line 318) at the master device.

In some instances, slave devices may activate SDAMASK at each global clock read word only after a global call. The masking of the SDA line 318 can prevent any slave devices on the bus that are not addressed to be unaffected by the GCR word data (seen as 2010_1010_1010$_3$ by each slave).

Each device expects the global clock read word for next word unless next word is the "Terminator" word that has distinct signal pattern at the first symbol.

Since the data signal on the SDA line 4708 is driven by a slave device using a RXCLK 4716 from the slave device's CDR, the master device must delay "properly" its second clock signal RXCLK 4704 from the master device's CDR in order for the master device to sample the data with enough setup and hold time. The master device learns that "proper delay at the first falling edge of the SDA line 4708 that is driven by the slave device per the global clock read protocol after the master device sent out the second symbol of the global clock read word (i.e., T10 cycle). The "calibration logic" 4718 measures delay of the SDA line 4708 falling from the beginning of the T10 cycle, and used the delay to configure "SDACLK delay", so that the master device reliable samples the SDA line 4708 transmissions from the slave device from next symbol.

Examples of Apparatus, Systems and Methods Involving a Common IRQ Bus

Figure 48:
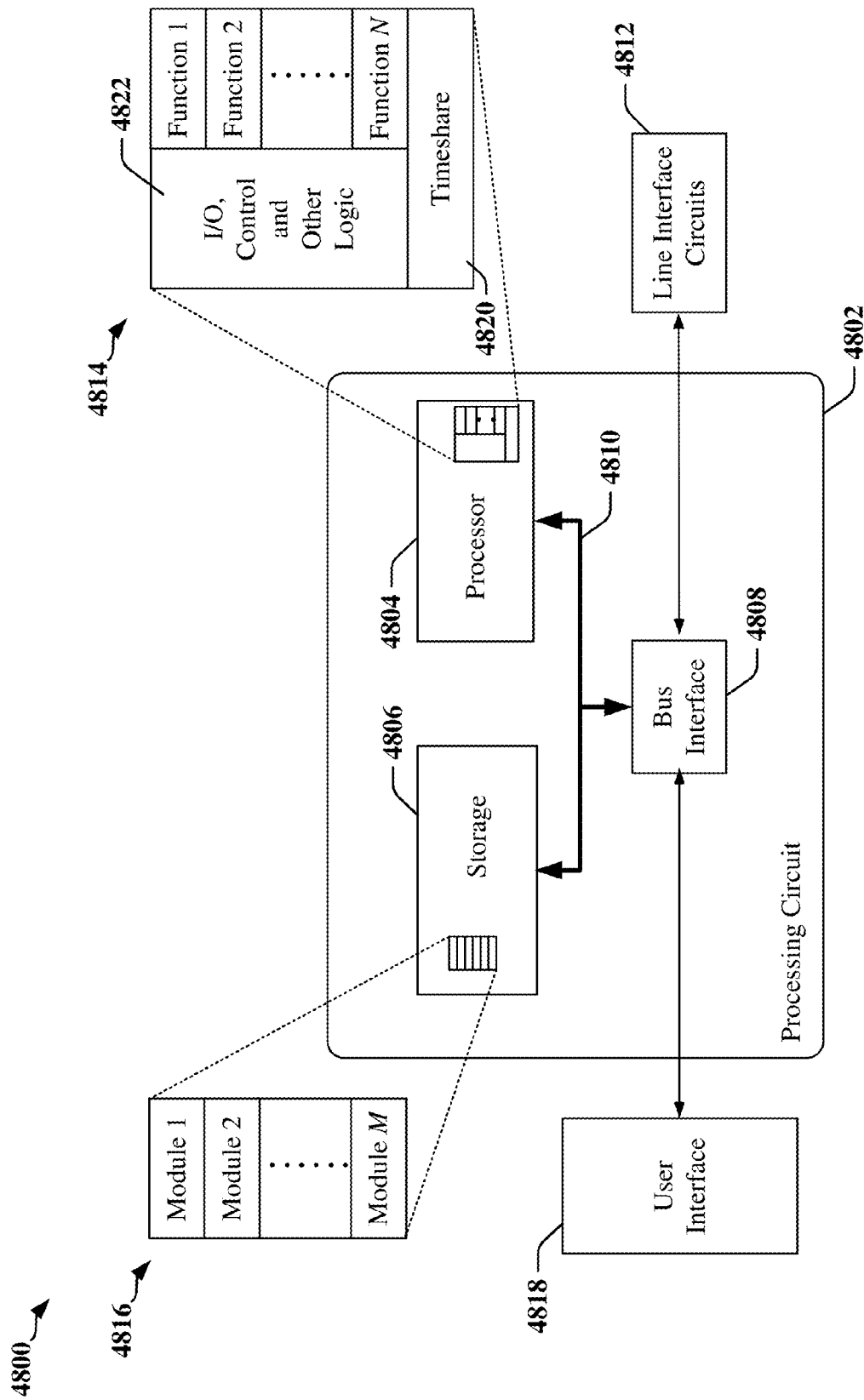
FIG. 48 is a block diagram illustrating an example of an apparatus employing a processing circuit that may be adapted according to certain aspects disclosed herein.

FIG. 48 is a conceptual diagram 4800 illustrating a simplified example of a hardware implementation for an apparatus employing a processing circuit 4802 that may be configured to perform one or more functions disclosed herein. In accordance with various aspects of the disclosure, an element, or any portion of an element, or any combination of elements as disclosed herein for managing or initiating interrupts using a common IRQ bus may be implemented using the processing circuit 4802. The processing circuit 4802 may include one or more processors 4804 that are controlled by some combination of hardware and software modules. Examples of processors 4804 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 4804 may include specialized processors that perform specific functions, and that may be configured, augmented or controlled by one of the software modules 4816. For example, the processing circuit may be configured as a communications processor or another type of processor that may be adapted to handle encoding and decoding of data for transmission on one or more wireless networks. The one or more processors 4804 may be configured through a combination of one or more software modules 4816 loaded during initialization, and may be further configured by loading or unloading one or more of the software modules 4816 during operation.

In the illustrated example, the processing circuit 4802 may be implemented with a bus architecture, represented generally by the bus 4810. The bus 4810 may include any number of interconnecting buses and bridges depending on the specific application of the processing circuit 4802 and the overall design constraints. The bus 4810 links together various circuits including the one or more processors 4804, and storage 4806. Storage 4806 may include memory devices and mass storage devices, and may be referred to herein as computer-readable media. The bus 4810 may also link various other circuits such as timing sources, timers, peripherals, voltage regulators, and power management circuits. A bus interface 4808 may provide an interface between the bus 4810 and one or more transceivers or line interface circuit 4812. A line interface circuit 4812 may include differential line drivers and receivers, a CDR, encoders and decoders that are used in communicating with various other apparatus over a transmission medium that may include a multi-wire serial bus. Depending upon the nature of the apparatus, a user interface 4818 (e.g., keypad, display, speaker, microphone, joystick) may also be provided, and may be communicatively coupled to the bus 4810 directly or through a bus interface 4808.

A processor 4804 may be responsible for managing the bus 4810 and/or for general processing that may include the execution of software stored in a computer-readable medium that may include the storage 4806. In this respect, the processing circuit 4802, including the processor 4804, may be used to implement any of the methods, functions and techniques disclosed herein. The storage 4806 may be used for storing data that is manipulated by the processor 4804 when executing software, and the software may be configured to implement any one of the methods disclosed herein.

One or more processors 4804 in the processing circuit 4802 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 4806 or in an external computer readable medium. The computer-readable medium and/or storage 4806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 4806 may also include, by way of example, a carrier wave, a transmission line, and any other suitable medium for transmitting software and/or instructions that may be accessed and read by a computer. Computer-readable medium and/or the storage 4806 may reside in the processing circuit 4802, in the processor 4804, external to the processing circuit 4802, or be distributed across multiple entities including the processing circuit 4802. The computer-readable medium and/or storage 4806 may be embodied in a computer program product. By way of example, a computer program product may include a compute-readable medium in packaging materials. Those skilled in the art will recognize how best to implement the described functionality presented throughout this disclosure depending on the particular application and the overall design constraints imposed on the overall system.

The storage 4806 may maintain software maintained and/or organized in loadable code segments, modules, applications, programs, etc., which may be referred to herein as software modules 4816. Each of the software modules 4816 may include instructions and data that, when installed or loaded on the processing circuit 4802 and executed by the one or more processors 4804, contribute to a run-time image 4814 that controls the operation of the one or more processors 4804. When executed, certain instructions may cause the processing circuit 4802 to perform functions in accordance with certain methods, algorithms and processes described herein.

Some of the software modules 4816 may be loaded during initialization of the processing circuit 4802, and these software modules 4816 may configure the processing circuit 4802 to enable performance of the various functions disclosed herein. For example, some software modules 4816 may configure internal devices and/or logic circuits 4822 of the processor 4804, and may manage access to external devices such as the line interface circuits 4812, the bus interface 4808, the user interface 4818, timers, mathematical coprocessors, and so on. The software modules 4816 may include a control program and/or an operating system that interacts with interrupt handlers and device drivers, and that controls access to various resources provided by the processing circuit 4802. The resources may include memory, processing time, access to the line interface 4812, the user interface 4818, and so on.

One or more processors 4804 of the processing circuit 4802 may be multifunctional, whereby some of the software modules 4816 are loaded and configured to perform different functions or different instances of the same function. The one or more processors 4804 may additionally be adapted to manage background tasks initiated in response to inputs from the user interface 4818, the line interface circuits 4812, and device drivers, for example. To support the performance of multiple functions, the one or more processors 4804 may be configured to provide a multitasking environment, whereby each of a plurality of functions is implemented as a set of tasks serviced by the one or more processors 4804 as needed or desired. In one example, the multitasking environment may be implemented using a timesharing program 4820 that passes control of a processor 4804 between different tasks, whereby each task returns control of the one or more processors 4804 to the timesharing program 4820 upon completion of any outstanding operations and/or in response to an input such as an interrupt. When a task has control of the one or more processors 4804, the processing circuit is effectively specialized for the purposes addressed by the function associated with the controlling task. The timesharing program 4820 may include an operating system, a main loop that transfers control on a round-robin basis, a function that allocates control of the one or more processors 4804 in accordance with a prioritization of the functions, and/or an interrupt driven main loop that responds to external events by providing control of the one or more processors 4804 to a handling function.

Figure 49:
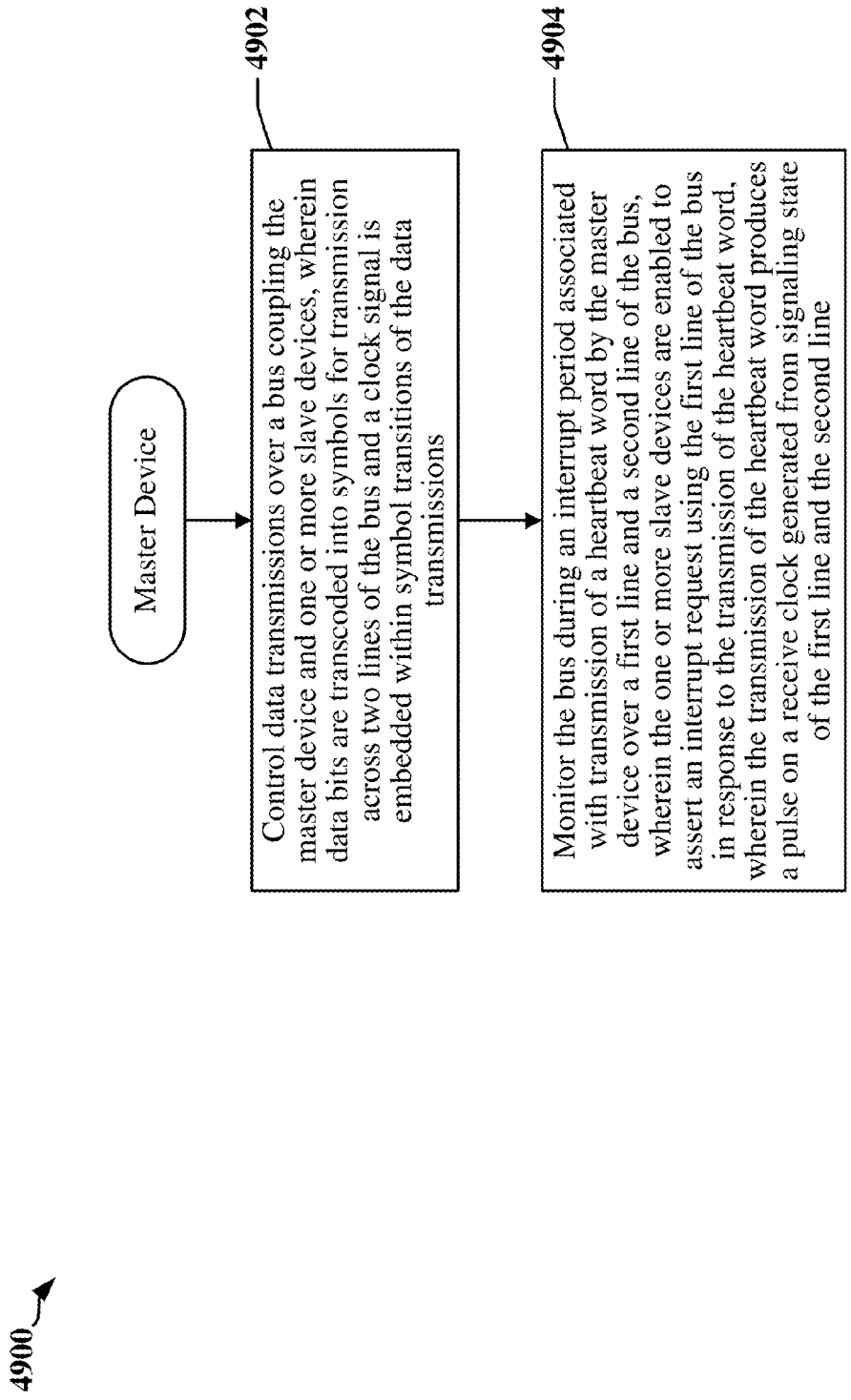
FIG. 49 is a flowchart of a first example of a method according to certain aspects disclosed herein.

FIG. 49 is a flowchart 4900 illustrating a first example of a method for asserting, receiving, and/or processing an in-band IRQ according to certain aspects disclosed herein. The method may be implemented by a master device or a combination of master and slave devices, for example.

At block 4902, data transmissions over a bus from a master device may be controlled. Data bits may be transcoded into symbols for transmission across two lines of the bus and a clock signal is embedded within symbol transitions of the data transmissions.

At block 4904, the bus may be monitored during an interrupt period associated with transmission of a heartbeat word by the master device over a first line and a second line of the bus. The one or more slave devices may be enabled to assert an interrupt request using the first line of the bus in response to the transmission of the heartbeat word. The transmission of the heartbeat word may produce a pulse on a receive clock generated from signaling state of the first line and the second line while the bus is in an idle mode of operation.

In some examples, the heartbeat word may be selected from a set of twenty-bit words that have a most significant bit set to a first logic value. Payload data transmitted between the master device and the one or more slave devices may include twenty-bit words that have the most significant bit set to a second logic level. The one or more slave devices may be adapted to assert an interrupt request by transmitting a response word on the first line and a second line of the bus. The response word may differ from the heartbeat word by one bit and has a most significant bit identical to a most significant bit of the heartbeat word.

In another example, the one or more slave devices may be adapted to internally mask the first line during the interrupt period for purposes of decoding transcoded data bits received from the bus. A slave identifier scan response period may be provided during which one or more slave devices coupled to the bus can provide their unique identifier over a first line of the bus, within part of a slave identifier scan initiated by the master device over the first line and a second line of the bus.

In another example, each of the one or more slave devices may be configured to mask the first data line. The SID scan response period may be provided during transmission of a global call on the bus. Each of the one or more slave devices may be configured to mask the first data line when transmitting a response after the global call has been transmitted on the bus.

In one example, the master device may perform a scan of the slave devices over the bus to identify a slave device asserting the interrupt request. The master device may receive an indicator from the asserting slave device over the first line.

In another example, a slave device may assert an interrupt request by pulling down the first line during the interrupt period. The slave device may internally mask the first line during the interrupt period for purposes of decoding the transcoded data bits received over the bus. According to certain aspects, all slave devices coupled to the bus also internally mask the first line during the interrupt period.

In another example, a slave identifier scan response period may be provided. During this period, one or more slave devices coupled to the bus can provide their unique identifier over a first line of the bus, within part of a slave identifier scan initiated by the master device over the first line and a second line of the bus.

In another example, a data read period may be defined in which a previously identified slave device is allowed to transmit data over a first line of the bus while the master device sends a global read clock over a second line of the bus. The global read clock may be a double data rate clock.

Figure 50:
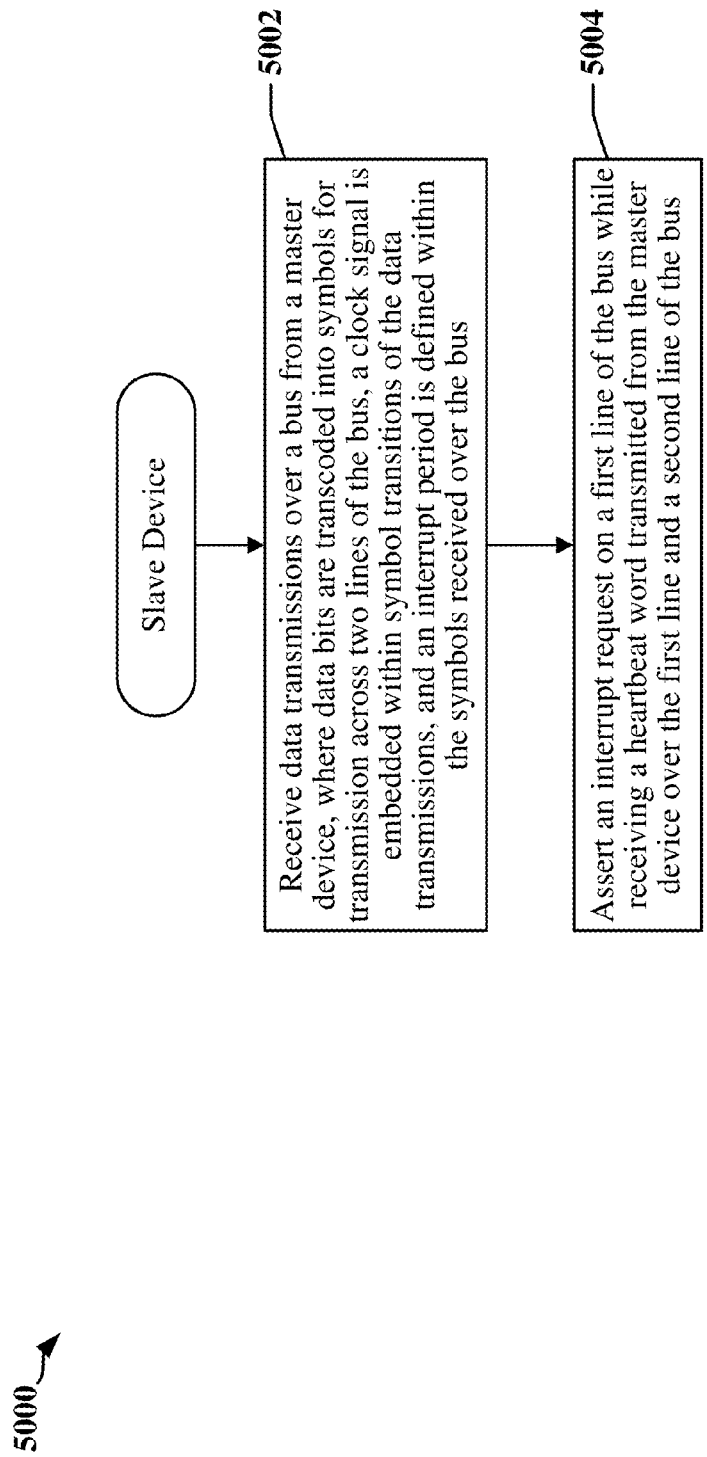
FIG. 50 is a flowchart of a second example of a method according to certain aspects disclosed herein.

FIG. 50 is a flowchart 5000 illustrating an example of a method for generating IRQs according to certain aspects disclosed herein. The method may be implemented by a slave device, for example.

At block 5002, the slave device may receive data transmissions over a bus from a master device. Data bits of the data may be transcoded into symbols for transmission across two lines of the bus. A clock signal may be embedded within symbol transitions of the data transmissions. An interrupt period may be defined within the symbols received over the bus.

At block 5004, the slave device may assert an interrupt request on a first line of the bus while receiving a heartbeat transmission from the master device over the first line and a second line of the bus. The interrupt request may be an indicator that the asserting slave device wishes to request some action by the master device. The interrupt request may be asserted by pulling down the first line during the interrupt period.

In one example, the interrupt request is an indicator that the asserting slave device wishes to request some action by the master device. The interrupt request may be asserted by pulling down the first line during the interrupt period.

In another example, the slave device may mask the first data line after detecting the heartbeat word. The first data line may be masked while transmitting a response to the heartbeat word after a general call has been transmitted on the bus.

In another example, the slave device may receive a slave identifier scan request from the master device over a first line and a second line of the bus, and may provide a unique slave identifier over a first line of the bus within part of a slave identifier scan slave identifier scan response period provided by the slave identifier scan request.

In another example, the slave device may send data over a first line of the bus during a data read period, defined by the master device, in which a previously identified slave device is allowed to transmit data over a first line of the bus while the while the master device sends a global read clock over a second line of the bus. In some instances, all slave devices coupled to the bus also internally mask the SDA line during global clock read periods.

Figure 51:
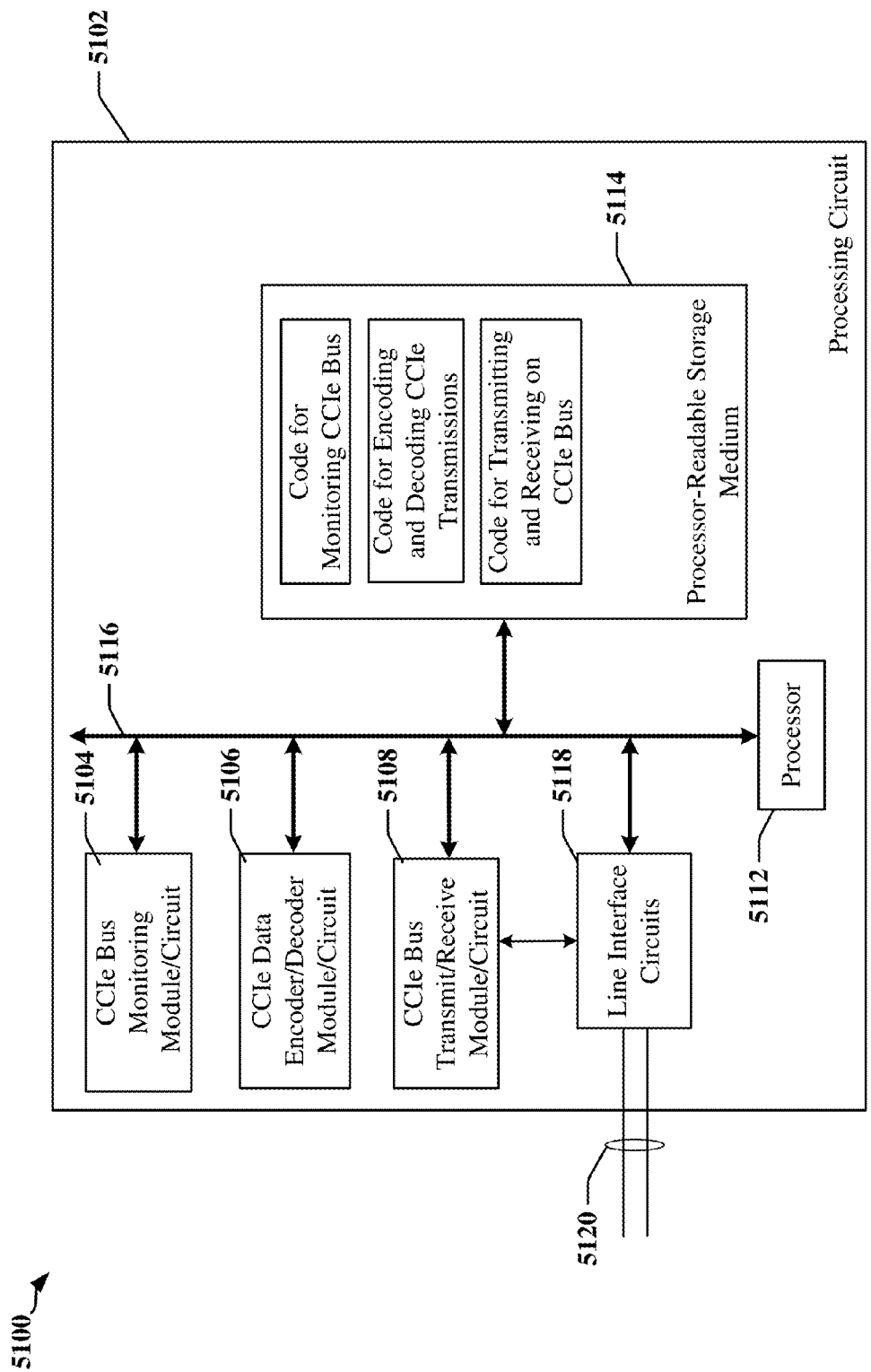
FIG. 51 is a diagram illustrating an example of a hardware implementation for an apparatus adapted for handling IRQs on a shared IRQ bus.

FIG. 51 is a conceptual diagram illustrating an example of a hardware implementation for an apparatus 5100 employing a processing circuit 5102. In this example, the processing circuit 5102 may be implemented with a bus architecture, represented generally by the bus 5116. The bus 5116 may include any number of interconnecting buses and bridges depending on the specific application of the processing circuit 5102 and the overall design constraints. The bus 5116 links together various circuits including one or more processors, represented generally by the processor 5112, and computer-readable media, represented generally by the processor-readable storage medium 5114. One or more timers may be connected to the bus and/or may be directly accessible or embodied in a processor 5112. The bus 5116 may also link various other circuits such as timing sources, timers, peripherals, voltage regulators, and power management circuits. Line interface circuits 5112 may include differential drivers and receivers that couple the processing circuit 5102 to a control data bus and/or circuits that couple the processing circuit to an IRQ bus. Depending upon the nature of the apparatus, a user interface may be provided to support devices such as a keypad, a display, a speaker, a microphone, a joystick, and the like.

The processor 5112 is responsible for managing the bus 5116 and general processing, including the execution of software stored on the processor-readable storage medium 5114. The software, when executed by the processor 5112, causes the processing circuit 5102 to perform the various functions described supra for any particular apparatus. The processor-readable storage medium 5114 may be used for storing data that is manipulated by the processor 5112 when executing software. The processor-readable storage medium 5114 may also be used for storing system information related to one or more remotely managed devices (e.g. profiles), and the apparatus 5100 itself.

In one configuration the processing circuit 5102 may perform one or more functions of a device adapted for communicating as a bus master on an I2C, CCI, and/or CCIe bus. In a second configuration the processing circuit 5102 may perform one or more functions of a device adapted for communicating as a slave master on the I2C, CCI, and/or CCIe bus. The processing circuit 5102 may connected through the interface circuits 5118 to a control data bus 5120. The processing circuit 5102 may include a module or circuit 5104 configured to monitor the CCIe bus 5120 to ascertain when an in-band IRQ signal is asserted or can be asserted by at least one slave device, a module or circuit 5106 configured to encode or decode data transmitted on the CCIe bus 5120, and a module or circuit 5108 configured to transmit and/or receive data using the CCIe bus 5120.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method operational on a master device, comprising:
controlling data transmissions over a bus coupling the master device and one or more slave devices, wherein data bits are transcoded into symbols for transmission across two lines of the bus and a clock signal is embedded within symbol transitions of the data transmissions; and
monitoring the bus during an interrupt period associated with transmission of a first signaling condition by the master device over a first line and a second line of the bus, wherein the one or more slave devices are enabled to assert an interrupt request using the first line of the bus in response to the transmission of the first signaling condition, and
wherein the one or more slave devices are adapted to assert an interrupt request by pulling down the first line during the interrupt period.

2. The method of claim 1, wherein the first signaling condition is produced by transmission of a heartbeat word that is selected from a set of twenty-bit words that have a most significant bit set to a first logic value, wherein payload data transmitted between the master device and the one or more slave devices comprises twenty-bit words that have the most significant bit set to a second logic level, and wherein the transmission of the heartbeat word produces a pulse on a receive clock generated from signaling state of the first line and the second line.

3. The method of claim 2, wherein the one or more slave devices are adapted to assert an interrupt request by transmitting a response word on the first line or a second line of the bus, and wherein the response word differs from the heartbeat word by one bit and has a most significant bit identical to a most significant bit of the heartbeat word.

4. The method of claim 1, further comprising:
scanning the one or more slave devices over the bus to identify a slave device asserting the interrupt request.

5. The method of claim 4, further comprising:
receiving an indicator over the first line from the slave device asserting the interrupt request.

6. The method of claim 1, wherein the one or more slave devices are adapted to internally mask the first line during the interrupt period for purposes of decoding transcoded data bits received from the bus.

7. The method of claim 1, further comprising:
providing a slave identifier scan response period, during which one or more slave devices coupled to the bus can provide their unique identifier over a first line of the bus, within part of a slave identifier scan initiated by the master device over the first line and a second line of the bus.

8. The method of claim 7, wherein each of the one or more slave devices is configured to mask the first line after detecting transmission of the first signaling condition.

9. The method of claim 7, wherein providing a slave identifier scan response period comprises:
transmitting a general call on the bus, wherein each of the one or more slave devices is configured to mask the first line when transmitting a response after the general call has been transmitted on the bus.

10. The method of claim 1, further comprising:
defining a data read period in which a previously identified slave device is allowed to transmit data over a first line of the bus while the master device sends a global read clock over a second line of the bus.

11. The method of claim 10, wherein the global read clock is a double data rate clock.

12. A device, comprising:
a bus including a first line and a second line;
one or more slave devices coupled to the bus; and
a master device coupled to the bus and controlling data transmissions between the master device and the one or more slave devices,
wherein data bits are transcoded into symbols for transmission across the bus and a clock signal is embedded within symbol transitions of the data transmissions,
wherein an interrupt period associated with transmission of a first signaling condition by the master device provides an opportunity for the one or more slave devices to assert an interrupt request on a first line of the bus, and
wherein the master device is configured to monitor the first line for an interrupt request from a slave device during the interrupt period.

13. The device of claim 12, wherein the first signaling condition is produced by transmission of a heartbeat word that is one of a set of twenty-bit words that have a most significant bit set to a first logic value, and wherein payload data transmitted between the master device and the one or more slave devices comprises twenty-bit words that have the most significant bit set to a second logic level.

14. The device of claim 13, wherein the one or more slave devices are configured to assert an interrupt request by transmitting a response word on the first line and a second line of the bus, and wherein the response word differs from the heartbeat word by one bit and has a most significant bit identical to a most significant bit of the heartbeat word.

15. The device of claim 12, wherein the master device is configured to:
perform a scan of the slave devices over the bus to identify a first slave device that asserted the interrupt request.

16. The device of claim 15, wherein the master device is configured to:
receive an indicator over the first line from the first slave device.

17. The device of claim 12, wherein the one or more slave devices are configured to:
assert an interrupt request by pulling down the first line during the interrupt period.

18. The device of claim 12, wherein the one or more slave devices are configured to:
internally mask the first line during the interrupt period for purposes of decoding the transcoded data bits received over the bus.

19. A method operational on a slave device, comprising:
receiving data transmissions over a bus from a master device, where data bits are transcoded into symbols for transmission across two lines of the bus, a clock signal is embedded within symbol transitions of the data transmissions, and an interrupt period is defined within the symbols received over the bus; and
asserting an interrupt request on a first line of the bus while receiving a first signaling condition transmitted from the master device over the first line and a second line of the bus, wherein asserting the interrupt request includes pulling down the first line during the interrupt period.

20. The method of claim 19, wherein the interrupt request is an indicator that the slave device wishes to request some action by the master device.

21. The method of claim 19, further comprising:
internally masking the first line, during the interrupt period, for purposes of decoding the transcoded data bits received over the bus.

22. The method of claim 19, further comprising:
receiving a slave identifier scan request from the master device over a first line and a second line of the bus; and
providing a unique slave identifier over a first line of the bus within part of a slave identifier scan response period provided by the slave identifier scan request.

23. The method of claim 22, wherein the first signaling condition is produced by transmission of a heartbeat word, and further comprising:
masking the first data line after detecting the heartbeat word.

24. The method of claim 22, further comprising:
masking the first data line while transmitting a response after a global call has been transmitted on the bus.

25. The method of claim 19, further comprising:
sending data over a first line of the bus during a data read period, defined by the master device, in which a previously identified slave device is allowed to transmit data over a first line of the bus while the master device sends a global read clock over a second line of the bus.

26. A slave device, comprising:
a bus interface for coupling to a first line and a second line;
a processing circuit coupled to the bus interface and adapted to
receive data transmissions over a bus from a master device, where data bits are transcoded into symbols for transmission across two lines of the bus, a clock signal is embedded within symbol transitions of the data transmissions, and an interrupt period is defined within the symbols received over the bus;

assert an interrupt request using a first line of the bus while a first signaling condition is being transmitted by the master device over the first line and a second line of the bus; and internally mask the first line, during the interrupt period, for purposes of decoding the transcoded data bits received over the bus.

27. The slave device of claim 26, wherein the first signaling condition is produced by a heartbeat word that is selected from a set of twenty-bit words that have a most significant bit set to a first logic value.

* * * * *